(12) United States Patent
Melcher

(10) Patent No.: US 9,545,976 B2
(45) Date of Patent: Jan. 17, 2017

(54) SNOWMOBILE WITH LEANING CAPABILITY

(71) Applicant: Thomas W. Melcher, Mesa, AZ (US)

(72) Inventor: Thomas W. Melcher, Mesa, AZ (US)

( * ) Notice: Subject to any disclaimer, the term of this patent is extended or adjusted under 35 U.S.C. 154(b) by 160 days.

(21) Appl. No.: 14/191,292

(22) Filed: Feb. 26, 2014

(65) Prior Publication Data

US 2014/0238763 A1    Aug. 28, 2014

Related U.S. Application Data

(60) Provisional application No. 61/770,851, filed on Feb. 28, 2013.

(51) Int. Cl.
*B62M 27/02*    (2006.01)

(52) U.S. Cl.
CPC ........ *B62M 27/02* (2013.01); *B62M 2027/026* (2013.01); *Y10T 29/49236* (2015.01)

(58) Field of Classification Search
CPC ........... A63C 5/08; B62D 55/06; B62D 55/07; B62M 27/00; B62M 27/02; B62M 2027/023; B62M 2027/025; B62M 2027/026; B62M 2027/028; B60G 11/265; B60G 2202/24; B60G 2202/30; B60G 2202/41; B60G 2202/412; B60G 2202/413; B60G 2206/41; B60G 2206/42; B60G 2300/322
See application file for complete search history.

(56) References Cited

U.S. PATENT DOCUMENTS

| | | | |
|---|---|---|---|
| 2,152,938 A | 4/1939 | Welch |
| 2,206,970 A | 7/1940 | Megow |
| 2,791,919 A | 5/1957 | Wildhaber |
| 2,907,578 A | 10/1959 | Taber |
| 3,567,243 A | 3/1971 | Ruhlin |
| 3,652,104 A | 3/1972 | Chabek |
| 3,711,113 A | 1/1973 | Stammreich |
| 3,751,061 A | 8/1973 | Scheuerpflug |

(Continued)

FOREIGN PATENT DOCUMENTS

| | | |
|---|---|---|
| DE | 9411004 U1 | 8/1994 |
| DE | 10007658 A1 | 10/2001 |

(Continued)

*Primary Examiner* — Kevin Hurley
(74) *Attorney, Agent, or Firm* — Brian M. Kaufman; Robert D. Atkins; Patent Law Group: Atkins and Associates, P.C.

(57) ABSTRACT

A snowmobile has a snowmobile body and an arm assembly pivotally coupled to the snowmobile body. The arm assembly is configured to pivot on an axis through the snowmobile body. A first hydraulic actuator has a first end coupled to the snowmobile body and a second end coupled to the arm assembly. A hydraulic system is coupled to the first hydraulic actuator. The hydraulic system includes a hydraulic pump in fluid communication with the first hydraulic actuator. A hydraulic valve is coupled between the hydraulic pump and first hydraulic actuator. An axle is disposed through the first end of the first hydraulic actuator. The axle includes a hydraulic pathway through the axle coupled between the hydraulic system and first hydraulic actuator. The hydraulic system is configured to operate the first hydraulic actuator. A second hydraulic actuator is coupled to the first hydraulic actuator.

25 Claims, 25 Drawing Sheets

(56) References Cited

U.S. PATENT DOCUMENTS

| | | | | |
|---|---|---|---|---|
| 3,765,498 | A * | 10/1973 | Rogerson | B62M 27/02 180/182 |
| 3,863,727 | A | 2/1975 | Michrina | |
| 3,974,890 | A * | 8/1976 | Noble | B62M 27/02 180/193 |
| 3,977,485 | A * | 8/1976 | West | B62B 17/04 180/186 |
| 4,244,241 | A | 1/1981 | Treadwell | |
| 4,364,447 | A * | 12/1982 | Yoshida | B62B 13/10 180/182 |
| 4,374,591 | A * | 2/1983 | Kobayashi | B62B 17/04 280/21.1 |
| 4,546,997 | A | 10/1985 | Smyers | |
| 4,591,173 | A * | 5/1986 | Marier | B62B 13/10 180/190 |
| 4,593,921 | A * | 6/1986 | Marier | B62B 17/04 280/124.127 |
| 4,700,972 | A | 10/1987 | Young | |
| 4,716,732 | A * | 1/1988 | Tordoff | B60T 11/30 60/546 |
| 4,723,464 | A | 2/1988 | Welschof et al. | |
| 4,826,184 | A | 5/1989 | Kuehmchel et al. | |
| 4,826,206 | A | 5/1989 | Immega | |
| 4,836,051 | A | 6/1989 | Guimbretiere | |
| 4,840,087 | A | 6/1989 | Welschof et al. | |
| 4,927,169 | A | 5/1990 | Scaduto | |
| 5,041,069 | A | 8/1991 | Horst | |
| 5,162,026 | A | 11/1992 | Krisher | |
| 5,286,052 | A | 2/1994 | Lukianov | |
| 5,324,056 | A | 6/1994 | Orton | |
| 5,346,241 | A | 9/1994 | Lee | |
| 5,372,377 | A | 12/1994 | Lee | |
| 5,396,973 | A * | 3/1995 | Schwemmer | F16F 9/38 188/266.2 |
| 5,435,193 | A | 7/1995 | Halliday | |
| 5,435,408 | A * | 7/1995 | Sekinobu | B62M 27/02 180/184 |
| 5,435,591 | A | 7/1995 | Lee | |
| 5,498,020 | A | 3/1996 | Lee | |
| 5,580,089 | A | 12/1996 | Kolka | |
| 5,620,199 | A | 4/1997 | Lee | |
| 5,664,649 | A * | 9/1997 | Thompson | F16F 9/46 180/193 |
| 5,700,025 | A | 12/1997 | Lee | |
| 5,704,868 | A | 1/1998 | Lindsey et al. | |
| 5,782,484 | A | 7/1998 | Kuhn, Jr. | |
| 5,916,052 | A | 6/1999 | Dick | |
| 5,916,055 | A | 6/1999 | Wormbaecher | |
| 6,039,337 | A | 3/2000 | Urbach | |
| 6,170,838 | B1 | 1/2001 | Laurent et al. | |
| 6,182,979 | B1 | 2/2001 | Lee | |
| 6,250,649 | B1 | 6/2001 | Braun | |
| 6,261,184 | B1 | 7/2001 | Jacob et al. | |
| 6,267,387 | B1 | 7/2001 | Weiss | |
| 6,279,920 | B1 | 8/2001 | Choudhery | |
| 6,354,389 | B1 * | 3/2002 | Zaczkowski | B62D 55/07 180/193 |
| 6,386,553 | B2 | 5/2002 | Zetterstrom | |
| 6,406,036 | B1 | 6/2002 | Laurent et al. | |
| 6,805,362 | B1 | 10/2004 | Melcher | |
| 6,896,637 | B2 | 5/2005 | Krude et al. | |
| 6,960,148 | B2 | 11/2005 | Fuchs et al. | |
| 7,001,302 | B2 | 2/2006 | Wachter et al. | |
| 7,011,594 | B2 | 3/2006 | Krude et al. | |
| 7,014,004 | B2 | 3/2006 | Etou | |
| 7,131,650 | B2 | 11/2006 | Melcher | |
| 7,234,708 | B2 | 6/2007 | Blondelet et al. | |
| 7,252,616 | B2 | 8/2007 | Wormsbaecher | |
| 7,322,435 | B2 * | 1/2008 | Lillbacka | B60G 15/12 180/193 |
| 7,343,997 | B1 | 3/2008 | Matthies | |
| 7,802,800 | B2 | 9/2010 | Melcher | |
| 7,931,286 | B2 | 4/2011 | Melcher | |
| 8,387,740 | B2 | 3/2013 | Melcher | |
| 8,827,291 | B2 * | 9/2014 | Cronquist | B62B 17/04 180/190 |
| 9,145,037 | B2 * | 9/2015 | Hawksworth | B60G 17/0272 |
| 2008/0258415 | A1 | 10/2008 | Melcher | |
| 2010/0292016 | A1 | 11/2010 | Wormsbaecher et al. | |
| 2012/0098225 | A1 | 4/2012 | Lucas | |

FOREIGN PATENT DOCUMENTS

| | | | |
|---|---|---|---|
| FR | 2121813 | | 8/1972 |
| GB | 2155410 | A | 9/1985 |
| JP | 01311907 | | 12/1989 |
| JP | 03279010 | | 12/1991 |
| JP | 05085133 | | 4/1993 |
| JP | 06064438 | | 3/1994 |
| WO | 9515865 | | 6/1995 |
| WO | 9637375 | | 11/1996 |
| WO | 9849023 | | 11/1998 |
| WO | 0038939 | | 7/2000 |
| WO | 0258949 | A1 | 1/2002 |
| WO | 2004098916 | A1 | 11/2004 |

* cited by examiner

US 9,545,976 B2

SNOWMOBILE WITH LEANING CAPABILITY

CLAIM TO DOMESTIC PRIORITY

The present patent application claims the benefit of U.S. Provisional Application No. 61/770,851, filed Feb. 28, 2013, which application is incorporated herein by reference.

FIELD OF THE INVENTION

The present invention relates in general to snowmobiles and, more specifically, to a snowmobile with leaning capability.

BACKGROUND OF THE INVENTION

Snowmobiles are a common mode of transportation in the northernmost and southernmost regions of Earth where snow generally covers the ground all winter. Snowmobiles provide increased mobility to isolated communities by allowing people to travel great distances efficiently. In some communities, mobility is greater in the winter months than in the summer months because snowmobiles allow travel over snowy terrain where there is no reliable path when the snow melts in the summer. Snowmobiles have a profound impact in North America. The economic impact of snowmobiles in Canada and the United states is estimated at $34 billion each year. Snowmobiles provide the only source of income for some remote towns which rely on winter tourism. There are over 230,000 miles of developed snowmobile trails in North America.

Snowmobiles were originally intended as a winter utility vehicle that could be used where other vehicles could not go. Hunters and workers used snowmobiles to transport personnel and materials across snow-covered land and frozen lakes and rivers. Today, snowmobiles are also used for recreational purposes. Riders use snowmobiles for various types of racing, mountain climbing, and freestyle competitions wherein riders perform tricks while riding snowmobiles. Today, higher powered snowmobiles can reach speeds of 150 miles per hour (MPH), while drag racing snowmobiles can reach speeds of 200 MPH.

Snowmobiles turn by modifying the angle of the skis to force the snowmobile track to turn. Turning a snowmobile without leaning capability is unsafe because the skis dig into the snow to force the track one way or the other. When snowmobile skis dig into the snow to turn the snowmobile, centrifugal force can easily cause the snowmobile to roll. Fighting against centrifugal force rolling a snowmobile requires the rider to throw significant body weight in the opposite direction.

Snowmobiles are propelled by a continuous track or tracks at the rear driven by an engine. Snowmobiles have skis at the front to provide directional control. When the skis are angled left or right, the snowmobile is pushed in the direction the skis are angled by friction between the skis and the ground. The angle of a snowmobile's skis are controlled by a rider rotating a handlebar.

One goal of snowmobile manufacturers is to improve the performance of snowmobiles through technological advances. For example, snowmobiles can be designed to move faster, handle better through turns, or be easier to use. Manufacturers also strive to make snowmobiles as safe as possible. As a result of a snowmobile's inherent maneuverability, acceleration, and high-speed abilities, both skill and physical strength are required to operate a snowmobile. Losing control of a snowmobile can easily cause extensive property damage, injury, or death.

One way to improve the safety and performance of snowmobiles is by allowing the snowmobile to lean while turning. Previous attempts to create a snowmobile with leaning capability have failed because the mechanism for leaning the suspension is attached to the sprung mass of the snowmobile. Leaning vehicles use hydraulic shock absorbers that have a feeding tube coupled to the side of the shock. The feeding tube limits the range of motion of the hydraulic shocks used in leaning vehicles which limits the range of leaning a vehicle. The feeding tube is also an extra moving part that can experience wear and tear.

SUMMARY OF THE INVENTION

A need exists to improve the safety and ease of use of snowmobiles. Accordingly, in one embodiment, the present invention is a snowmobile comprising a snowmobile body and an arm assembly pivotally coupled to the snowmobile body. A hydraulic actuator includes a first end coupled to the snowmobile body and a second end coupled to the arm assembly. A hydraulic system is coupled to the hydraulic actuator.

In another embodiment, the present invention is a snowmobile comprising a snowmobile body and an arm assembly pivotally coupled to the snowmobile body. A hydraulic system is disposed on the arm assembly.

In another embodiment, the present invention is a method of making a snowmobile comprising the steps of providing a snowmobile body, disposing an arm assembly over the snowmobile body with the arm assembly configured to pivot on an axis through the snowmobile body, and disposing a hydraulic system on the arm assembly.

In another embodiment, the present invention is a hydraulic system comprising an axle including a hydraulic pathway into the axle. A first hydraulic actuator is configured to rotate around the axle.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1A:
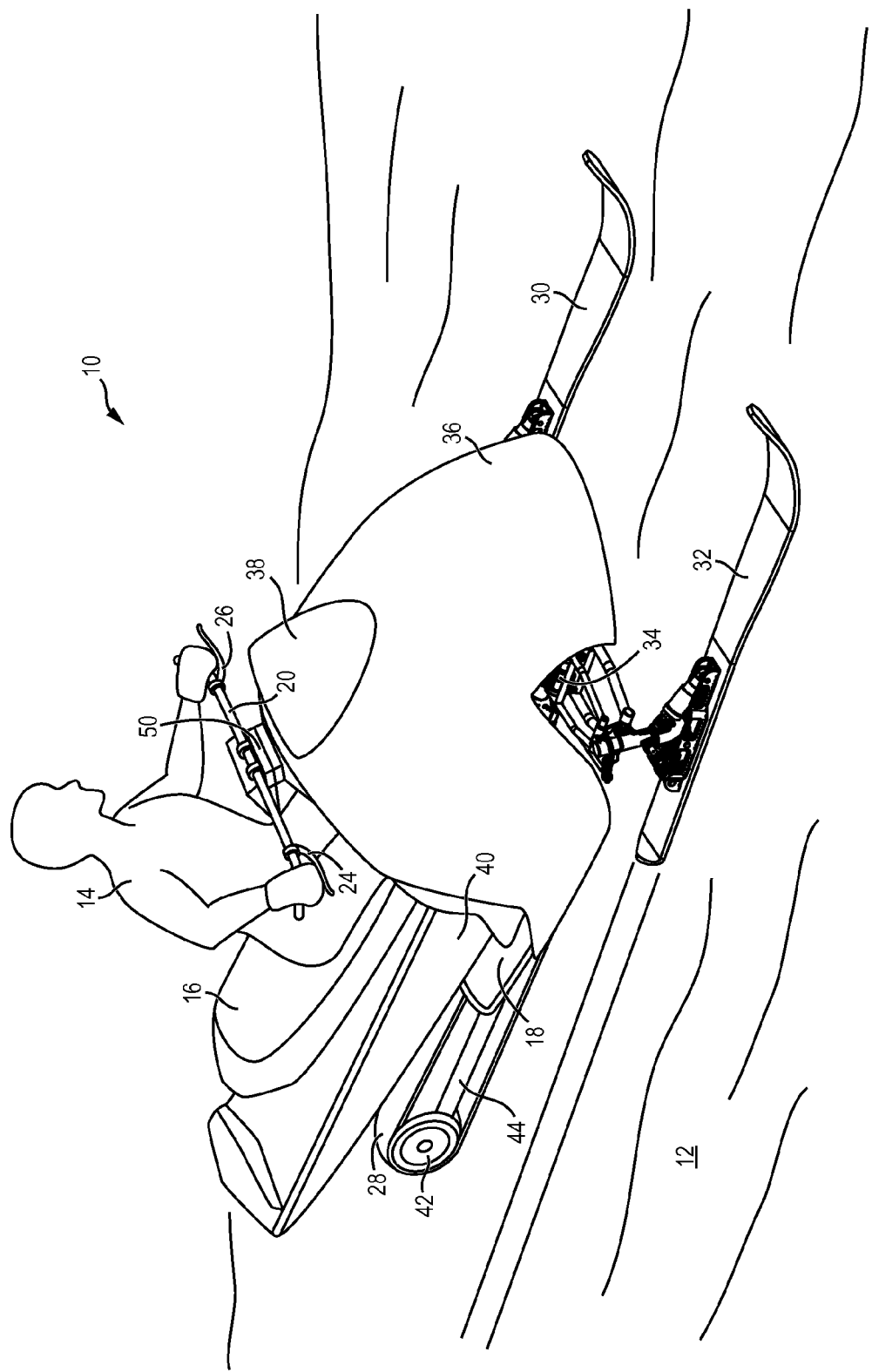
FIGS. 1a-1f illustrate a snowmobile with leaning capability.

FIG. 1a illustrates a snowmobile 10 with leaning capability travelling in a straight line on horizontal terrain 12. Snowmobile 10 is a land vehicle which travels on terrain 12, covered in snow and ice, where other types of vehicles are unable to travel. Snowmobile 10 is used as a utility vehicle by hunters and workers, and for recreational purposes. A rider 14 sits on seat 16 to operate snowmobile 10. Snowmobile 10 is operated with rider 14 resting his feet on running boards 18 and gripping handlebar 20 with his hands. Rider 14 steers snowmobile 10 by rotating handlebar 20. Rider 14 controls the velocity of snowmobile 10 by pulling throttle lever 24 to accelerate or pulling brake lever 26 to slow down and stop. Throttle lever 24 and brake lever 26 are attached to opposite sides of handlebar 20. Other major components of snowmobile 10 include track 28, skis 30 and 32, suspension 34, an engine, hood 36, windshield 38, and snowmobile body 40. Snowmobile body 40 acts as a frame for snowmobile 10. Track 28 is mounted under snowmobile body 40. Seat 16 is mounted above snowmobile body 40. Suspension 34 is mounted to the front of snowmobile body 40.

Track 28 supports the rear end of snowmobile 10 and provides the snowmobile with grip on terrain 12. Track 28 is a closed loop driven by the engine around a series of guide wheels 42 and slide rail 44. Snowmobile 10 includes guide wheels 42 in pairs connected by an axle across track 28 to support both the left side and right side of the track. The large surface area and roughness of track 28 give the track good grip on snow and ice. Sharp studs sink a short distance into terrain 12 to further improve grip. As the engine drives track 28 around guide wheels 42 and slide rail 44, friction between the track and terrain 12 propels snowmobile 10 forward or backward. The direction track 28 travels around guide wheels 42 and slide rail 44 determines the direction snowmobile 10 will travel. If the bottom of track 28 is moving from the front of snowmobile 10 to the back of the snowmobile, the snowmobile will be propelled forward. If the bottom of track 28 is moving from the back of snowmobile 10 to the front of the snowmobile, the snowmobile will be propelled backward.

Track 28 is rounded laterally such that when snowmobile 10 is in the neutral position, i.e., not leaning one way or the other, the center of the track is at a lower point than the left and right sides of the track. Track 28 is at a fixed angle with respect to snowmobile body 40. When snowmobile body 40 is leaned, track 28 is leaned with the snowmobile body. The roundness of track 28 reduces the work load of leaning snowmobile 10. With a flat track, leaning snowmobile 10 lifts the bottom surface of the track off terrain 12. With rounded track 28, snowmobile body 40 rolls left and right on the curvature of the track. Rounded track 28 also ensures a portion of the track is parallel with terrain 12 at the various lean angles of snowmobile 10. Track 28 grips terrain 12 best near the location where the track and terrain are parallel because the coefficient of friction between the track and terrain is highest. Track 28 grips terrain 12 where the track is parallel to the terrain. Track 28 also digs a short distance into terrain 12 so that a larger width of the track is contacting the terrain.

Left ski 30 and right ski 32 are attached to suspension 34 and support the front end of snowmobile 10. Skis 30 and 32 include a flat surface on the bottom of the skis to slide across terrain 12. Skis 30 and 32 are used to change the direction snowmobile 10 is travelling in response to steering by rider 14. When rider 14 rotates handlebar 20 to steer, the rotation is transferred down to suspension 34, which rotates ski 30 and ski 32 accordingly. When snowmobile 10 is moving forward, the angle of skis 30 and 32 causes the front end of the snowmobile to turn in the direction the skis are pointing. The leaning capability of snowmobile 10 allows for the use of longer skis 30 and 32 compared to the skis used on a snowmobile without leaning capability. Leaning snowmobile 10 causes skis 30 and 32 to travel on terrain 12 similar to a downhill skier. Because skis 30 and 32 travel across terrain 12 as a downhill skier's skis would, longer downhill skis are used instead of the shorter skis used on snowmobiles without leaning capability.

Rider 14 controls the leaning capability of snowmobile 10 by applying a vertical force to handlebar 20. To lean snowmobile 10 left, rider 14 applies an upward force on the right side of handlebar 20 and a downward force on the left side of the handlebar. To lean snowmobile 10 right, rider 14 applies a downward force on the right side of handlebar 20 and an upward force on the left side of the handlebar. Biasing block 50, mounted under handlebar 20, detects the vertical force applied by rider 14 to the handlebar. Biasing block 50 signals to suspension 34 the amount of force detected, and the suspension changes the position of skis 30 and 32 to lean snowmobile 10 accordingly.

Snowmobile 10 applies a configurable gain to the detected force on handlebar 20 when calculating the roll rate, i.e., how fast to lean the snowmobile. A higher gain means less force is required on handlebar 20 to achieve a given roll rate of snowmobile 10. A lower gain means rider 14 exerts more force for the same roll rate of snowmobile 10. A smaller rider 14 increases the gain to receive more assistance from suspension 34 in executing a lean of snowmobile 10.

The leaning capability of snowmobile 10 is beneficial to both safety and ease of use. Leaning snowmobile 10 allows rider 14 to easily shift weight to counteract the centrifugal forces on the snowmobile during turns. Rider 14 shifts personal body weight, as well as the weight of snowmobile body 40. Leaning snowmobile 10 allows rider 14 to shift enough weight to safely operate the snowmobile even if the rider is too light to safely operate a snowmobile without leaning capability. The leaning capability of snowmobile 10 allows rider 14 to remain stable while travelling perpendicular to a slope of terrain 12. To remain stable, rider 14 leans snowmobile 10 so a center line of snowmobile body 40 remains vertical with respect to gravity as terrain 12 varies. Leaning snowmobile 10 makes turning safer because skis 30 and 32 glide on an edge of the skis to pull track 28 one direction or the other instead of digging into the snow to force the snowmobile to turn.

Snowmobile 10 also includes modes to control the leaning capability automatically. For example, snowmobile 10 includes a setting to automatically keep snowmobile body 40 at a vertical orientation with respect to gravity. The vertical orientation of snowmobile body 40 provides rider 14 with steady support and helps the rider retain balance. When set to remain vertical, snowmobile 10 uses gyroscopes and accelerometers to sense the orientation of snowmobile body 40 with respect to gravity and automatically keeps the snowmobile body vertical as terrain 12 changes.

Hood 36 is made of rigid plastic and protects the engine, suspension 34, and other internal parts from environmental hazards. Windshield 38 is made of transparent plastic and is positioned above hood 36. Windshield 38 redirects airflow as snowmobile 10 travels forward to reduce the impact of cold air on rider 14.

Figure 1B:
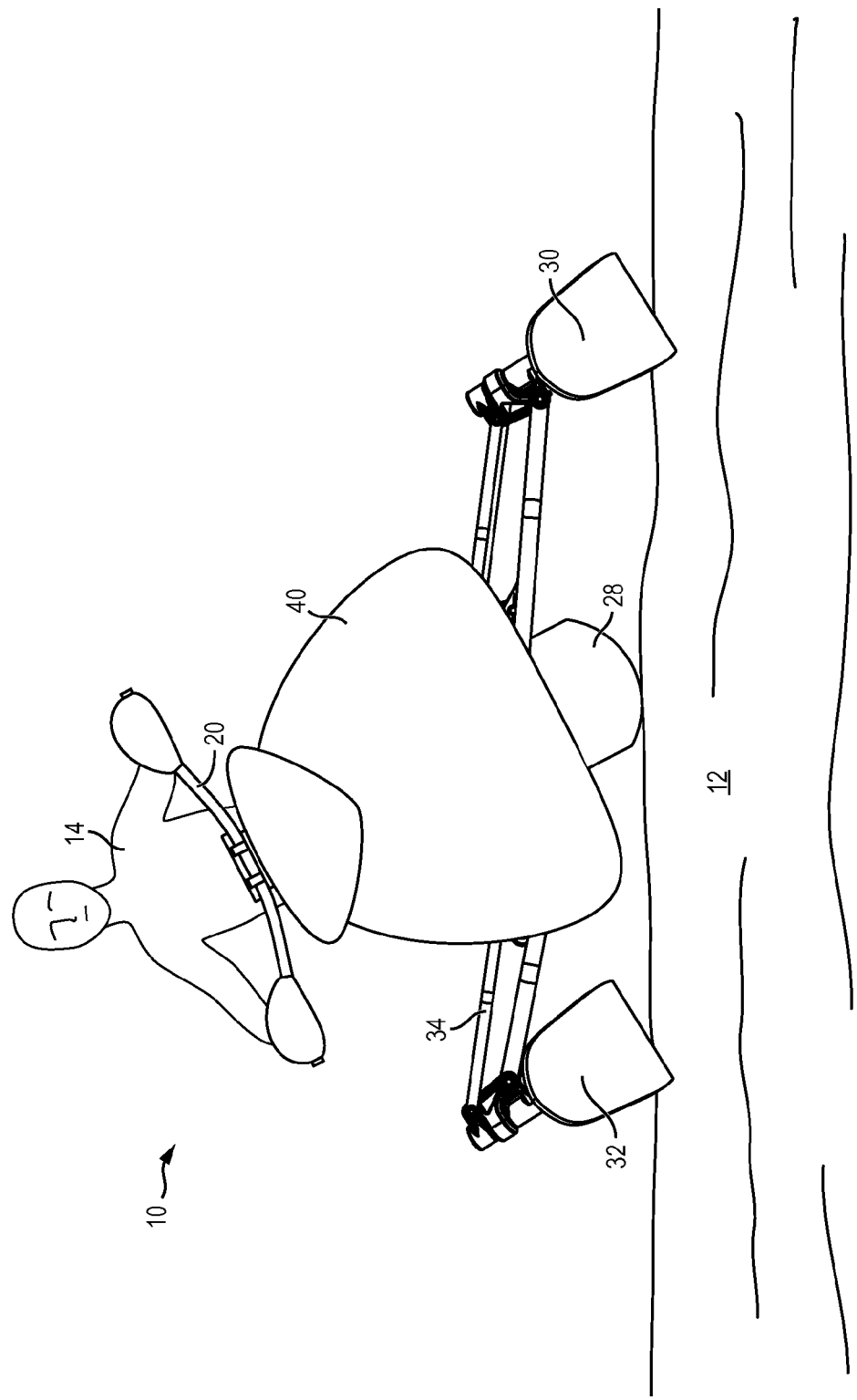

FIG. 1b illustrates a front view of snowmobile 10 while rider 14 is leaning the snowmobile right to turn right on horizontal terrain 12. Ski 30 has been extended by suspension 34 to lift the left side of snowmobile body 40. Ski 32 has been raised by suspension 34 to lower the right side of snowmobile body 40. Snowmobile 10 is turning toward ski 32 and experiencing centrifugal force pushing the snowmobile toward ski 30. Centrifugal force on snowmobile 10 will roll the snowmobile over ski 30 if the centrifugal force is strong enough to overcome the gravitational force on the snowmobile. Leaning snowmobile 10 into a turn gives the force of gravity a higher torque value by moving the center of gravity of the snowmobile away from the axis of rotation, i.e., ski 30. The higher torque value of gravitational force reduces the chance of snowmobile 10 rolling when leaning into a turn.

Skis 30 and 32 are leaned at approximately the same angle as snowmobile body 40. Leaning skis 30 and 32 allows snowmobile 10 to ride on the edges of the skis like a downhill skier. The angle of skis 30 and 32 reduces the amount snowmobile 10 slides laterally during a turn due to centrifugal force. The angle of skis 30 and 32 keeps the outside edge of ski 30 from digging into terrain 12, reducing the chance of flipping snowmobile 10.

Track 28 is curved laterally such that the bottom surface of the track is concave up toward snowmobile body 40. The center of track 28 is lower than the left or right side of the track when snowmobile 10 is in the neutral position. Track 28 is at a fixed angle with respect to snowmobile body 40. When snowmobile body 40 is leaned, track 28 is leaned with the snowmobile body. The curvature of track 28 reduces the work load of leaning snowmobile 10. With a flat track 28, leaning snowmobile 10 lifts the track off terrain 12. With curved track 28, snowmobile body 40 rolls left and right on the curvature of the track. Curved track 28 also ensures a portion of the track is parallel with terrain 12 at the various lean angles of snowmobile 10. Track 28 grips terrain 12 best near the location where the track and terrain are parallel because the coefficient of friction between the track and terrain is highest.

Figure 1C:
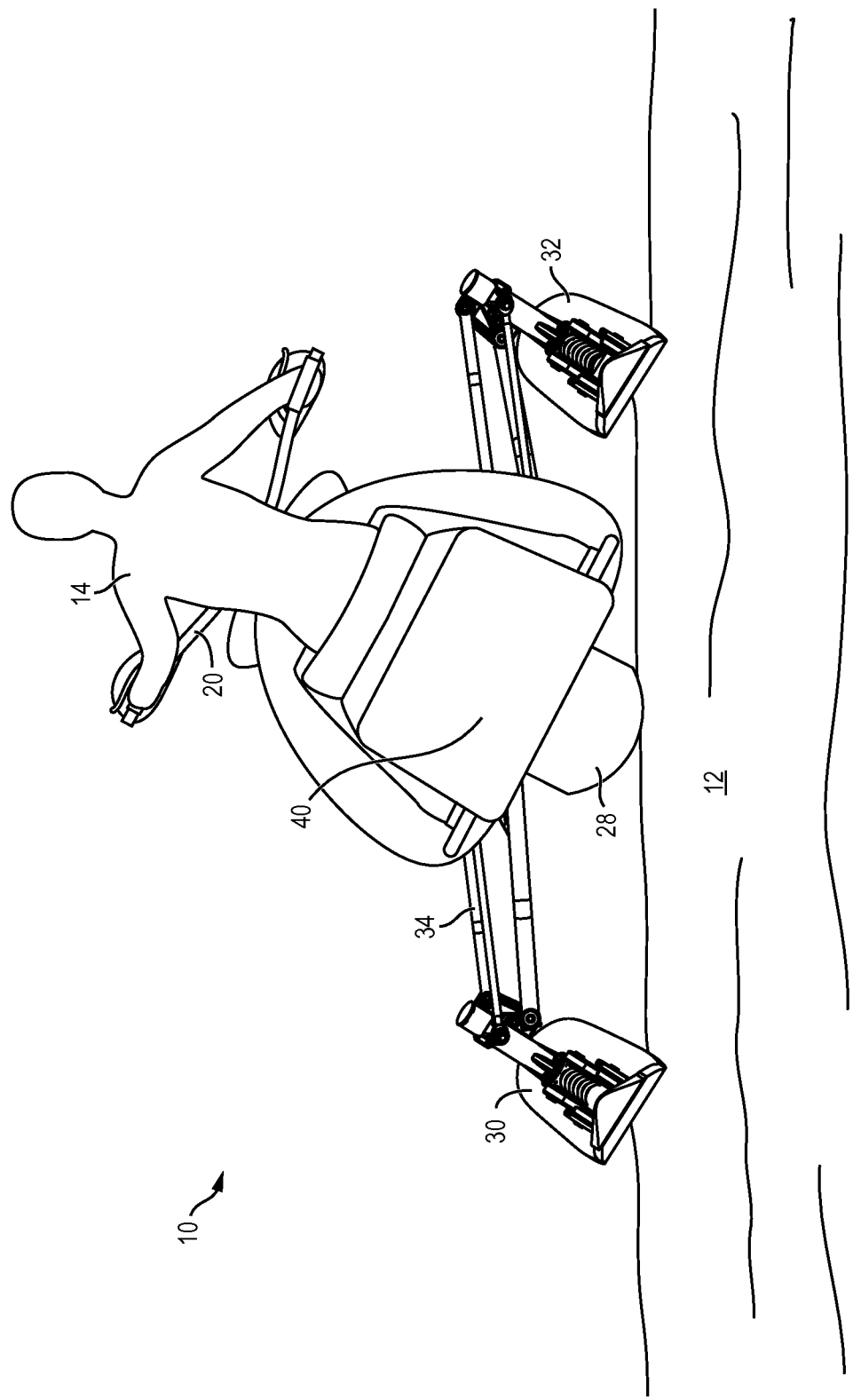

FIG. 1c illustrates a back view of snowmobile 10 while rider 14 is leaning the snowmobile right to turn right on horizontal terrain. Ski 30 has been extended to lift the left side of snowmobile body 40. Ski 32 has been raised by suspension 34 to lower the right side of snowmobile body 40. Snowmobile 10 is turning toward ski 32 and experiencing centrifugal force toward ski 30. Centrifugal force on snowmobile 10 will roll the snowmobile over ski 30 if the centrifugal force is strong enough to overcome the gravitational force on the snowmobile. Leaning snowmobile 10 into a turn gives the force of gravity a higher torque value by moving the center of gravity of the snowmobile away from the axis of rotation, i.e., ski 30. The higher torque value of gravitational force reduces the chance of snowmobile 10 rolling when leaning into a turn.

Skis 30 and 32 are leaned at approximately the same angle as snowmobile body 40. Leaning skis 30 and 32 allows snowmobile 10 to ride on the edges of the skis like a downhill skier. The angle of skis 30 and 32 reduces the amount that snowmobile 10 slides laterally during a turn due to centrifugal force. The angle of ski 30 reduces the chance of rolling snowmobile 10 over the ski by keeping the outside edge of the ski from catching on terrain 12.

Track 28 is mounted under snowmobile body 40 and is leaned with the snowmobile body. Track 28 is rounded laterally so that a portion of the track remains parallel to terrain 12 during the turn.

Figure 1D:
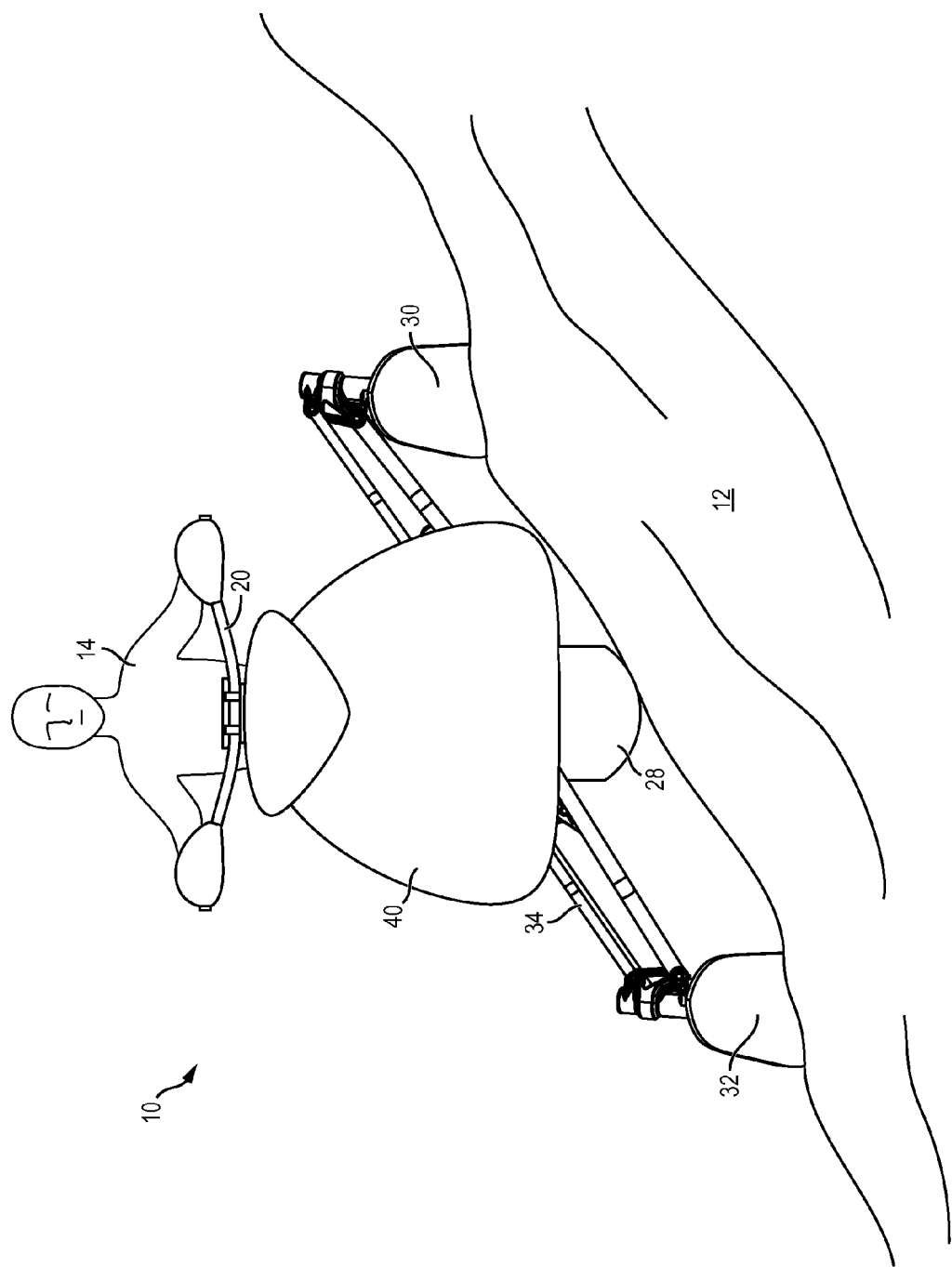

FIG. 1d illustrates a front view of snowmobile 10 leaning left to keep a center line of snowmobile body 40 vertical with respect to gravity. Rider 14 is steering snowmobile 10 in a straight line perpendicular to a slope of terrain 12. Rider 14 applies pressure to handlebar 20 to keep a center line of snowmobile body 40 vertical with respect to gravity. Alternatively, rider 14 has set snowmobile 10 to automatically keep snowmobile body 40 vertical with respect to gravity. Suspension 34 has raised ski 30 to account for the higher level of terrain 12 on the left side of snowmobile 10. Suspension 34 has lowered ski 32 to account for the lower level of terrain 12 on the right side of snowmobile 10. Skis 30 and 32 lean with snowmobile body 40 to remain horizontal with respect to gravity. The angle of skis 30 and 32 help snowmobile 10 travel on sloped terrain 12 by reducing the chance of the snowmobile sliding downhill on the smooth bottoms of the skis. The angle of skis 30 and 32 keep the downhill edges of ski 32 off of terrain 12, reducing the chance that snowmobile 10 will roll downhill. Track 28 retains the same angle as snowmobile body 40. Track 28 has a portion parallel to terrain 12 to improve grip with the terrain.

Figure 1E:
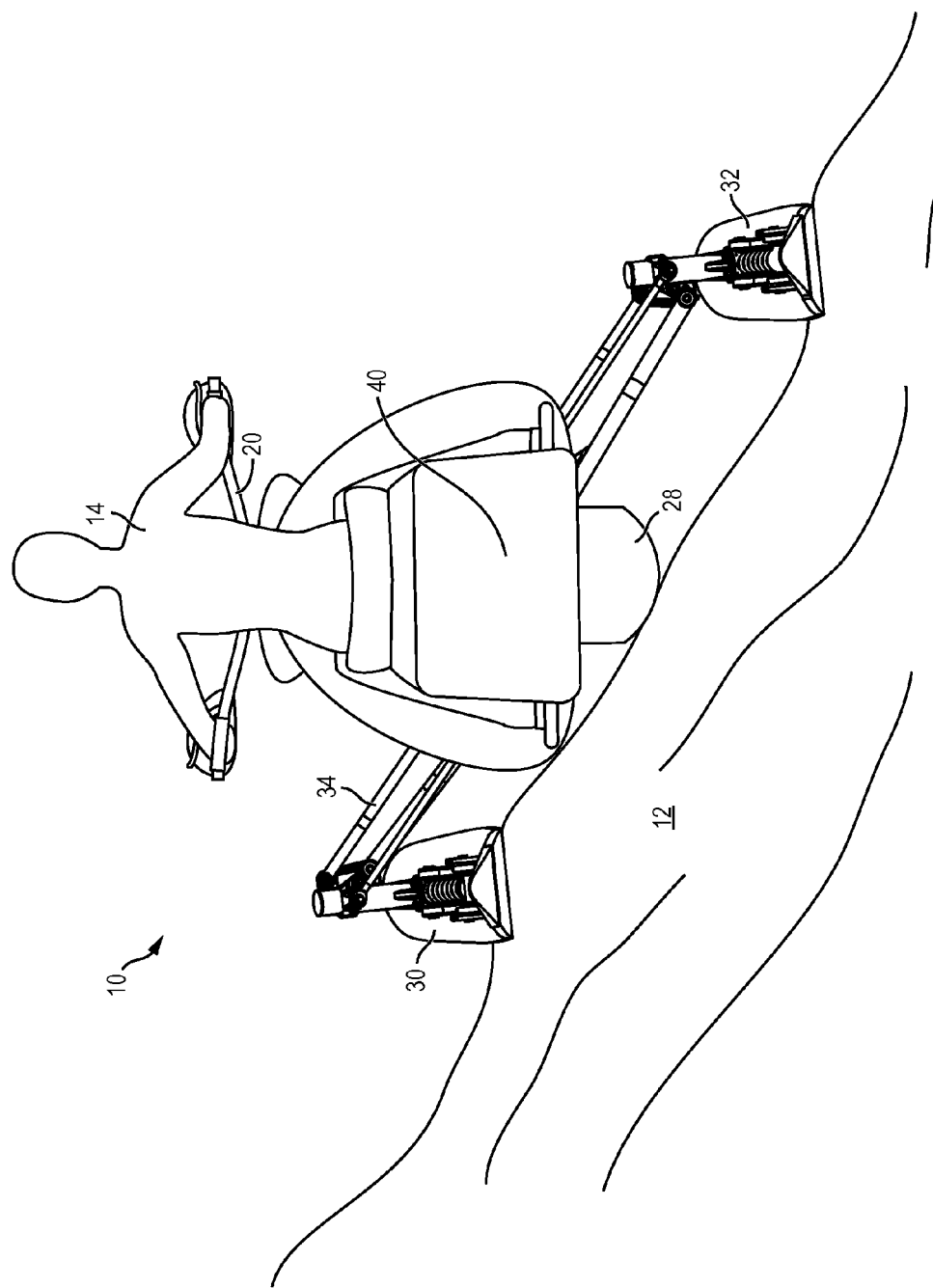

FIG. 1e illustrates a back view of snowmobile 10 leaning left to keep a center line of snowmobile body 40 vertical with respect to gravity. Rider 14 is steering snowmobile 10 in a straight line perpendicular to a slope of terrain 12. Rider 14 applies pressure to handlebar 20 to keep a center line of snowmobile body 40 vertical with respect to gravity. Suspension 34 has raised ski 30 to account for the higher level of terrain 12 on the left side of snowmobile 10. Suspension 34 has lowered ski 32 to account for the lower level of terrain 12 on the right side of snowmobile 10. Skis 30 and 32 lean with snowmobile body 40 and remain horizontal with respect to gravity. The angle of skis 30 and 32 help snowmobile 10 travel on sloped terrain 12 by reducing the chance of snowmobile 10 sliding downhill on the smooth bottoms of the skis. The angle of skis 30 and 32 keep the downhill edges of ski 32 off of terrain 12, reducing the chance that snowmobile 10 will roll downhill. Track 28 retains the same angle as snowmobile body 40. Track 28 has a portion parallel to terrain 12.

Figure 1F:
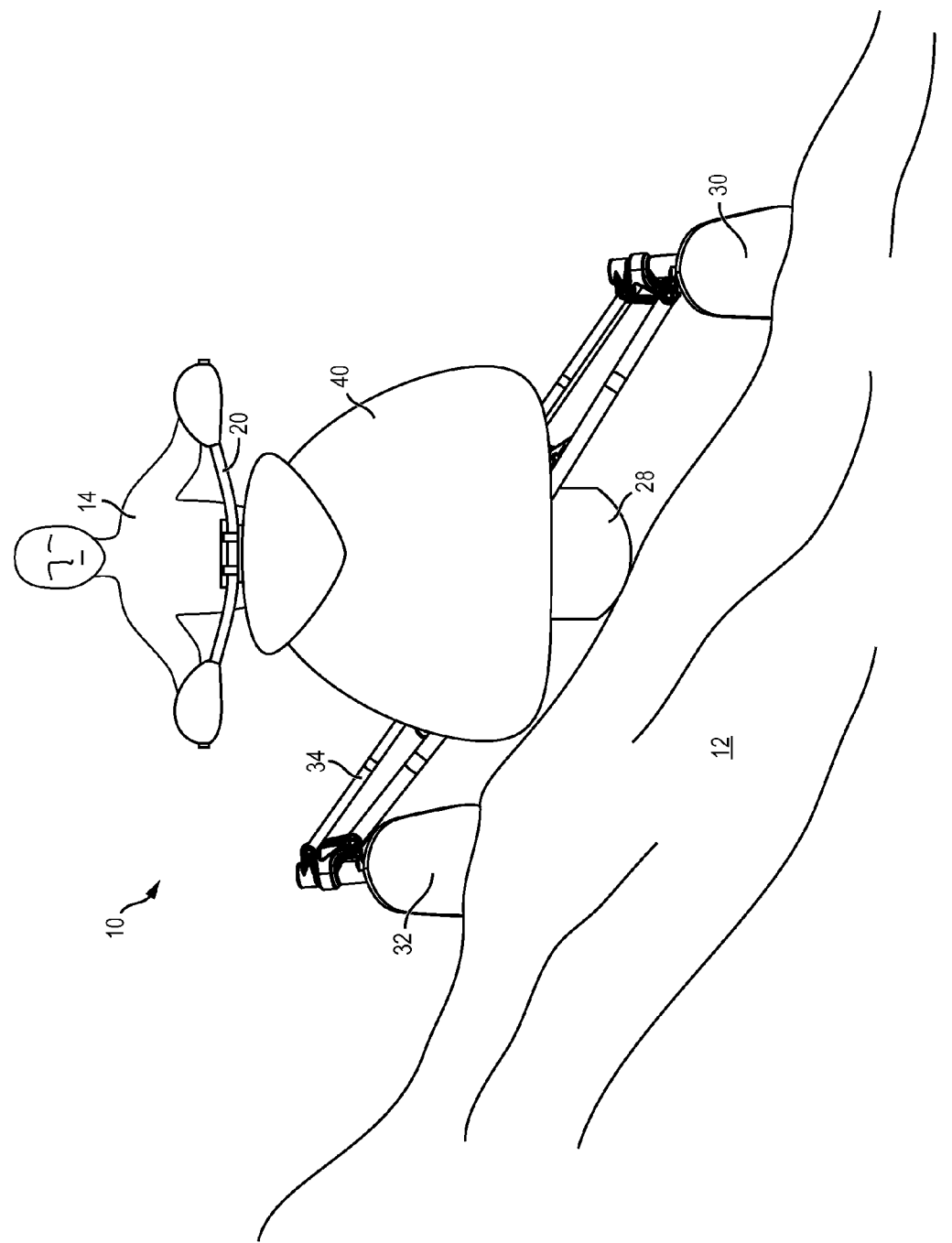

FIG. 1f illustrates a front view of snowmobile 10 leaning right to keep a center line of snowmobile body 40 vertical with respect to gravity. Rider 14 is steering snowmobile 10 in a straight line perpendicular to a slope of terrain 12. Rider 14 applies pressure to handlebar 20 to keep a center line of snowmobile body 40 vertical with respect to gravity. Suspension 34 has raised ski 32 to account for the higher level of terrain 12 on the right side of snowmobile 10. Suspension 34 has lowered ski 30 to account for the lower level of terrain 12 on the left side of snowmobile 10. Skis 30 and 32 lean with snowmobile body 40 and remain horizontal with respect to gravity. The angle of skis 30 and 32 help snowmobile 10 travel on sloped terrain 12 without sliding downhill on the smooth bottoms of the skis. The angle of skis 30 and 32 keeps the downhill edges of ski 30 off of terrain 12, reducing the chance that snowmobile 10 will roll downhill. Track 28 retains the same angle as snowmobile body 40. Track 28 has a portion parallel to terrain 12.

Figure 2A:
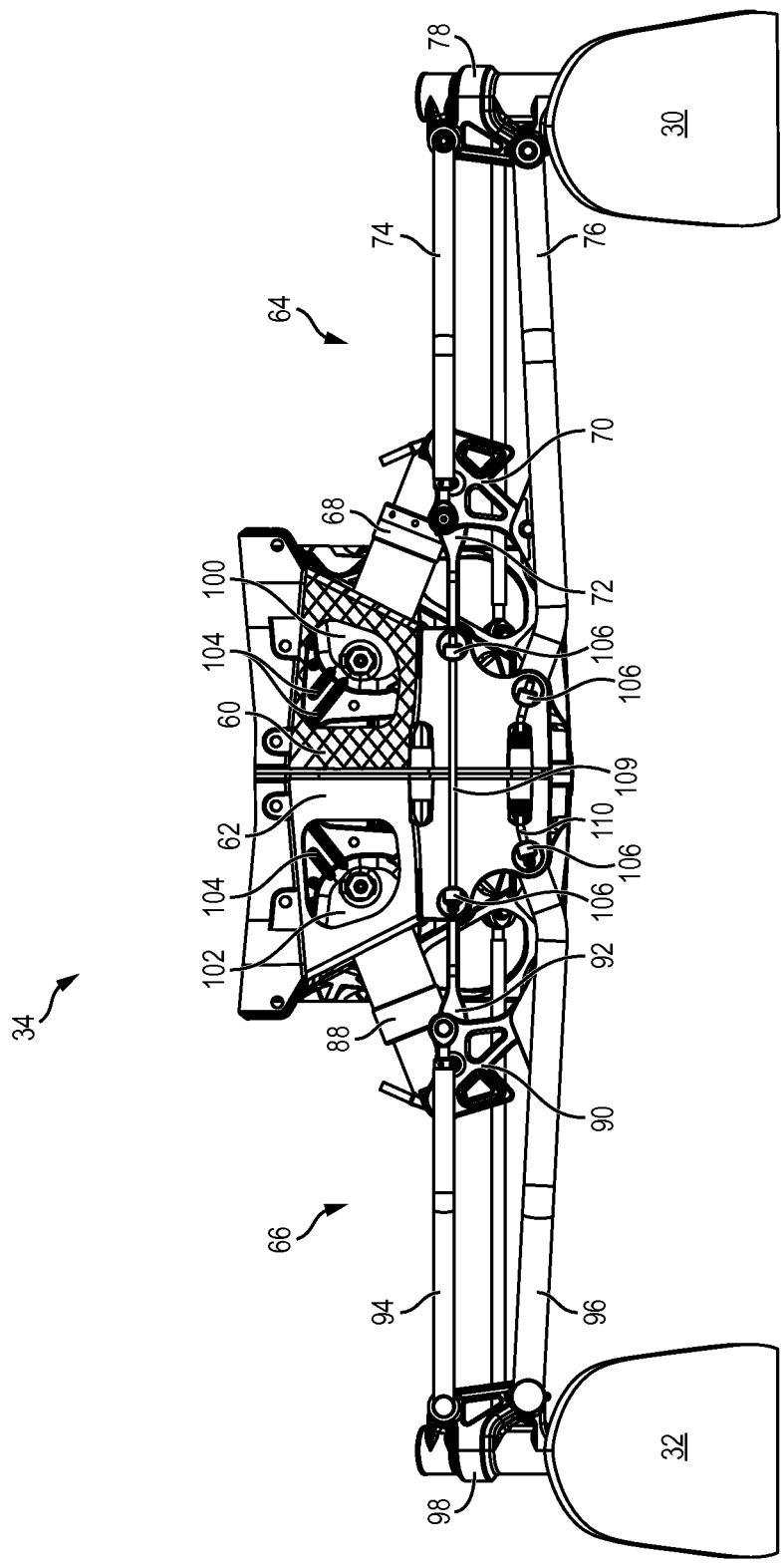
FIGS. 2a-2h illustrate a suspension for the snowmobile with leaning capability.

FIG. 2a illustrates suspension 34 viewed from the front side of the suspension. Suspension 34 is in the neutral position, i.e., not leaning one way or the other, with skis 30 and 32 attached. Suspension 34 includes casting 60, casting 62, arm assembly 64, and arm assembly 66. Castings 60 and 62 are mirror images and connected at the center of suspension 34 by nuts and bolts or other suitable means. Castings 60 and 62 include holes or other means to mount the castings onto snowmobile body 40.

Arm assembly 64 is pivotally connected to casting 60. The pivotal connection of arm assembly 64 to casting 60 means that the arm assembly rotates up or down, i.e., pivots, with respect to casting 60. Arm assembly 64 includes air spring shock 68, mechanism arms 70, control link 72, upper control arm 74, lower control arm 76, and spindle shaft housing 78. Control link 72 and lower control arm 76 are pivotally coupled to casting 60 and provide the pivotal connection to the casting for arm assembly 64. Control link 72 rotates around a horizontal axis between the front of casting 60 and the back of the casting. Control link 72 is coupled to casting 60 by two tie pieces inserted through the casting and into the control link at a point on the rotational axis. One tie piece is inserted through the front of casting 60, and one tie piece is inserted through the back of the casting. Lower control arm 76 rotates around a horizontal axis between the front of casting 60 and the back of the casting. Lower control arm 76 is coupled to casting 60 by two tie pieces inserted through casting 60 and into the lower control arm at a point on the rotational axis. One tie piece is inserted through the front of casting 60 into lower control arm 76, and one tie piece is inserted through the back of the casting into the lower control arm. The rotational axis of lower control arm 76 is below the rotational axis of control link 72. Arm assembly 64 includes mechanism arms 70 coupling control link 72 to lower control arm 76 some distance outboard from casting 60. Mechanism arms 70 are pivotally coupled to control link 72 and lower control arm 76. The coupling points of casting 60 and mechanism arms 70 to control link 72 and lower control arm 76 define a parallelogram shape. When arm assembly 64 rotates with respect to casting 60, control link 72 and lower control arm 76 pivot on casting 60 accordingly. As control link 72 and lower control arm 76 pivot, mechanism arms 70 keep the control link and lower control arm approximately parallel. When casting 60 is leaned by the leaning of snowmobile 10, mechanism arms 70 are leaned to approximately the same angle as the casting.

Arm assembly 64 includes upper control arm 74 pivotally coupled to mechanism arms 70 above lower control arm 76. Arm assembly 64 includes spindle shaft housing 78 coupling an outboard end of lower control arm 76 to an outboard end of upper control arm 74. Spindle shaft housing 78 is pivotally coupled to lower control arm 76 and upper control arm 74. The coupling points of mechanism arms 70 and spindle shaft housing 78 to upper control arm 74 and lower control arm 76 define a parallelogram shape. When arm assembly 64 pivots with respect to casting 60, lower control arm 76 pivots accordingly. When lower control arm 76 pivots, spindle shaft housing 78 moves accordingly. The movement of spindle shaft housing 78 rotates upper control arm 74 about the connection point between mechanism arms 70 and the upper control arm. When arm assembly 64 pivots on casting 60, mechanism arms 70 and spindle shaft housing 78 keep upper control arm 74 and lower control arm 76 approximately parallel. The parallelogram shape keeps spindle shaft housing 78 approximately parallel with the center of castings 60 and 62.

Arm assembly 64 includes air spring shock 68 coupled between casting 60 and mechanism arms 70. Air spring shock 68 includes an upper end disposed on an axle through casting 60. Air spring shock 68 includes a lower end disposed on an axle between mechanism arms 70. Air spring shock 68 actuates arm assembly 64 to rotate by hydraulically compressing or expanding. When air spring shock 68 compresses or expands to actuate arm assembly 64, the air spring shock rotates with respect to both casting 60 and mechanism arms 70. The axle through casting 60 and the upper end of air spring shock 68 includes a hydraulic pathway. Hydraulic fluid enters to expand, or leaves to compress, air spring shock 68 via the hydraulic pathway disposed through the axle. The hydraulic pathway through the axle provides air spring shock 68 with hydraulic coupling without hampering the range of motion of the air spring shock.

Ski 30 is mounted to arm assembly 64 under spindle shaft housing 78. Ski 30 is kept at approximately the same angle as spindle shaft housing 78. When arm assembly 64 is raised or lowered, the parallelogram shape between upper control arm 74 and lower control arm 76 keeps spindle shaft housing 78, and thus ski 30, leaned at approximately the same angle as casting 60.

Arm assembly 66 is pivotally connected to casting 62. Arm assembly 66 includes air spring shock 88, mechanism arms 90, control link 92, upper control arm 94, lower control arm 96, and spindle shaft housing 98. Control link 92 and lower control arm 96 are pivotally coupled to casting 62 and provide the pivotal connection for arm assembly 66. Control link 92 rotates around a horizontal axis between the front of casting 62 and the back of the casting. Control link 92 is coupled to casting 62 by two tie pieces inserted through the casting and into the control link at a point on the rotational axis. One tie piece is inserted through the front of casting 62, and one tie piece is inserted through the back of the casting. Lower control arm 96 rotates around a horizontal axis between the front of casting 62 and the back of the casting. Lower control arm 96 is coupled to casting 62 by two tie pieces inserted through the casting and into the lower control arm at a point on the rotational axis. One tie piece is inserted through the front of casting 62 into lower control arm 96, and one tie piece is inserted through the back of the casting into the lower control arm. The coupling point, i.e., rotational axis, of lower control arm 96 is below the coupling point of control link 92. Arm assembly 66 includes mechanism arms 90 coupling control link 92 to lower control arm 96 some distance outboard from casting 62. Mechanism arms 90 are pivotally coupled to control link 92 and lower control arm 96. The connections of casting 62 and mechanism arms 90 to control link 92 and lower control arm 96 define a parallelogram shape. When arm assembly 66 rotates with respect to casting 62, control link 92 and lower control arm 96 pivot on casting 62 accordingly. As control link 92 and lower control arm 96 pivot, mechanism arms 90 keep the control link and lower control arm approximately parallel. When casting 62 is leaned by the leaning of snowmobile 10, mechanism arms 90 are leaned at approximately the same angle as the casting.

Arm assembly 66 includes upper control arm 94 pivotally coupled to mechanism arms 90 above lower control arm 96. Arm assembly 66 includes spindle shaft housing 98 coupling an outboard end of lower control arm 96 to an outboard end of upper control arm 94. Spindle shaft housing 98 is pivotally coupled to lower control arm 96 and upper control arm 94. The connections of mechanism arms 90 and spindle shaft housing 98 to upper control arm 94 and lower control arm 96 define a parallelogram shape. When arm assembly 66 rotates with respect to casting 62, lower control arm 96 rotates accordingly. When lower control arm 96 rotates, spindle shaft housing 98 moves accordingly. The movement of spindle shaft housing 98 rotates, i.e., pivots, upper control arm 94 about the connection point between mechanism arms 90 and the upper control arm. When arm assembly 66 pivots on casting 62, mechanism arms 90 and spindle shaft housing 98 keep upper control arm 94 and lower control arm 96 approximately parallel. The parallelogram shape keeps spindle shaft housing 98 approximately parallel with the center of castings 60 and 62.

Arm assembly 66 includes air spring shock 88 coupled between casting 62 and mechanism arms 90. Air spring shock 88 includes an upper end disposed on an axle through casting 62. Air spring shock 88 includes a lower end disposed on an axle between mechanism arms 90. Air spring shock 88 actuates arm assembly 66 to rotate by hydraulically compressing or expanding. When air spring shock 88 compresses or expands to actuate arm assembly 66, the air spring shock rotates with respect to both casting 62 and mechanism arms 90. The axle through casting 62 and the upper end of air spring shock 88 includes a hydraulic pathway. Hydraulic fluid enters to expand, or leaves to compress, air spring shock 88 via the hydraulic pathway disposed through the axle.

Ski 32 is mounted to arm assembly 66 under spindle shaft housing 98. Ski 32 is leaned to approximately the same angle as spindle shaft housing 98. When arm assembly 66 is raised or lowered, the parallelogram shape between upper control arm 94 and lower control arm 96 keeps spindle shaft housing 98, and thus ski 32, leaned at approximately the same angle as casting 62.

Shock mount casting 100 is part of casting 60. Shock mount casting 102 is part of casting 62. Shock mount casting 100 is braced with struts 104 to withstand forces from air spring shock 68 as the air spring shock compresses and expands to actuate arm assembly 64. Shock mount casting 102 is braced with struts 104 to withstand forces from air spring shock 88 as the air spring shock compresses and expands to actuate arm assembly 66. Control link 72 and lower control arm 76 are pivotally connected to casting 60 with tie pieces 106. Control link 92 and lower control arm 96 are pivotally connected to casting 62 with tie pieces 106. Tie pieces 106 are inserted through the front and back of castings 60 and 62 and into lower control arms 76 and 96 and control links 72 and 92.

Suspension 34 includes structural rods 109 coupled between control link 72 and control link 92 via tie pieces 106. There is one structural rod 109 on the front of castings 60 and 62 and one structural rod 109 on the back side of the castings. Structural rods 110 are coupled between lower control arms 76 and 96 through tie pieces 106. There is one structural rod 110 on the front of castings 60 and 62 and one structural rod 110 on the back side of the castings. Structural rod 110 in front of castings 60 and 62 is bent to allow for the shape of the castings.

Arm assembly 66 is a mirror image of arm assembly 64. The parts of arm assembly 66 connect in the same way as corresponding parts on arm assembly 64. Arm assembly 64 includes control link 72 pivotally connected to casting 60. Control link 72 includes a hollow tube through an axis of rotation with casting 60. The hollow tube of control link 72 has an axle inserted through the control link. The axle is disposed through casting 60 and onto shafts of tie pieces 106. Tie pieces 106 are inserted through casting 60 and held into the axle by threads or other suitable means. Tie pieces 106 hold the axle in place between the front and back of casting 60. Sleeve bearings or bushings are disposed between the axle and the hollow tube of control link 72 to facilitate rotation of the control link around the axle. The hollow tube of control link 72 is disposed around the axle and sleeve bearings.

Arm assembly 64 includes lower control arm 76 pivotally connected to casting 60. Lower control arm 76 includes a hollow tube through the axis of rotation with casting 60. The hollow tube of lower control arm 76 has an axle disposed through it. The axle is disposed from the front of casting 60 to the back of the casting. The axle is held into place by tie pieces 106 inserted through casting 60 and disposed in the ends of the axle. Tie pieces 106 are held into the ends of the axle by a threaded connection or other suitable means. Sleeve bearings are disposed between the axle and the hollow tube of lower control arm 76 to facilitate rotation of the lower control arm around the axle. Lower control arm 76 is disposed around the axle and rotates around the axle when arm assembly 64 is actuated.

Arm assembly 64 includes mechanism arms 70 coupled between control link 72 and lower control arm 76. Mechanism arms 70 are coupled to the end of control link 72 opposite casting 60. Control link 72 includes a front arm and a rear arm coupled to mechanism arms 70. Mechanism arms 70 are coupled to the outside of the arms of control link 72, i.e., away from air spring shock 68. The arms of control link 72 are separately connected to a respective mechanism arm 70 by an axle inserted through a hole in the control link and a hole in the mechanism arm. The axles, through control link 72 and mechanism arms 70, include two separate pieces which are inserted through opposite sides of the connection point and mated by a threaded connection or other suitable means. Ball bearings are disposed between the axles and control link 72 to facilitate rotation of control link 72 with respect to mechanism arms 70. A sleeve bearing is disposed between the axles and mechanism arms 70.

Mechanism arms 70 are coupled to lower control arm 76 at a point on the lower control arm between the outboard and inboard ends of the lower control arm. The term outboard describes an element disposed away from the center of suspension 34. The term inboard describes an element disposed toward the center of suspension 34. An axle is disposed through holes in mechanism arms 70 and mounted to lower control arm by a clamping piece and screws or other suitable means. Mechanism arms 70 are disposed around the axle and between a front bar and rear bar of lower control arm 76. Sleeve bearings are inserted between the axle and mechanism arms 70 to reduce friction. A tube is disposed around the axle and between mechanism arms 70 to keep the mechanism arms pushed toward the ends of the axle. The tube is flanged at both ends to provide extra contact area between the tube and mechanism arms 70.

Upper control arm 74 includes an inboard end coupled to mechanism arms 70. A front bar of upper control arm 74 is coupled to the mechanism arm 70 in front of air spring shock 68 and a rear bar of the upper control arm is coupled to the mechanism arm behind the air spring shock. Mechanism arms 70 are coupled to upper control arm 74 between the front bar and rear bar of the upper control arm. Mechanism arms 70 include axles mated to holes in the mechanism arms. The axles extend from mechanism arms 70 through upper control arm 74. Sleeve bearings are disposed between the axles and upper control arm 74 to reduce friction.

Upper control arm 74 includes an outboard end coupled to spindle shaft housing 78. An axle is disposed between a front bar and rear bar of upper control arm 74 and through spindle shaft housing 78. The axle is held in place between the front bar and rear bar of upper control arm 74 by a bolt inserted through one side of the upper control arm screwed into a nut on the other side of the upper control arm. The axle allows spindle shaft housing 78 to pivot relative to upper control arm 74.

Lower control arm 76 includes an outboard end coupled to spindle shaft housing 78 below upper control arm 74. An axle is disposed between a front bar and rear bar of lower control arm 76 and through spindle shaft housing 78. The axle is held in place between the front bar and rear bar of lower control arm 76 by a bolt inserted through one side of the lower control arm screwed into a nut on the other side of the lower control arm. The axle allows spindle shaft housing 78 to pivot relative to lower control arm 76.

Air spring shock 68 includes a lower end coupled to an axle between mechanism arms 70. The axle is held between mechanism arms 70 by a shaft inserted through the mechanism arms and the axle. The shaft includes two pieces inserted through mechanism arms 70 and connected by corresponding threads on the two pieces of the shaft. A ball bearing is disposed between air spring shock 68 and the axle to reduce friction. A sleeve bearing could also be used.

Arm assembly 64 includes two mechanism arms 70 which straddle air spring shock 68. Arm assembly 66 includes two mechanism arms 90 which straddle air spring shock 88. Arm assemblies 64 and 66 use two mechanism arms 70 and 90, respectively, for added strength and durability. The lower end of air spring shock 68 is pivotally coupled to an axle between mechanism arms 70. The upper end of air spring shock 68 is pivotally coupled to an axle disposed between the front and back sides of shock mount casting 100. Air spring shock 88 is pivotally coupled to an axle between mechanism arms 90 and an axle between the front and back sides of shock mount casting 102.

Castings 60 and 62 act as structural support for the other parts of suspension 34. Castings 60 and 62 are mounted to snowmobile body 40 so when suspension 34 executes a lean, snowmobile 10 leans with the suspension. Castings 60 and 62 are the same as on a snowmobile manufacturer's standard suspensions so suspension 34 easily replaces the suspension of a snowmobile without leaning capability. A snowmobile without leaning capability is given leaning capability by replacing the snowmobile manufacturer's standard suspension with suspension 34, and providing a biasing block and control panel.

Arm assembly 64 controls the position of ski 30 with respect to casting 60. Arm assembly 66 controls the position of ski 32 with respect to casting 62. Suspension 34 controls the lean angle of snowmobile 10 by pivoting arm assemblies 64 and 66 to raise and lower skis 30 and 32. When arm assembly 64 is pivoted upward to raise ski 30 with respect to casting 60, the ski remains on terrain 12 and the change in position of the ski causes the casting to dip closer to the terrain. When arm assembly 64 is pivoted downward to lower ski 30 with respect to casting 60, the casting is raised above terrain 12. Arm assembly 66 works in the same manner, raising ski 32 to lower casting 62 and lowering ski 32 to raise casting 62. Suspension 34 operates arm assemblies 64 and 66 in a complementary fashion to lean suspension 34. When arm assembly 64 raises casting 60, arm assembly 66 lowers casting 62, and vice versa.

Leaning of suspension 34 is actuated by a hydraulic system connected to air spring shocks 68 and 88. The hydraulic system is coupled to air spring shocks 68 and 88 via the axle coupling the air spring shocks to castings 60 and 62. Air spring shock 68 is hydraulically coupled to air spring shock 88 through the hydraulic system. In order for hydraulic fluid to enter air spring shock 68, a similar volume of hydraulic fluid is removed from air spring shock 88. Hydraulic fluid leaving air spring shock 68 causes a similar volume of hydraulic fluid to enter air spring shock 88. To lean suspension 34 left, the hydraulic system pumps hydraulic fluid out of air spring shock 68 and into air spring shock 88. Pumping hydraulic fluid out of air spring shock 68 causes the air spring shock to compress and apply a force pulling shock mount casting 100 toward mechanism arms 70. Pumping hydraulic fluid into air spring shock 88 causes the air spring shock to expand and apply a force pushing shock mount casting 102 away from mechanism arms 90. Suspension 34 is leaned left by the force pulling shock mount casting 100 toward mechanism arms 70 and the force pushing shock mount casting 102 away from mechanism arms 90. To lean right, hydraulic fluid is transferred in the opposite direction, i.e., from air spring shock 88 to air spring shock 68. Suspension 34 is leaned right by the force of air spring shock 68 expanding and pushing shock mount casting 100 away from mechanism arms 70 and the force of air spring shock 88 compressing and pulling shock mount casting 102 toward mechanism arms 90.

When suspension 34 is in the neutral position, i.e., not leaning one way or the other, the parallelogram between upper control arm 74 and lower control arm 76 and the parallelogram between upper control arm 94 and lower control arm 96 are approximately rectangle. As suspension 34 is leaned, upper control arms 74 and 94 shift horizontally with respect to lower control arms 76 and 96, while the upper control arms move vertically closer to the lower control arms. The parallelogram shapes break down, becoming flat and elongated. The horizontal shift of upper control arm 74 with respect to lower control arm 76 causes spindle shaft housing 78 and ski 30 to lean accordingly. The horizontal shift of upper control arm 94 with respect to lower control arm 96 causes spindle shaft housing 98 and ski 32 to lean accordingly.

Skis 30 and 32 are mounted under and perpendicular to spindle shaft housings 78 and 98, respectively. Spindle shaft housings 78 and 98 lean with castings 60 and 62. Skis 30 and 32 lean with spindle shaft housings 78 and 98. Leaning skis 30 and 32 allows the skis to glide on an edge through turns. Leaning skis 30 and 32 keeps the outside edge of the skis from catching on snow or ice, which will roll a snowmobile if the centrifugal force from the turn overcomes the force of gravity. A risk of rolling also exists when travelling perpendicular to a slope. Gravitational forces will cause a snowmobile to roll downhill if the downhill edge catches on snow or ice and the slope is great enough. Leaning skis 30 and 32 reduces the chance of snowmobile 10 rolling downhill when travelling perpendicular to a slope because the downhill edge of the skis is kept off terrain 12.

Structural rods 109 and 110 are mounted securely to tie pieces 106. Structural rods 109 mechanically couple control link 72 to control link 92 through tie pieces 106. Structural rods 110 mechanically couple lower control arm 76 to lower control arm 96 through tie pieces 106. Tie pieces 106 and structural rods 109 and 110 are made of titanium or other high strength material to provide strength to castings 60 and 62. Because castings 60 and 62 are the same as the castings of a snowmobile manufacturer's standard snowmobile suspensions, the castings could be damaged by the loads experienced during leaning without the reinforcement of structural rods 109 and 110. Structural rods 109 and 110 absorb some of the forces between arm assembly 64 and arm assembly 66 while leaning. Structural rods 109 and 110 reduce wear and tear on castings 60 and 62 by relieving pressure that would otherwise be applied to the castings.

Figure 2B:
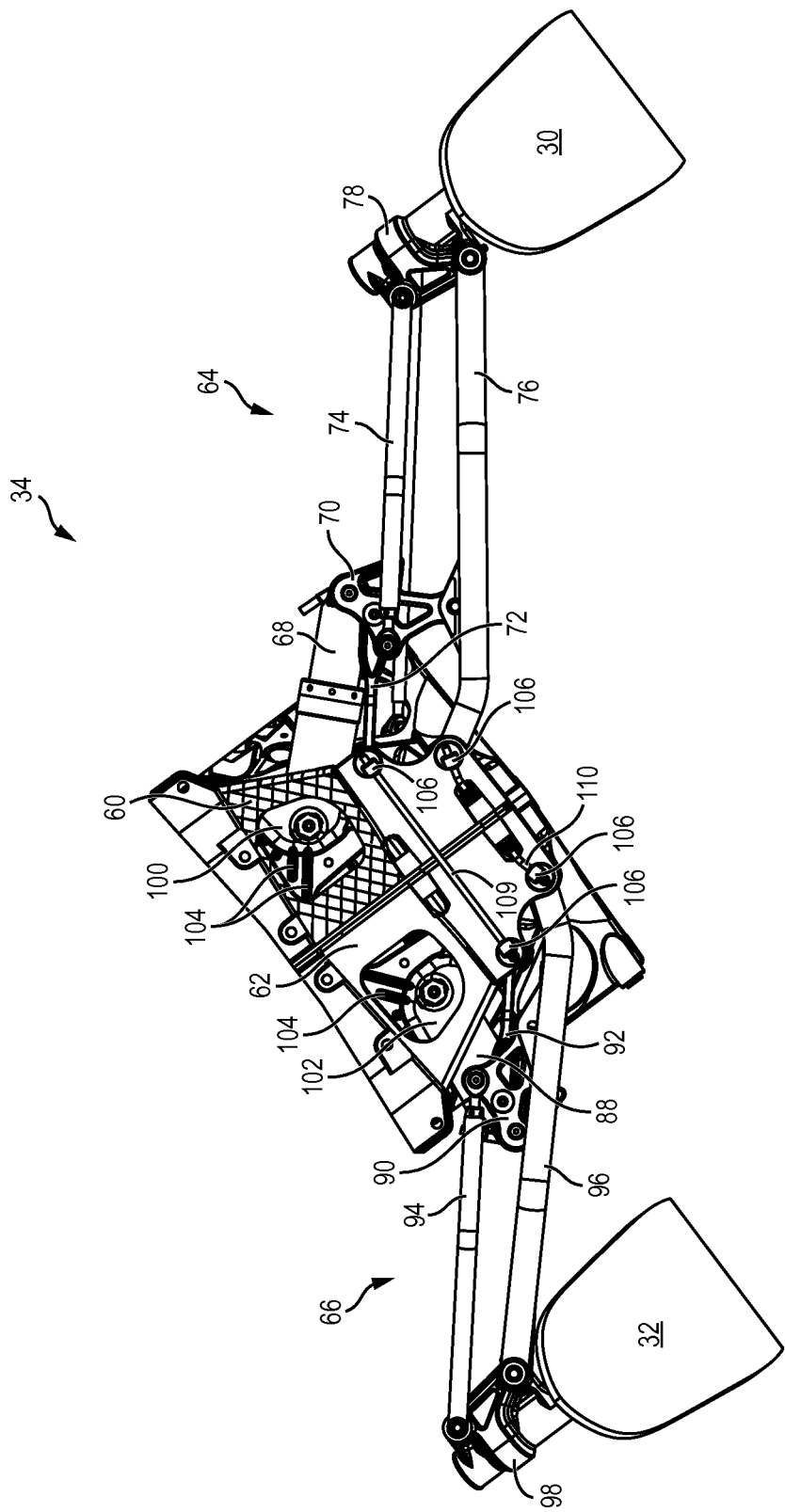

FIG. 2b illustrates suspension 34 leaned to the right as viewed from the front. Castings 60 and 62 are mirror images and contact each other at a center junction. Casting 60 is held in contact with casting 62 with nuts and threaded bolts or other suitable means. Arm assembly 64 is pivotally connected to casting 60. Arm assembly 66 is pivotally connected to casting 62. Arm assembly 64 includes air spring shock 68, mechanism arms 70, control link 72, upper control arm 74, lower control arm 76, and spindle shaft housing 78. Casting 60, lower control arm 76, control link 72, and mechanism arms 70 are pivotally connected in a first parallelogram shape. Mechanism arms 70, upper control arm 74, lower control arm 76, and spindle shaft housing 78 are pivotally connected in a second parallelogram shape. Arm assembly 66 includes air spring shock 88, mechanism arms 90, control link 92, upper control arm 94, lower control arm 96, and spindle shaft housing 98. Casting 62, lower control arm 96, control link 92, and mechanism arms 90 are pivotally connected in a third parallelogram shape. Mechanism arms 90, upper control arm 94, lower control arm 96, and spindle shaft housing 98 are pivotally connected in a fourth parallelogram shape. Shock mount casting 100 is part of casting 60. Shock mount casting 102 is part of casting 62. Shock mount castings 100 and 102 are braced with struts 104 to withstand forces from air spring shocks 68 and 88. Control link 72 and lower control arm 76 are pivotally connected to casting 60 with tie pieces 106. Control link 92 and lower control arm 96 are pivotally connected to casting 62 with tie pieces 106. Tie pieces 106 are inserted through the front and back of castings 60 and 62 and into lower control arms 76 and 96 and control links 72 and 92. Structural rods 109 are coupled between control link 72 and control link 92 via tie pieces 106. There is one structural rod 109 on the front of castings 60 and 62 and one structural rod 109 on the back side of the castings. Structural rods 110 are coupled between lower control arms 76 and 96 through tie pieces 106. There is one structural rod 110 on the front of castings 60 and 62 and one structural rod 110 on the back side of the castings.

Arm assembly 64 includes two mechanism arms 70 which straddle air spring shock 68. Arm assembly 66 includes two mechanism arms 90 which straddle air spring shock 88. Arm assemblies 64 and 66 use two mechanism arms 70 and 90, respectively, for added strength and durability. One end of air spring shock 68 is pivotally coupled to an axle between mechanism arms 70. A second end of air spring shock 68 is pivotally coupled to an axle disposed between the front and back sides of shock mount casting 100. Air spring shock 88 is pivotally coupled to an axle between mechanism arms 90 and an axle between the front and back sides of shock mount casting 102.

Castings 60 and 62 act as structural support for the other parts of suspension 34. Castings 60 and 62 are mounted to snowmobile body 40 so snowmobile 10 leans with suspension 34. Castings 60 and 62 are the same as on snowmobile manufacturers' standard suspensions so suspension 34 easily replaces the suspension of a snowmobile without leaning capability. A snowmobile without leaning capability is given leaning capability by replacing the standard suspension with suspension 34, and providing a biasing block and control panel.

Arm assembly 64 controls the position of ski 30 with respect to casting 60. Arm assembly 66 controls the position of ski 32 with respect to casting 62. Arm assembly 64 has lowered ski 30 to raise casting 60. Arm assembly 66 has raised ski 32 to lower casting 62. Arm assembly 64 raising casting 60 and arm assembly 66 lowering casting 62 have leaned suspension 34.

Leaning of suspension 34 is actuated by a hydraulic system connected to air spring shocks 68 and 88. To lean suspension 34 right, the hydraulic system pumps hydraulic fluid out of air spring shock 88 and into air spring shock 68. Pumping hydraulic fluid out of air spring shock 88 causes the air spring shock to compress and apply a force pulling shock mount casting 102 toward mechanism arms 90. Pumping hydraulic fluid into air spring shock 68 causes the air spring shock to expand and apply a force pushing shock mount casting 100 away from mechanism arms 70. Air spring shock 88 is shorter than when suspension 34 is in the neutral position, as the hydraulic system has removed hydraulic fluid from air spring shock 88 to compress the air spring shock and pull casting 62 toward arm assembly 66. Air spring shock 68 is longer than in the neutral position, as the hydraulic system has added hydraulic fluid to air spring shock 68 to extend the air spring shock and push casting 60 away from arm assembly 64.

When suspension 34 is leaned right, the two parallelograms created by mechanism arms 70 and 90, upper control arms 74 and 94, lower control arms 76 and 96, and spindle shaft housings 78 and 98 are collapsed to the right. Both air spring shocks 68 and 88 lose mechanical ability as the parallelograms collapse. The hydraulic system tips over and collapses the parallelograms with less effort than the hydraulic system uses to pick the parallelograms back up to rectangles. The hydraulic system is aided in bringing suspension 34 back to the neutral position by centrifugal force. Air spring shock 68 is nearly parallel to the load of the centrifugal force through arm assembly 64. Air spring shock 68 receives a larger load from centrifugal force than air spring shock 88. The larger load on air spring shock 68 helps the hydraulic system force hydraulic fluid out of air spring shock 68 when suspension 34 returns to the neutral position. Because air spring shock 68 and air spring shock 88 are hydraulically coupled, the extra centrifugal force on air spring shock 68 also helps the hydraulic system force hydraulic fluid back into air spring shock 88.

Skis 30 and 32 are mounted under and perpendicular to spindle shaft housings 78 and 98, respectively. Spindle shaft housings 78 and 98 have leaned right with castings 60 and 62. Skis 30 and 32 have leaned with spindle shaft housings 78 and 98. Leaning skis 30 and 32 allows the skis to glide on an edge through turns. Leaning skis 30 and 32 keeps the outside edge of the skis from catching on snow or ice, which will roll a snowmobile if the centrifugal force from the turn overcomes the force of gravity. A risk of rolling also exists when travelling perpendicular to a slope. Gravitational forces will cause a snowmobile to roll downhill if the downhill edge catches on snow or ice and the slope is great enough. Leaning skis 30 and 32 reduces the chance of snowmobile 10 rolling downhill when travelling perpendicular to a slope because the downhill edges of the skis are kept off terrain 12.

Structural rods 109 and 110 are mounted securely to tie pieces 106. Structural rods 109 mechanically couple control link 72 to control link 92 through tie pieces 106. Structural rods 110 mechanically couple lower control arm 76 to lower control arm 96 through tie pieces 106. Tie pieces 106 and structural rods 109 and 110 are made of titanium or other high strength material. Because castings 60 and 62 are the same as the castings of snowmobile manufacturers' standard snowmobile suspensions, the castings can be damaged by the loads experienced during leaning without structural rod 109 and 110 to absorb some of the load. Structural rods 109 and 110 absorb some of the force between arm assembly 64 and arm assembly 66 while suspension 34 is leaning. Structural rods 109 and 110 reduce wear and tear on castings 60 and 62 by relieving pressure that would otherwise be applied to the castings.

Figure 2C:
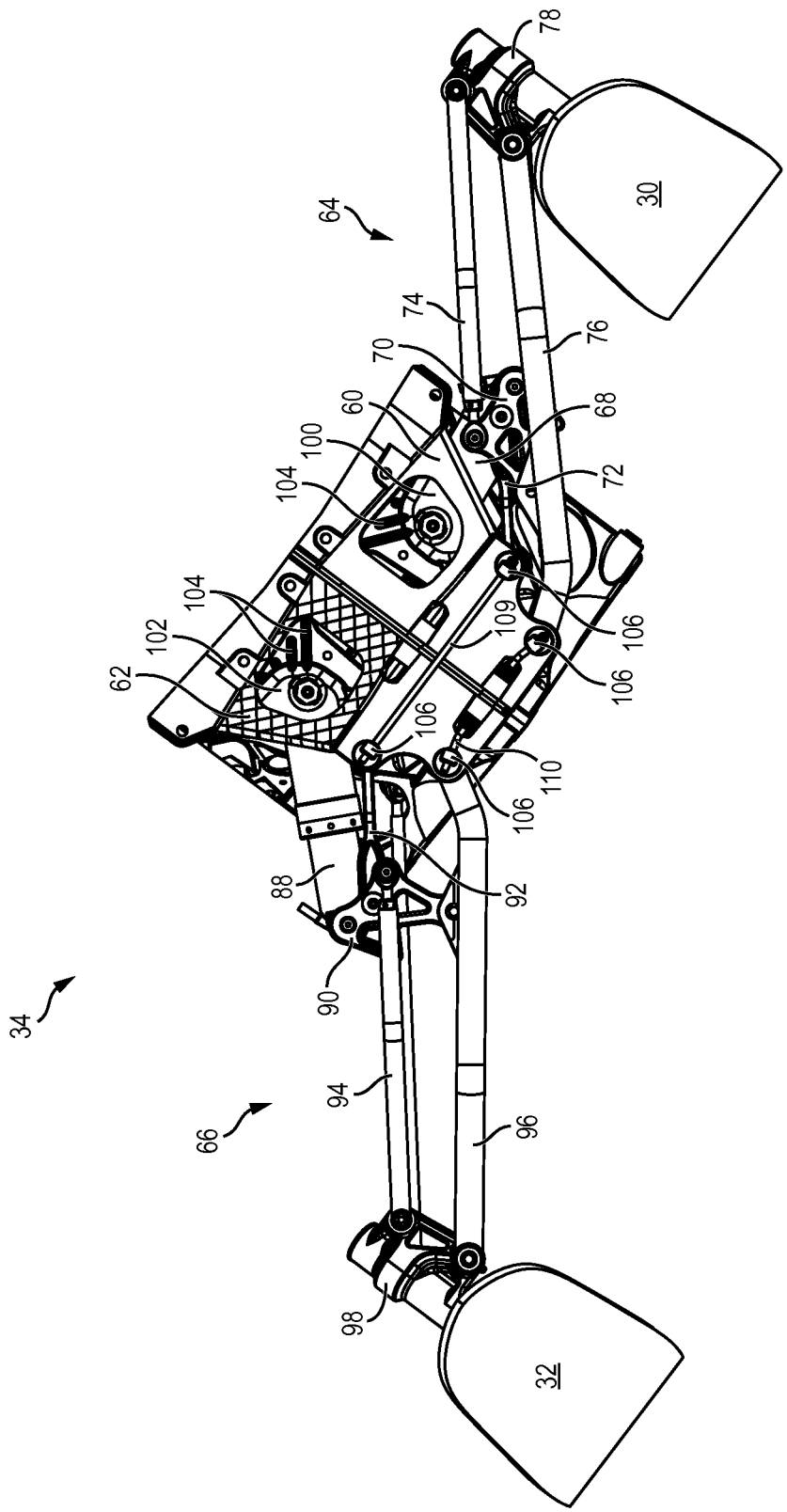

FIG. 2c illustrates suspension 34 leaned to the left. Castings 60 and 62 are mirror images and contact each other at a center junction. Casting 60 is held in contact with casting 62 with nuts and threaded bolts or other suitable means. Arm assembly 64 is pivotally connected to casting 60. Arm assembly 66 is pivotally connected to casting 62. Arm assembly 64 includes air spring shock 68, mechanism arms 70, control link 72, upper control arm 74, lower control arm 76, and spindle shaft housing 78. Casting 60, lower control arm 76, control link 72, and mechanism arms 70 are pivotally connected in a first parallelogram shape. Mechanism arms 70, upper control arm 74, lower control arm 76, and spindle shaft housing 78 are pivotally connected in a second parallelogram shape. Arm assembly 66 includes air spring shock 88, mechanism arms 90, control link 92, upper control arm 94, lower control arm 96, and spindle shaft housing 98. Casting 62, lower control arm 96, control link 92, and mechanism arms 90 are pivotally connected in a third parallelogram shape. Mechanism arms 90, upper control arm 94, lower control arm 96, and spindle shaft housing 98 are pivotally connected in a fourth parallelogram shape. Shock mount casting 100 is part of casting 60. Shock mount casting 102 is part of casting 62. Shock mount castings 100 and 102 are braced with struts 104 to withstand forces from air spring shocks 68 and 88. Control link 72 and lower control arm 76 are pivotally connected to casting 60 with tie pieces 106. Control link 92 and lower control arm 96 are pivotally connected to casting 62 with tie pieces 106. Tie pieces 106 are inserted through the front and back of castings 60 and 62 and into lower control arms 76 and 96 and control links 72 and 92. Structural rods 109 are coupled between control link 72 and control link 92 via tie pieces 106. There is one structural rod 109 on the front of castings 60 and 62 and one structural rod 109 on the back side of the castings. Structural rods 110 are coupled between lower control arms 76 and 96 through tie pieces 106. There is one structural rod 110 on the front of castings 60 and 62 and one structural rod 110 on the back side of the castings.

Arm assembly 64 includes two mechanism arms 70 which straddle air spring shock 68. Arm assembly 66 includes two mechanism arms 90 which straddle air spring shock 88. Arm assemblies 64 and 66 use two mechanism arms 70 and 90, respectively, for added strength and durability. One end of air spring shock 68 is pivotally coupled to an axle between mechanism arms 70. A second end of air spring shock 68 is pivotally coupled to an axle disposed between the front and back sides of shock mount casting 100. Air spring shock 88 is pivotally coupled to an axle between mechanism arms 90 and an axle between the front and back sides of shock mount casting 102.

Castings 60 and 62 act as structural support for the other parts of suspension 34. Castings 60 and 62 are mounted to snowmobile 10 so the snowmobile leans with suspension 34. Castings 60 and 62 are the same as on snowmobile manufacturers' standard suspensions so suspension 34 easily replaces the suspension of a snowmobile without leaning capability. A snowmobile without leaning capability is given leaning capability by replacing the snowmobile manufacturers' standard suspension with suspension 34, and providing a biasing block and control panel.

Arm assemblies 64 and 66 control the position of skis 30 and 32 with respect to castings 60 and 62, and thus the lean angle of suspension 34. Arm assembly 66 has been pivoted down to lower ski 32 and raise casting 62. Arm assembly 64 has been pivoted up to raise ski 30 and lower casting 60. Arm assembly 66 raising casting 62 and arm assembly 64 lowering casting 60 have leaned suspension 34.

Leaning of suspension 34 is actuated by a hydraulic system connected to air spring shocks 68 and 88. To lean suspension 34 left, the hydraulic system pumps hydraulic fluid out of air spring shock 68 and into air spring shock 88. Pumping hydraulic fluid out of air spring shock 68 causes air spring shock 68 to compress and apply a force pulling shock mount casting 100 toward mechanism arms 70. Pumping hydraulic fluid into air spring shock 88 causes the air spring shock to expand and apply a force pushing shock mount casting 102 away from mechanism arms 90. Air spring shock 68 is shorter than when suspension 34 is in the neutral position, as the hydraulic system has removed hydraulic fluid from air spring shock 68 to compress the air spring shock and pull casting 60 toward arm assembly 64. Air spring shock 88 is longer than in the neutral position, as the hydraulic system has added hydraulic fluid to air spring shock 88 to extend the air spring shock and push casting 62 away from arm assembly 66.

When suspension 34 is leaned left, the two parallelograms created by mechanism arms 70 and 90, upper control arms 74 and 94, lower control arms 76 and 96, and spindle shaft housings 78 and 98 are collapsed to the left. Both air spring shocks 68 and 88 lose mechanical ability as the parallelograms collapse. The hydraulic system tips over and collapses the parallelograms with less effort than picking the parallelograms back up to rectangles. The hydraulic system is aided in bringing suspension 34 back to the neutral position by centrifugal force. Air spring shock 88 is nearly parallel to the load of the centrifugal force through arm assembly 66. Air spring shock 88 receives a larger load from centrifugal force than air spring shock 68. The larger load on air spring shock 88 helps the hydraulic system force hydraulic fluid out of air spring shock 88 when suspension 34 returns to the neutral position. Because air spring shock 68 and air spring shock 88 are hydraulically coupled, the extra centrifugal force on air spring shock 88 also helps the hydraulic system force hydraulic fluid back into air spring shock 68.

Skis 30 and 32 are mounted under and perpendicular to spindle shaft housings 78 and 98, respectively. Spindle shaft housings 78 and 98 have leaned left with castings 60 and 62. Skis 30 and 32 have leaned with spindle shaft housings 78 and 98. Leaning skis 30 and 32 allows the skis to glide on an edge through turns. Leaning skis 30 and 32 keeps the outside edge of the skis from catching on snow or ice, which will roll a snowmobile if the centrifugal force from the turn overcomes the force of gravity. A risk of rolling also exists when travelling perpendicular to a slope. Gravitational forces will cause a snowmobile to roll downhill if the downhill edge catches on snow or ice and the slope is great enough. Leaning skis 30 and 32 reduces the chance of snowmobile 10 rolling downhill when travelling perpendicular to a slope because the downhill edges of the skis are kept off terrain 12.

Structural rods 109 and 110 are mounted securely to tie pieces 106. Structural rods 109 mechanically couple control link 72 to control link 92 through tie pieces 106. Structural rods 110 mechanically couple lower control arm 76 to lower control arm 96 through tie pieces 106. Tie pieces 106 and structural rods 109 and 110 are made of titanium or other high strength material. Because castings 60 and 62 are the same as the castings of snowmobile manufacturers' standard snowmobile suspensions, the castings can be damaged by the loads experienced during leaning. Structural rods 109 and 110 absorb some of the force between arm assembly 64 and arm assembly 66 while suspension 34 is leaning. Structural rods 109 and 110 reduce wear and tear on castings 60 and 62 by relieving pressure that would otherwise be applied to the castings.

Figure 2D:
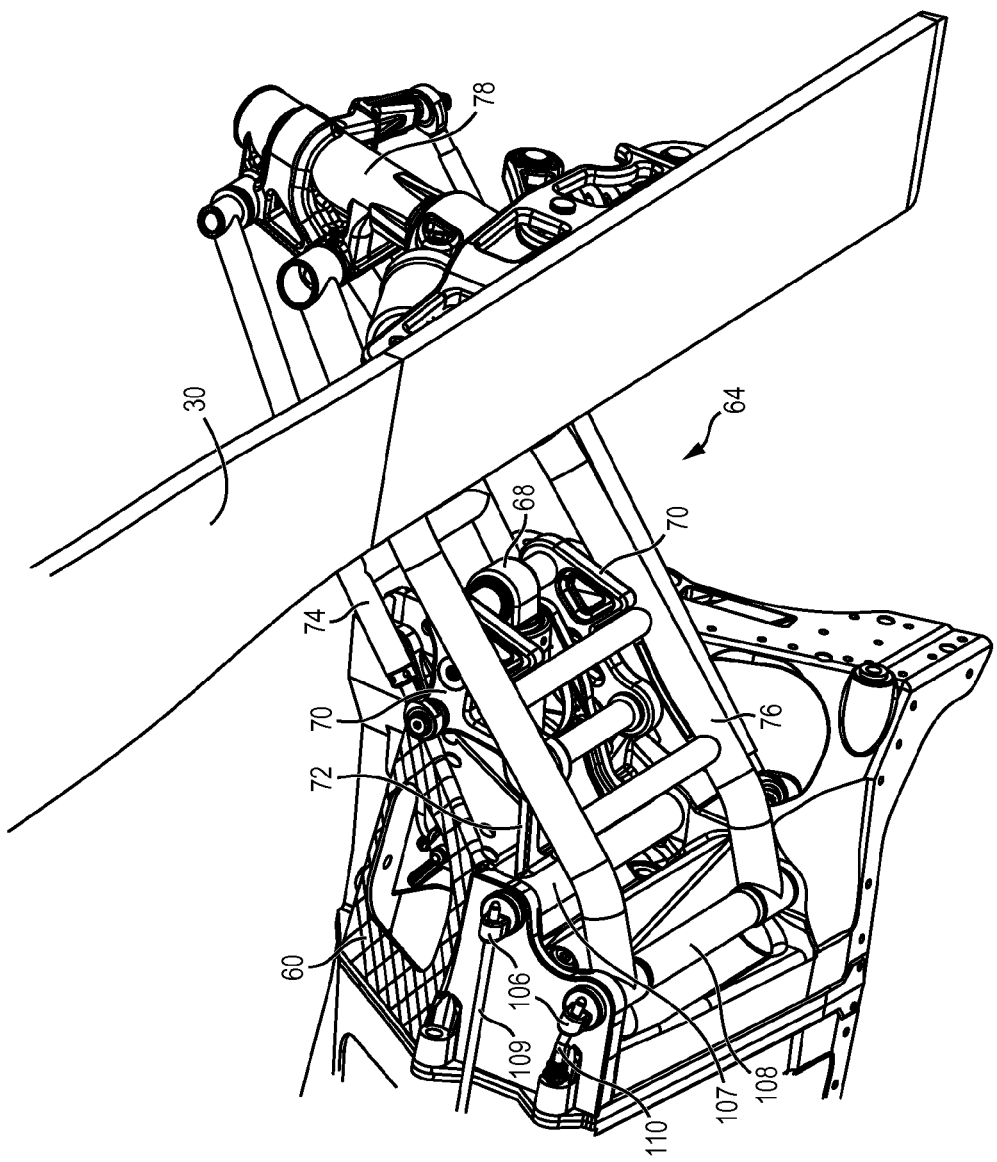

FIG. 2d illustrates arm assembly 64 on casting 60, while the hydraulic system has compressed air spring shock 68 to raise ski 30. The right arm assembly is a mirror image of arm assembly 64 and operates in the same manner as arm assembly 64. However, when arm assembly 64 is raised, the right arm assembly is lowered.

Upper control arm 74 is pivotally coupled to mechanism arms 70 in front of and behind air spring shock 68. Control link 72 is pivotally coupled to casting 60 via tie pieces 106 inserted through the casting and into hollow tube 107. Lower control arm 76 is pivotally coupled to casting 60 via tie pieces 106 inserted through the casting and into hollow tube 108. Air spring shock 68 is pivotally attached to an axle between mechanism arms 70. To contract air spring shock 68, hydraulic fluid is extracted from the air spring shock by the hydraulic system.

When air spring shock 68 contracts to raise arm assembly 64, the arm assembly pivots up relative to casting 60. Lower control arm 76, control link 72, and upper control arm 74 pivot up to raise ski 30. The parallelogram shape between upper control arm 74 and lower control arm 76 has kept the outboard ends of the upper control arm and lower control arm vertically aligned, and spindle shaft housing 78 remains leaned at approximately the same angle as casting 60. Ski 30 is mounted under and perpendicular to spindle shaft housing 78. Ski 30 remains leaned at approximately the same angle as casting 60.

Figure 2E:
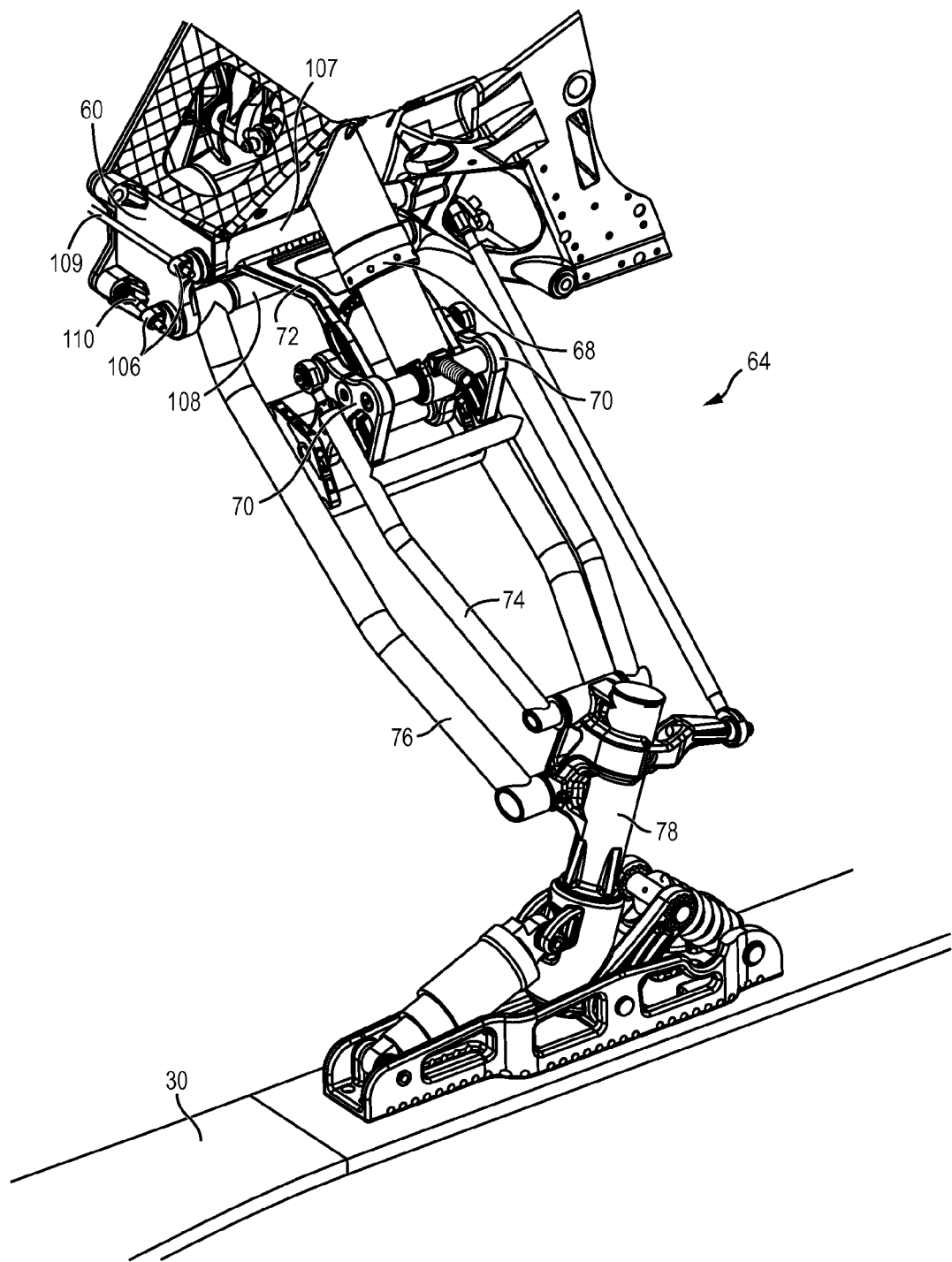

FIG. 2e illustrates arm assembly 64 on casting 60, while the hydraulic system has expanded air spring shock 68 to lower ski 30. The right arm assembly is a mirror image of arm assembly 64 and operates in the same manner. However, when arm assembly 64 is lowered, the right arm assembly is raised.

Upper control arm 74 is pivotally coupled to the two mechanism arms 70 in front of and behind air spring shock 68. Control link 72 is pivotally coupled to casting 60 via tie pieces 106 inserted through the casting and into hollow tube 107. Hollow tube 107 is part of control link 72. Lower control arm 76 is pivotally coupled to casting 60 via tie pieces 106 inserted through the casting and into hollow tube 108. Air spring shock 68 is pivotally attached to an axle between mechanism arms 70 at the bottom end of the air spring shock. Air spring shock 68 is pivotally coupled to casting 60 at the top end of the air spring shock. Air spring shock 68 is expanded by a hydraulic system forcing hydraulic fluid into the air spring shock. Hydraulic fluid enters air spring shock 68 via a hydraulic pathway disposed in the axle through casting 60 and the air spring shock.

When air spring shock 68 expands to lower arm assembly 64, the arm assembly pivots down relative to casting 60. Lower control arm 76, control link 72, and upper control arm 74 pivot down to lower ski 30. The parallelogram between upper control arm 74 and lower control arm 76 has kept the outboard ends of the upper control arm and lower control arm vertically aligned, and spindle shaft housing 78 remains vertical. Ski 30 is mounted under and perpendicular to spindle shaft housing 78. Ski 30 remains at approximately the same angle as casting 60.

Figure 2F:
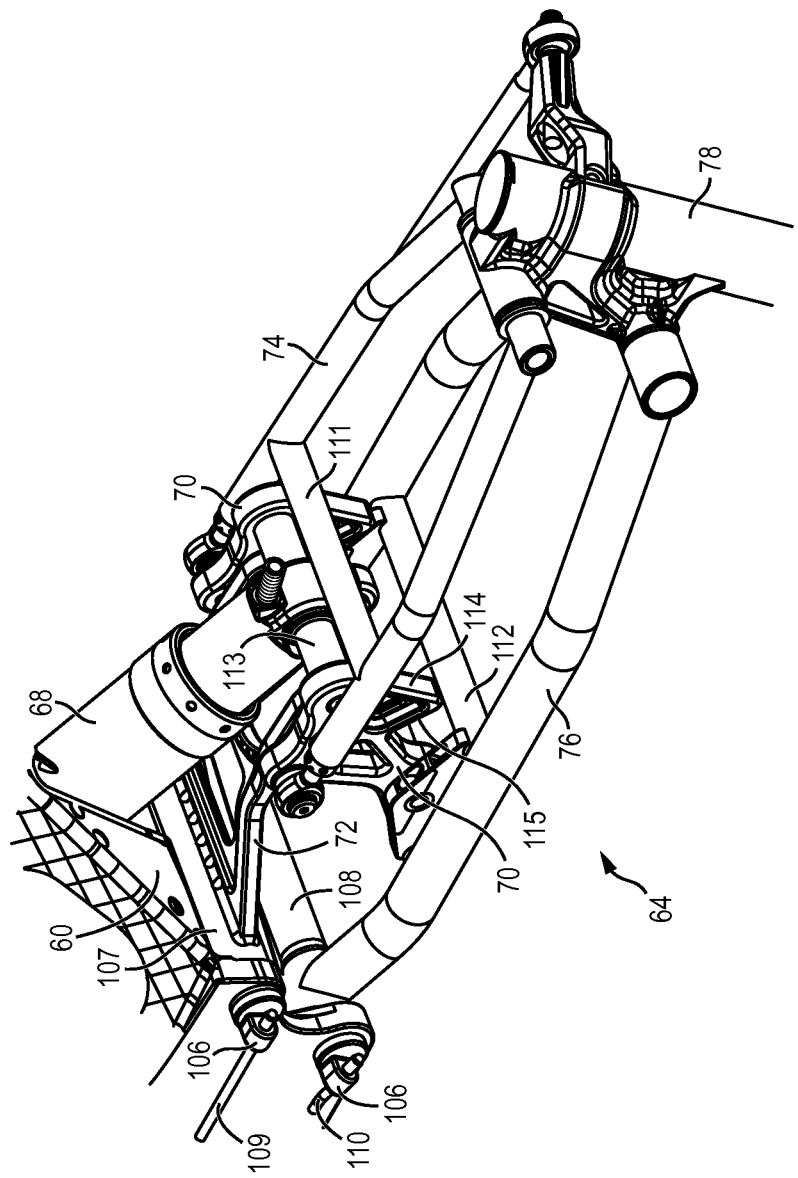

FIG. 2f illustrates left arm assembly 64 in the neutral position. The right arm assembly includes the same parts as and is a mirror image of arm assembly 64. When arm assembly 64 is in the neutral position, the right arm assembly is also in the neutral position.

Upper control arm 74 is pivotally coupled to the two mechanism arms 70 in front of and behind air spring shock 68. Upper control arm 74 includes extension suspension stop 111 coupled between a front bar and rear bar of the upper control arm. Control link 72 is pivotally coupled to casting 60 with tie pieces 106 inserted through the casting and into hollow tube 107. Hollow tube 107 is part of control link 72. Lower control arm 76 is pivotally coupled to casting 60 with tie pieces 106 inserted through the casting and into hollow tube 108. Lower control arm 76 includes compression suspension stop 112 coupled between a front bar and rear bar of the lower control arm. Mechanism arms 70 are coupled by axle 113. Air spring shock 68 is pivotally attached to the mechanism arms via axle 113. When air spring shock 68 expands or contracts to change the position of arm assembly 64, the force of the air spring shock is applied to the arm assembly through axle 113 and mechanism arms 70. Air spring shock 68 is pivotally coupled to casting 60 via an axle through the casting and air spring shock. The axle through casting 60 and air spring shock 68 includes a hydraulic pathway for hydraulic fluid to enter and leave the air spring shock. Air spring shock 68 rotates within casting 60 and hydraulic fluid flows through the hydraulic pathway in the axle uninterrupted.

Extension suspension stop 111 and compression suspension stop 112 define a range of possible rotation angles for arm assembly 64. Arm assembly 64 can be lowered to the angle where points 114 of mechanism arms 70 contact extension suspension stop 111. Arm assembly 64 can be raised to the angle where points 115 of mechanism arms 70 contact compression suspension stop 112. Mechanism arms 70 are brought into contact with extension suspension stop 111 and compression suspension stop 112 by the rotation of the mechanism arms relative to upper control arm 74 and lower control arm 76 when arm assembly 64 is pivoted up or down.

Figure 2G:
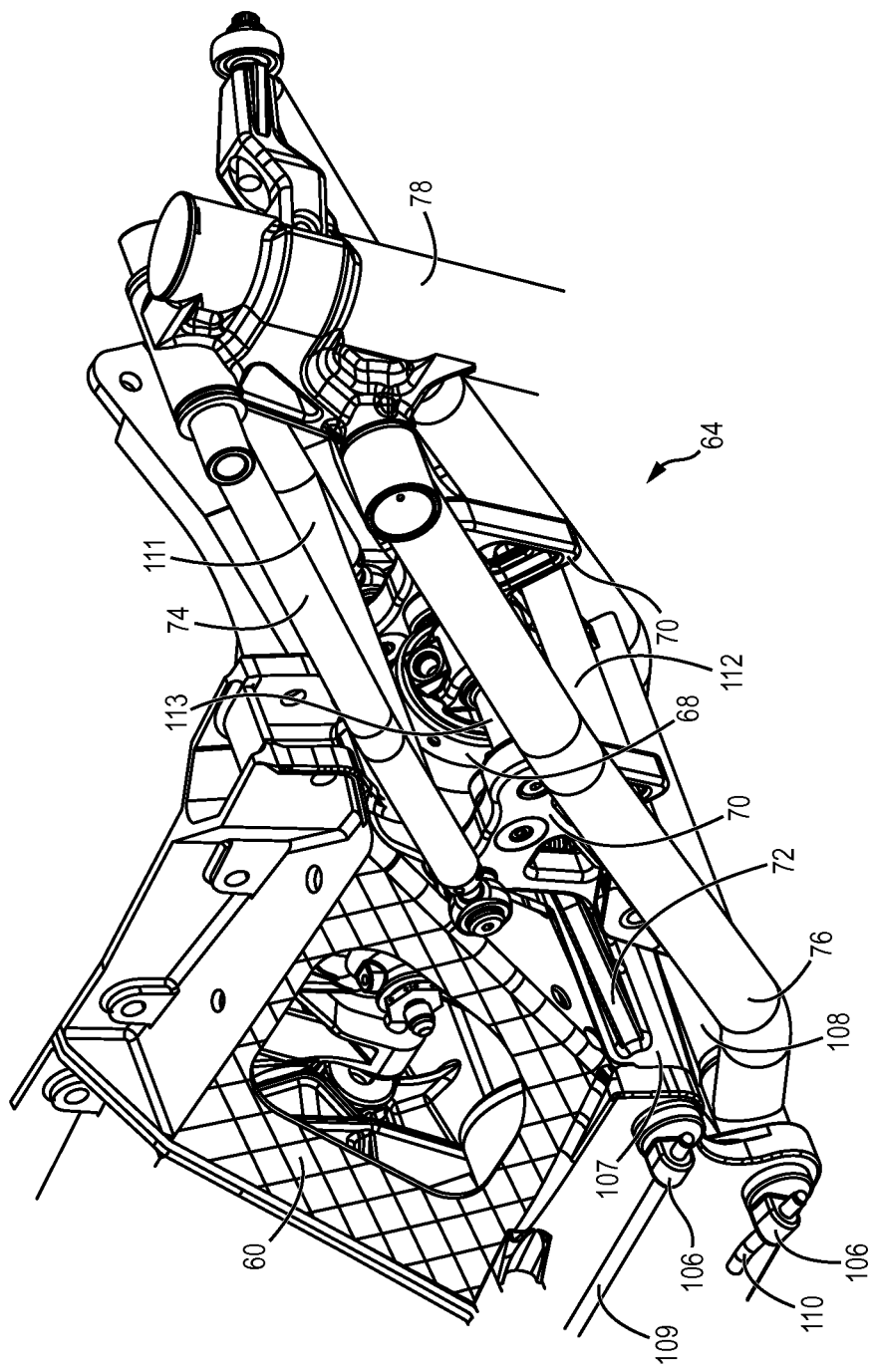

FIG. 2g illustrates left arm assembly 64 in the raised position. The right arm assembly includes the same parts as and is a mirror image of arm assembly 64. However, when arm assembly 64 is in the raised position, the right arm assembly will be in the lowered position.

Upper control arm 74 is pivotally coupled to the two mechanism arms 70 in front of and behind air spring shock 68. The front and rear sides of upper control arm 74 are connected by extension suspension stop 111 and an axle through spindle shaft housing 78. Control link 72 is pivotally coupled to casting 60 with tie pieces 106 inserted through the casting and into hollow tube 107. Hollow tube 107 is part of control link 72. Lower control arm 76 is pivotally coupled to casting 60 with tie pieces 106 inserted through the casting and into hollow tube 108. Lower control arm 76 includes compression suspension stop 112 connected between front and rear bars of the lower control arm. Mechanism arms 70 are linked by axle 113. Air spring shock 68 is pivotally coupled to mechanism arms 70 via axle 113. When air spring shock 68 contracts to raise arm assembly 64, the force of the air spring shock is applied to arm assembly 64 through axle 113 and mechanism arms 70.

Arm assembly 64 can be raised to the point where mechanism arms 70 come into contact with compression suspension stop 112.

Figure 2H:
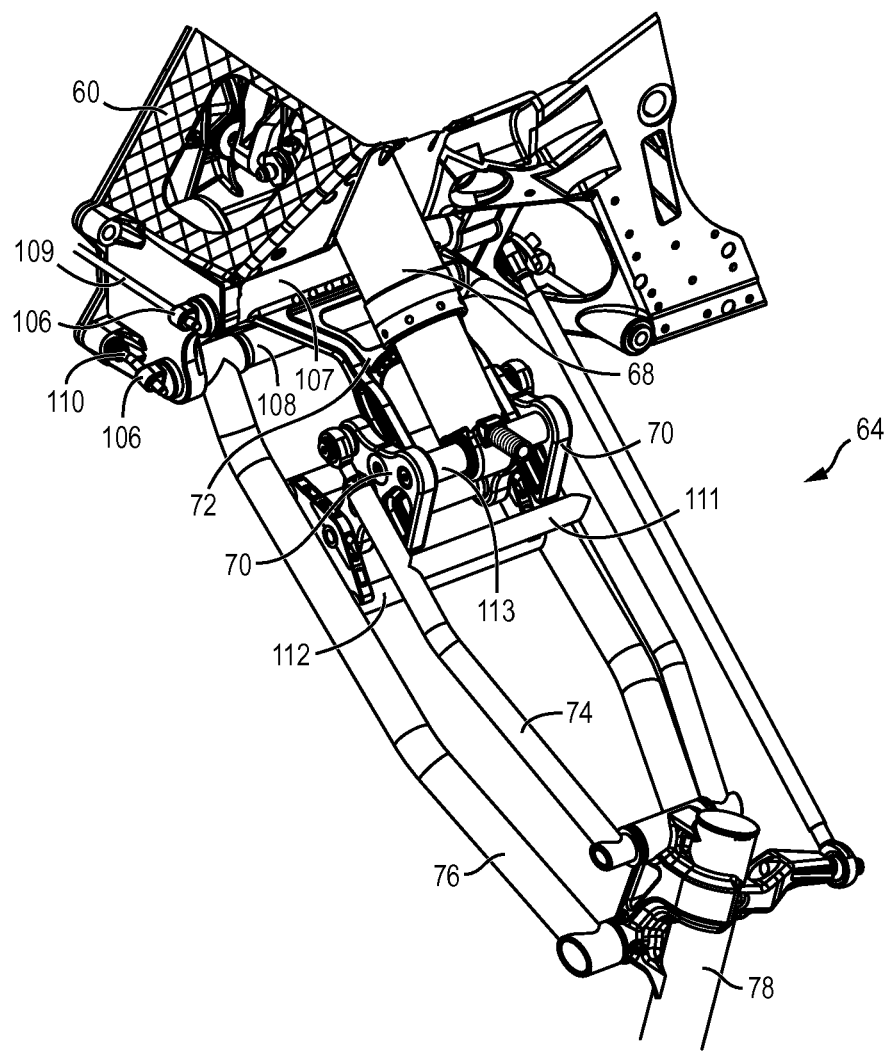

FIG. 2h illustrates left arm assembly 64 in the lowered position. The right arm assembly includes the same parts as and is a mirror image of arm assembly 64. However, when arm assembly 64 is in the lowered position, the right arm assembly will be in the raised position.

Upper control arm 74 is pivotally coupled to the two mechanism arms 70 in front of and behind air spring shock 68. The front and rear sides of upper control arm 74 are connected by extension suspension stop 111 and an axle through spindle shaft housing 78. Control link 72 is pivotally coupled to casting 60 with tie pieces 106 inserted through the casting and into hollow tube 107. Lower control arm 76 is pivotally coupled to casting 60 with tie pieces 106 inserted through the casting and into hollow tube 108. Lower control arm 76 includes compression suspension stop 112 coupled between the front and back of the lower control arm. Mechanism arms 70 are linked by axle 113. Air spring shock 68 is pivotally attached to the mechanism arms via axle 113. When air spring shock 68 expands to lower arm assembly 64, the force of the air spring shock is applied to the arm assembly through axle 113 and mechanism arms 70.

Arm assembly 64 can be lowered to the point where mechanism arms 70 come into contact with extension suspension stop 111.

Figure 3:
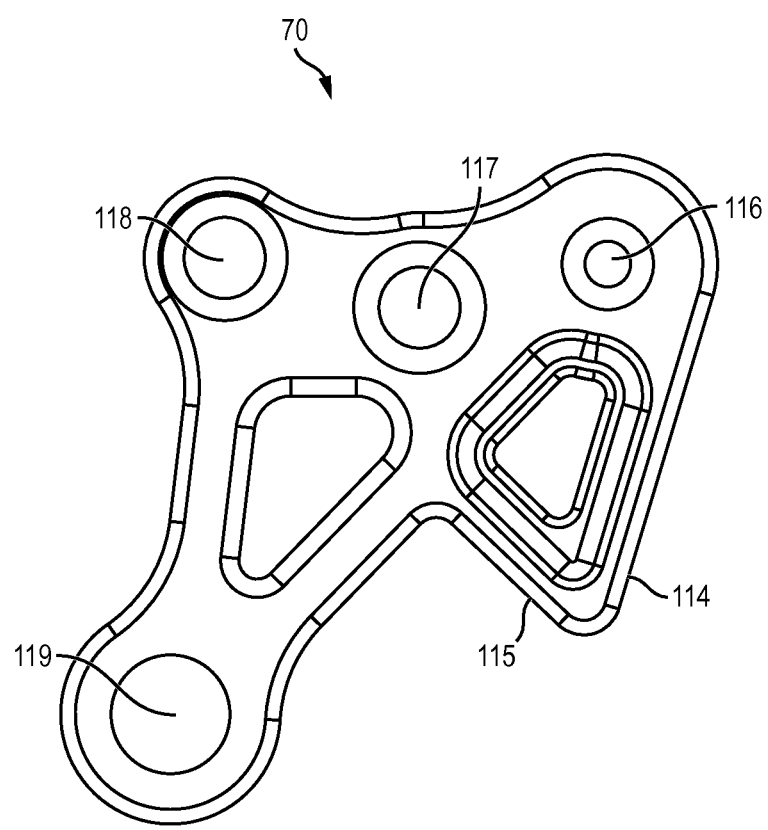
FIG. 3 illustrates a mechanism arm.

FIG. 3 illustrates a mechanism arm 70. Mechanism arms 90 are the mirror image of mechanism arms 70. Mechanism arms 90 couple to the parts of arm assembly 66 in the same way that mechanism arms 70 couple to the parts of arm assembly 64. The left arm assembly 64 includes a pair of mechanism arms 70. One mechanism arm 70 is positioned in front of air spring shock 68 and one mechanism arm 70 is positioned behind air spring shock 68. An axle 113 is coupled between the two mechanism arms 70 through holes 116. Control link 72 is pivotally connected to mechanism arm 70 at hole 117. Upper control arm 74 is pivotally connected to mechanism arm 70 at hole 118. Lower control arm 76 is pivotally connected to mechanism arm 70 at hole 119. Axle 113, control link 72, upper control arm 74, and lower control arm 76 hold mechanism arms 70 approximately in parallel and properly spaced around air spring shock 68.

Mechanism arms 70 act as a hub to coordinate the motion of control link 72, upper control arm 74, and lower control arm 76 as snowmobile 10 goes through a leaning motion. When snowmobile 10 is leaned, the rotation of casting 60 moves control link 72 horizontally relative to lower control arm 76. The horizontal motion of control link 72 rotates mechanism arms 70. The rotation of mechanism arms 70 transfers the horizontal motion of control link 72 to a horizontal motion of upper control arm 74.

Points 114 and 115 define an available range of motion for suspension 34. When suspension 34 has leaned right to a certain angle, point 114 contacts extension suspension stop 111 of upper control arm 74. When suspension 34 has leaned left to a certain angle, point 115 contacts compression suspension stop 112 of lower control arm 76.

Figure 4:
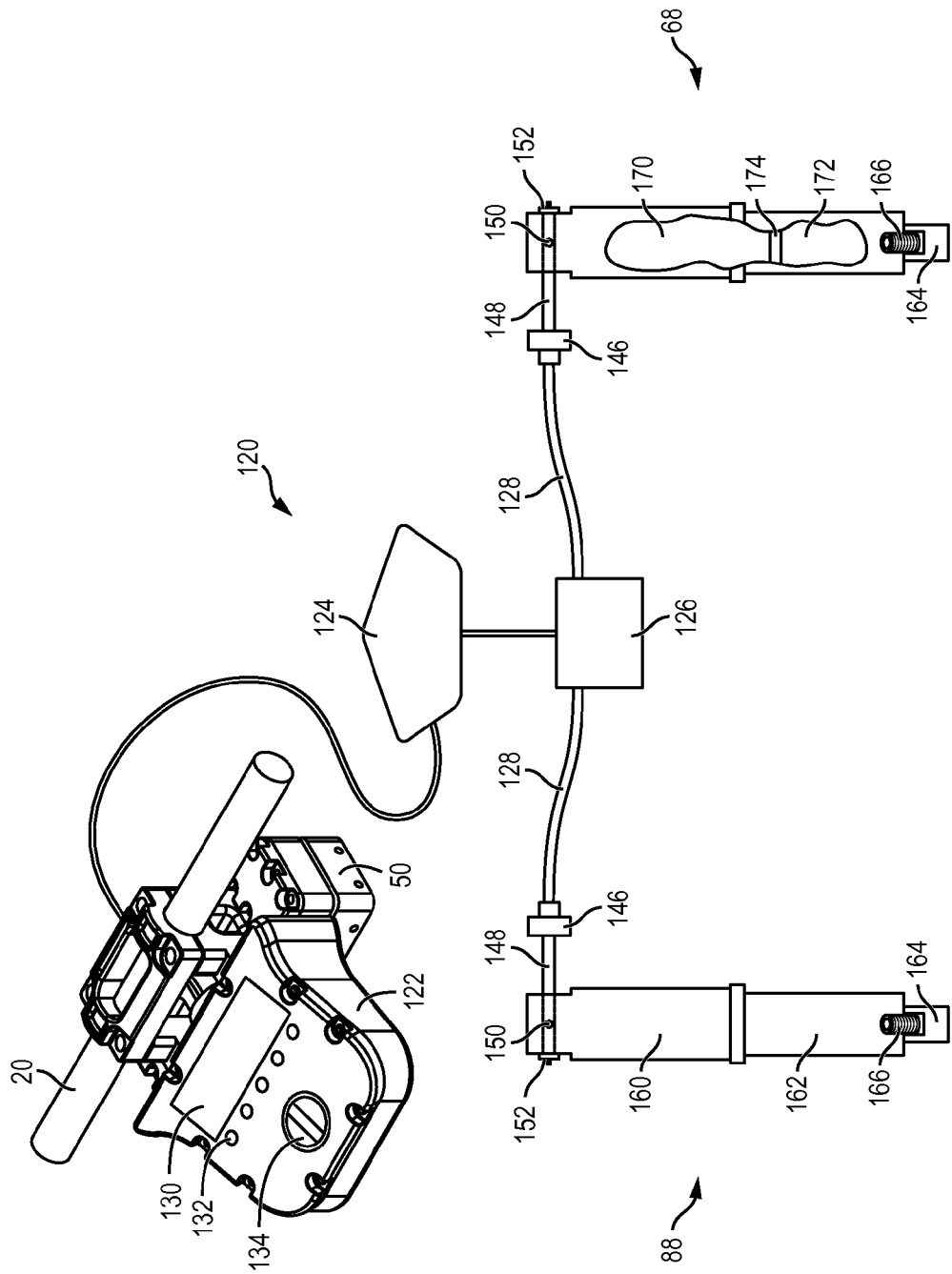
FIG. 4 illustrates a hydraulic system for leaning the snowmobile.

FIG. 4 illustrates a hydraulic system 120 for actuating suspension 34. Biasing block 50 is attached and electrically connected to control panel 122. Biasing block 50 and control panel 122 are positioned on snowmobile 10 with the control panel facing rider 14. Handlebar 20 is through biasing block 50. Control panel 122 is electrically coupled to motor driver 124 which is within suspension 34. Motor driver 124 is electrically coupled to hydraulic pump assembly 126 which is within suspension 34. Hydraulic pump assembly 126 is hydraulically coupled to air spring shocks 68 and 88 via hydraulic lines 128. The top of air spring shock 68 is pivotally coupled to casting 60 and the bottom of the air spring shock is pivotally coupled to arm assembly 64. Air spring shock 88 is likewise pivotally coupled to casting 62 and arm assembly 66.

Biasing block 50 holds handlebar 20 and contains load cells on the left side and right side of the biasing block which measure the vertical force applied to the handlebar. The load cells are electrically coupled to an interface board within control panel 122. The interface board determines the strength and direction of force on handlebar 20 based upon an electrical signal from the load cells in biasing block 50. The interface board converts the input signal from the load cells in biasing block 50 to an output signal routed to motor driver 124. Motor driver 124 amplifies the signal from the interface board in control panel 122 to provide power to hydraulic pump assembly 126. Hydraulic pump assembly 126, powered by motor driver 124, generates hydraulic pressure in hydraulic lines 128 to pump hydraulic fluid between air spring shocks 68 and 88. One hydraulic line 128 is coupled from a port on hydraulic pump assembly 126 to air spring shock 68, and one hydraulic line 128 is coupled from a second port on the hydraulic pump assembly to air spring shock 88. Hydraulic pump assembly 126 pumps fluid from air spring shock 68 to air spring shock 88 or from air spring shock 88 to air spring shock 68 depending on the polarity of electric power applied by motor driver 124. The hydraulic fluid pumped between air spring shocks 68 and 88 causes the air spring shocks to expand and contract. When hydraulic fluid is pumped into air spring shock 68 or 88, the air spring shock is forced to expand. When hydraulic fluid is pumped out of air spring shock 68 or 88, the air spring shock is forced to contract. The expansion and contraction of air spring shocks 68 and 88 is the force on arm assemblies 64 and 66 that actuates a lean of snowmobile 10. Air spring shock 68 and air spring shock 88 are coupled through hydraulic lines 128 and hydraulic pump assembly 126 such that the hydraulic fluid pumped into one air spring shock is about the same volume as the hydraulic fluid pumped out of the other air spring shock. The coupling of air spring shock 68 and air spring shock 88 through hydraulic pump assembly 126 causes the air spring shocks to work in concert to lean snowmobile 10.

Control panel 122 is attached to biasing block 50. Control panel 122 includes a face oriented toward and visible to rider 14 with a liquid-crystal display (LCD) screen 130, control buttons 132, and sensitivity knob 134. LCD screen 130, control buttons 132, and sensitivity knob 134 are used by rider 14 to control the circuitry of the interface board and configure the leaning functionality of snowmobile 10. Rider 14 uses control buttons 132 to operate a graphical user interface (GUI) visible on LCD screen 130. Sensitivity knob 134 manually configures gain applied by the interface board on the input from the load cells and also controls aspects of the GUI. Load cell gain is also set automatically if rider 14 uses the GUI to enter personal information such as height and weight. Seat 16 includes a sensor to detect the weight of rider 14 and adjust the load cell gain automatically if the setting to detect rider weight and automatically set load cell gain is enabled using the GUI.

Higher gain applied by the interface board to the output of the load cells causes hydraulic pump assembly 126 to give more assistance in leaning, i.e., pump more hydraulic fluid, for a given force applied to handlebar 20. Higher gain allows a light rider 14 to use the leaning capability while requiring less force on handlebar 20 as compared to a heavier and stronger rider.

The GUI includes a function to zero out the load cells. A control button 132 can also be used to zero out the load cells without use of the GUI. Snowmobile 10 will treat the force on handlebar 20 when the load cells are zeroed out as the neutral point, and subsequent leaning will be calculated by measuring the force on handlebar 20 relative to the force on the handlebar when the load cells were zeroed out.

The interface board within control panel 122 performs the computational functions used for the leaning capability of snowmobile 10. Control panel 122 contains accelerometers and gyros to detect the orientation and movement of snowmobile 10 and suspension 34. Control panel 122 periodically detects and logs the angle and roll rate of snowmobile body 40 relative to gravity. Control panel 122 contains Global Positioning System (GPS) capability to determine the position of snowmobile 10 on Earth. The interface board contains memory to log data acquired for an indefinite period of time. The GUI is used to browse and view the saved data, or statistics such as maximum speed, maximum roll rate, maximum lean angle, total distance traveled, etc. The data stored in control panel 122 is accessible after an accident to help determine the cause of the accident. The data stored in control panel 122 is accessible via a wired or wireless connection for backup and for use with a personal computer or web site. Control panel 122 has a programming plug input to update the software running on the interface board. Alternatively, the interface board software is updated via a wireless connection.

Hydraulic pump assembly 126 is hydraulically coupled to air spring shocks 68 and 88 through hydraulic lines 128, hydraulic valves 146, and shock support shafts 148. Shock support shafts 148 include hydraulic pathways through the shock support shafts and hydraulic ports 150 to allow hydraulic fluid to flow into and out of air spring shocks 68 and 88. Hydraulic valves 146 close to shut off the flow of hydraulic fluid in hydraulic system 120. Using hydraulic valves 146 to shut off the flow of hydraulic fluid prevents a change in the lean of snowmobile 10, locking snowmobile 10 in at the lean angle when the hydraulic valves are shut.

Bleeder valves 152 are screwed into shock support shafts 148 at the ends of the shock support shafts opposite hydraulic valves 146. Bleeder valves 152 are opened to create a temporary opening for hydraulic fluid to flow into and out of hydraulic system 120 in a controllable manner. Operating hydraulic system 120 with bleeder valves 152 open allows transducers to be attached to the bleeder valves to measure and log relative hydraulic pressure between air spring shock 68 and air spring shock 88 during operation. The transducers keep hydraulic fluid from escaping hydraulic system 120 via bleeder valves 152.

Bleeder valves 152 are used by the manufacturer of snowmobile 10 to initially charge hydraulic system 120 with hydraulic fluid. To charge the hydraulic system, a vacuum system is coupled to one bleeder valve 152 while a hydraulic fluid reservoir, or other means of providing hydraulic fluid, is coupled to the other bleeder valve. The vacuum system removes air from hydraulic system 120 while the hydraulic fluid reservoir provides hydraulic fluid in the other side. When the air has been removed from hydraulic system 120, and the desired amount of hydraulic fluid has been added, the system is fully charged and bleeder valves 152 are shut to close up hydraulic system 120. Bleeder valves 152 will remain shut during operation of hydraulic system 120, but the bleeder valves are also opened during maintenance of the hydraulic system.

The external components of air spring shocks 68 and 88 include upper body 160, lower body 162, and lower shock mount 164. Lower body 162 fits inside upper body 160 and slides relative to the upper body to increase or decrease the total capacity of air spring shocks 68 and 88. Upper body 160 is sealed against lower body 162 so no hydraulic fluid escapes air spring shocks 68 and 88. When hydraulic fluid is forced into air spring shock 68 or 88, the volume of the air spring shock is increased, forcing lower body 162 to slide further out of upper body 160. When hydraulic fluid is forced out of air spring shock 68 or 88, the volume of the air spring shock is decreased, forcing lower body 162 to slide further into upper body 160. The force moving upper body 160 relative to lower body 162 is the force that leans snowmobile 10.

Lower shock mount 164 is inserted into the bottom end of lower body 162. Lower shock mounts 164 include Schrader valves 166 which allow air to be added to and removed from air spring shocks 68 and 88.

Internally, air spring shocks 68 and 88 include upper chamber 170, lower chamber 172, and floating piston 174. Upper chamber 170 is filled with hydraulic fluid, and lower chamber 172 is filled with nitrogen gas or other compressible substance. Floating piston 174 provides a seal between upper chamber 170 and lower chamber 172 keeping the hydraulic fluid and nitrogen gas separated. Hydraulic fluid enters and leaves upper chamber 170 via hydraulic port 150 and a hydraulic pathway through shock support shaft 148. When snowmobile 10 leans, hydraulic fluid entering or leaving upper chamber 170 changes the volume of the upper chamber and causes upper body 160 to move relative to lower body 162.

Air spring shocks 68 and 88 act as both hydraulic actuators and shock absorbers. Air spring shocks 68 and 88 are hydraulic actuators because the air spring shocks use hydraulic power to facilitate mechanical operation. Hydraulic pump assembly 126 provides the hydraulic power. The mechanical operation of air spring shocks 68 and 88 as hydraulic actuators is given in terms of linear motion, i.e., upper body 160 sliding relative to lower body 162. The hydraulic power to mechanically operate air spring shocks 68 and 88 as hydraulic actuators comes from hydraulic fluid or oil being forced into and out of upper chamber 170. Air spring shocks 68 and 88 are shock absorbers because floating piston 174 floats on a bed of nitrogen gas that compresses and expands with variations in terrain 12. The nitrogen gas in lower chamber 172 mechanically isolates upper chamber 170, and everything coupled to upper body 160, from terrain 12.

Nitrogen gas enters and leaves lower chamber 172 via lower shock mount 164 and Schrader valve 166. The nitrogen gas in air spring shocks 68 and 88 is compressed and provides support and damping for snowmobile body 40. As snowmobile 10 travels across bumps and variations in terrain 12, the nitrogen gas in lower chamber 172 compresses and expands to provide mechanical isolation between snowmobile body 40 and terrain 12. The nitrogen gas in lower chamber 172 acts as a spring. The components of snowmobile 10 coupled above air spring shocks 68 and 88, i.e., snowmobile body 40, are the sprung mass of the snowmobile. The sprung mass of snowmobile 10 is mechanically isolated from bumps in terrain 12 by the nitrogen gas in lower chamber 172. The components of snowmobile 10 coupled below air spring shocks 68 and 88, i.e., arm assemblies 64 and 66, are the unsprung mass of the snowmobile. The unsprung mass of snowmobile 10 has no mechanical isolation from terrain 12. The mechanical components of arm assemblies 64 and 66 which lean snowmobile 10 are coupled below air spring shocks 68 and 88 as part of the unsprung mass of the snowmobile.

Shock support shafts 148 are disposed through upper chambers 170 of air spring shocks 68 and 88. Shock support shafts 148 are supported by castings 60 and 62 to keep air spring shocks 68 and 88 in place. Shock support shafts 148 act as axles for air spring shocks 68 and 88 to rotate on within shock mount castings 100 and 102, respectively, as snowmobile 10 is leaned. Shock support shafts 148 also include hydraulic pathways and hydraulic ports 150 which allow hydraulic fluid to flow into and out of air spring shocks 68 and 88.

Hydraulic ports 150 allow hydraulic fluid to flow into and out of upper chambers 170 via shock support shafts 148. When hydraulic system 120 is initially charged by the manufacturer, upper chambers 170 of air spring shocks 68 and 88 are filled with hydraulic fluid via hydraulic ports 150. During leaning of snowmobile 10, hydraulic fluid is removed from air spring shock 68 or 88 and forced into the other air spring shock through hydraulic ports 150 and shock support shafts 148.

Upper chambers 170 are around shock support shafts 148. As air spring shocks 68 and 88 rotate around shock support shafts 148, hydraulic fluid flows through hydraulic ports 150 to enter and leave upper chambers 170 no matter what angle air spring shock 68 or 88 is at relative to the shock support shafts. Air spring shocks 68 and 88 are able to rotate in a complete circle around shock support shafts 148 and hydraulic fluid will flow into and out of upper chamber 170 via hydraulic port 150 uninterrupted.

Figure 5:
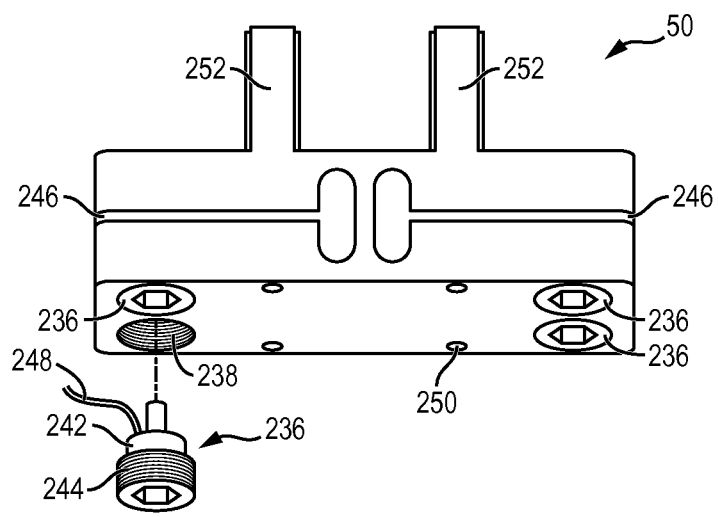
FIG. 5 illustrates a biasing block for sensing pressure applied to a handlebar.

FIG. 5 illustrates biasing block 50. Plungers 236 are inserted into the bottom of biasing block 50 via cavities 238. Plungers 236 include load cells 242 mated to threaded pieces 244. Threaded pieces 244 screw into threads within cavities 238 to hold plungers 236 tightly into biasing block 50. When plungers 236 are screwed into cavities 238, the top of load cells 242 are in contact with biasing block 50 above gap 246. Vertical force applied to handlebar 20 compresses one side or the other side of gap 246 and asserts pressure on load cells 242. Cables 248 electrically couple load cells 242 to the interface board of control panel 122 through biasing block 50.

The pressure sensed by load cells 242 is converted to an electric potential on conductors within cables 248 and routed to control panel 122. Control panel 122 compares the relative pressure sensed by load cells 242 on the left side of biasing block 50 and the load cells on the right side of the biasing block and signals motor driver 124 to power hydraulic pump assembly 126 accordingly.

Biasing block 50 includes two load cells 242 on the left side of the biasing block and two load cells on the right side of the biasing block. Two load cells 242 are used on the left side and right side of biasing block 50 as a redundancy. If the interface board determines a load cell 242 has failed, the interface board automatically uses the remaining good load cells to detect the force applied to handlebar 20.

Biasing block 50 includes four screw holes 250 on the bottom of the biasing block. The screw holes on the bottom of biasing block 50 are used to attach the biasing block to a steering column of snowmobile 10. Biasing block 50 includes two screw holes 250 on top of both handlebar risers 252. Screw holes 250 on top of handlebar risers 252 are used to attach handlebar 20 via a metal bracket with bolts, screws, or other suitable means.

Figure 6:
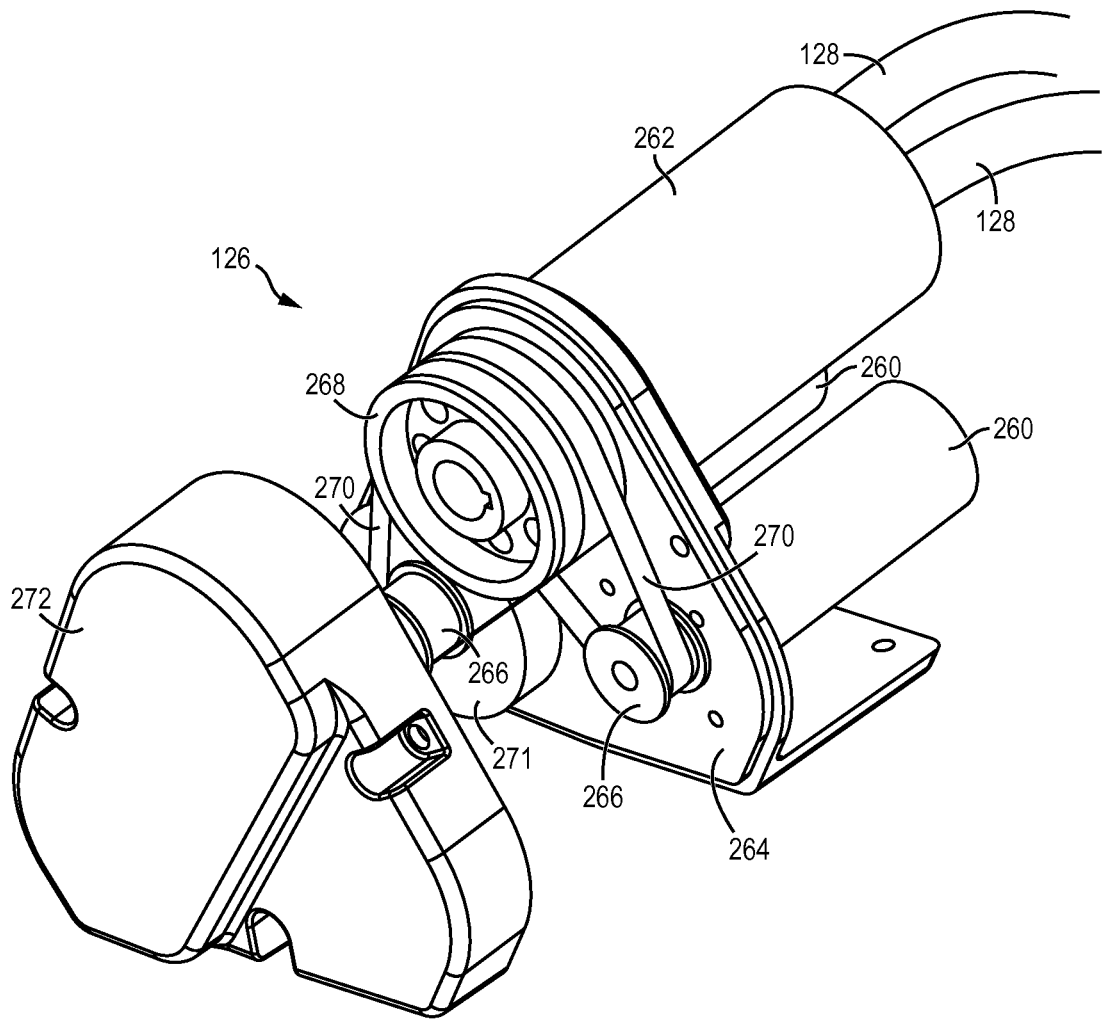
FIG. 6 illustrates a hydraulic pump assembly.

FIG. 6 illustrates hydraulic pump assembly 126. Hydraulic pump assembly 126 has two electric motors 260 and hydraulic pump 262. Hydraulic pump 262 is hydraulically coupled to air spring shocks 68 and 88 through hydraulic lines 128. Electric motors 260 and hydraulic pump 262 are mounted to pump bracket 264. Electric motors 260 and hydraulic pump 262 have drive shafts positioned through holes in pump bracket 264. Pulleys 266 are disposed on the drive shafts of electric motors 260. Pulley 268 is disposed on the drive shaft of hydraulic pump 262. Pulleys 266 are coupled to pulley 268 by timing belts 270. Timing belts 270 are constructed of Kevlar or other suitable material. In an alternate embodiment pulleys 266, pulley 268, and timing belts 270 are geared to provide improved coupling. With geared timing belts 270 and pulleys 266 and 268, the pulleys include teeth around the outside of the pulleys that mate with teeth on timing belts 270. Pump bracket 264 includes offset 271 to keep pulleys 266 properly aligned. Cover 272 is mounted over the moving parts of hydraulic pump assembly 126 using screws to keep debris and other hazards away from pulleys 266 and 268 and timing belts 270. Pump bracket 264 is coupled to castings 60 and 62 via screws to hold hydraulic pump assembly 126 in place during operation of snowmobile 10.

Electric motors 260 are powered by direct current (DC) power from motor driver 124, and turn pulleys 266. Pulleys 266 rotate pulley 268 via timing belts 270 which run around the pulleys. Two electric motors 260 are provided as a redundancy. However, either electric motor alone will power hydraulic pump 262 in the event that the other electric motor fails. Offset 271 keeps one pulley 266 offset from the other pulley 266 and keeps one belt 270 from contacting the other belt 270. Pulley 268 operates hydraulic pump 262 by turning the drive shaft of the hydraulic pump.

Hydraulic pump 262 is a computer numerical control (CNC) hydraulic motor being driven backwards as a pump. The CNC hydraulic motor handles high reverse loads and has an internal bypass to relieve hydraulic pump 262 when the hydraulic pump is overpressurized. The CNC hydraulic motor operates at up to 25,000 revolutions per minute (RPMs). When the drive shaft of hydraulic pump 262 is turned by electric motors 260, the hydraulic pump forces hydraulic fluid from air spring shock 68 to air spring shock 88, or vice versa. The flow direction of hydraulic fluid is controlled by the polarity of DC power supplied to electric motors 260 by motor driver 124. Other suitable hydraulic pumps can be used for hydraulic pump 262.

Figure 7A:
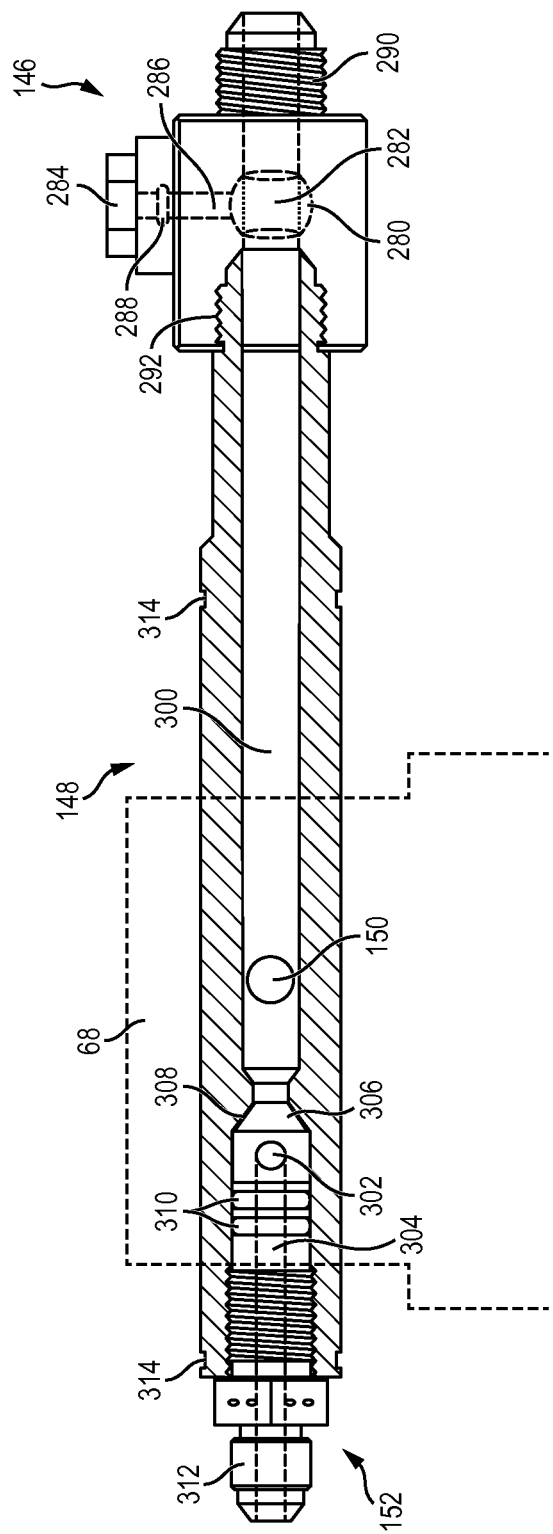
FIGS. 7a-7d illustrate a shock support shaft with bleeder valve and hydraulic valve.

FIG. 7a illustrates shock support shaft 148 with hydraulic valve 146 and bleeder valve 152. Air spring shock 68 is disposed around shock support shaft 148. Air spring shock 88 is disposed around a shock support shaft 148 but on the right side of snowmobile 10. Hydraulic valve 146 is screwed onto a threaded end of shock support shaft 148. Bleeder valve 152 is screwed into the end of shock support shaft 148 opposite hydraulic valve 146. Hydraulic pathway 300 allows hydraulic fluid to flow through shock support shaft 148. Hydraulic port 150 allows hydraulic fluid to flow into and out of air spring shock 68 via hydraulic pathway 300.

Hydraulic valve 146 is a floating ball valve able to handle at least 5,000 pounds per square inch (psi) of hydraulic pressure. Hydraulic valve 146 includes ball 280 with pathway 282 through the ball. Bolt head 284 is mechanically coupled to ball 280 via stem 286. Bolt head 284 is used to turn ball 280 through the mechanical coupling of stem 286. Bolt head 284 is mechanically coupled to a lever used by rider 14 to open and close hydraulic valve 146. Stem 286 has O-ring 288 for added protection against stem leaks. Hydraulic valve 146 has a male connector 290 and female connector 292. Female connector 292 is screwed onto shock support shaft 148. Male connector 290 includes the same specification threads as shock support shaft 148 so that hydraulic lines 128 are either coupled to hydraulic valve 146 or directly to the shock support shaft.

When ball 280 is turned such that pathway 282 is parallel to hydraulic pathway 300, hydraulic fluid is allowed through hydraulic valve 146. Pathway 282 is the same width as hydraulic pathway 300 so that hydraulic fluid travels through hydraulic valve 146 unrestricted. Resistance to the flow of hydraulic fluid by hydraulic valve 146 will unnecessarily limit the rate at which hydraulic system 120 operates to lean snowmobile 10. When bolt head 284 is used to turn ball 280 ninety degrees, such that pathway 282 is perpendicular to hydraulic pathway 300, the hydraulic valve is shut off and no hydraulic fluid flows through the hydraulic valve. When hydraulic valve 146 is shut off, no hydraulic fluid flows between air spring shock 68 and 88. Thus, snowmobile 10 is prevented from leaning away from the current lean angle of the snowmobile.

Bleeder valve 152 includes ports 302 which allow hydraulic fluid to flow through the bleeder valve to or from hydraulic pathway 300. Bleeder valve 152 has pathway 304 connecting to ports 302. Pathway 304 of bleeder valve 152 allows hydraulic fluid to flow into hydraulic system 120 from an external source, or out of the hydraulic system to an external reservoir, when the bleeder valve is opened. Bleeder valve 152 is screwed fully into shock support shaft 148 so that tip 306 of the bleeder valve is in contact with seat 308 of the shock support shaft. Tip 306 and seat 308 are shaped such that the tip and seat contact to form a seal. The contact between bleeder valve 152 and shock support shaft 148 stops hydraulic fluid from flowing through the bleeder valve when the bleeder valve is shut, i.e., fully screwed into the shock support shaft. Bleeder valve 152 includes O-rings 310 creating a seal to stop hydraulic fluid from flowing around the bleeder valve. O-rings 310 ensure that when bleeder valve 152 is open, hydraulic fluid flow is contained in pathway 304. Keeping the flow of hydraulic fluid contained to pathway 304 allows the flow of hydraulic fluid into and out of hydraulic system 120 to be controlled by an external hydraulic system coupled to external fitting 312.

Shock support shaft 148 includes notches 314 which are used to keep the shock support shaft in place within castings 60 and 62. Shock support shafts 148 are inserted through castings 60 and 62. C-clamps are disposed around shock support shafts 148 and in notches 314 to hold the shock support shafts in position. Castings 60 and 62 include screws which tighten to grip shock support shafts 148 and apply force against shock support shafts rotating in the castings. The upper side of air spring shock 68 is supported in shock mount castings 100 by shock support shaft 148. Shock support shaft 148 operates as an axle allowing air spring shock 68 to rotate around the shock support shaft. Hydraulic port 150 is within air spring shock 68 and allows hydraulic fluid to flow into and out of the air spring shock no matter what angle the air spring shock is with respect to shock support shaft 148. Sleeve bearings are disposed between air spring shock 68 and shock support shaft 148 to reduce friction. Rubber gaskets or other suitable means are used to prevent hydraulic fluid from leaking at the connection between shock support shaft 148 and air spring shock 68.

Figure 7B:
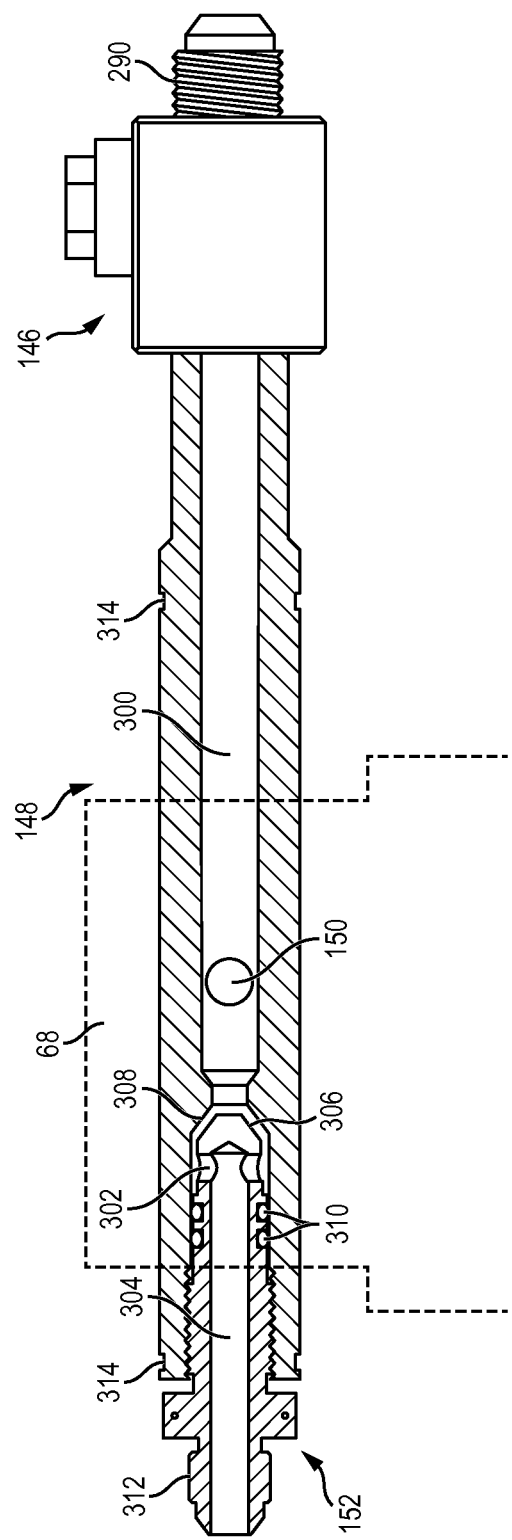

FIG. 7b illustrates shock support shaft 148 with hydraulic valve 146 and bleeder valve 152. Air spring shock 68 is disposed around shock support shaft 148. Air spring shock 88 is disposed around a shock support shaft 148 but on the right side of snowmobile 10. Hydraulic valve 146 is screwed onto a threaded end of shock support shaft 148. Bleeder valve 152 is screwed into the end of shock support shaft 148 opposite hydraulic valve 146. Hydraulic pathway 300 allows hydraulic fluid to flow through shock support shaft 148. Hydraulic port 150 allows hydraulic fluid to flow into and out of air spring shock 68 via hydraulic pathway 300.

Bleeder valve 152 includes ports 302 which allow hydraulic fluid to flow through the bleeder valve to or from shock support shaft 148. Bleeder valve 152 has pathway 304 connecting to ports 302. Bleeder valve 152 is opened by slightly unscrewing the bleeder valve out of shock support shaft 148. Slightly unscrewing bleeder valve 152 creates a gap between tip 306 of the bleeder valve and seat 308 of the shock support shaft. Hydraulic fluid from hydraulic system 120 flows through hydraulic valve 146, hydraulic pathway 300, around tip 306, through ports 302, and through pathway 304 to exit hydraulic system 120. Hydraulic fluid being added to hydraulic system 120 follows the reverse path.

Bleeder valves 152 include O-rings 310 to help keep hydraulic fluid from travelling around bleeder valves 152. By containing hydraulic fluid within bleeder valves 152, the flow of hydraulic fluid into and out of hydraulic system 120 is controlled by an external hydraulic system fitted to external fittings 312 of the bleeder valves.

Operating snowmobile 10 with bleeder valves 152 open allows transducers to be attached to external fitting 312 to measure and log relative hydraulic pressure between air spring shock 68 and air spring shock 88 during operation of snowmobile 10. The transducers keep hydraulic fluid from escaping hydraulic system 120 through ports 302 and pathway 304.

Bleeder valves 152 are used by the manufacturer of snowmobile 10 to charge hydraulic system 120 with hydraulic fluid. To charge the hydraulic system, a vacuum system is coupled to external fitting 312 of one bleeder valve 152 while a hydraulic fluid reservoir is coupled to the external fitting of the other bleeder valve. The vacuum system removes air from hydraulic system 120 while the hydraulic fluid reservoir provides hydraulic fluid in the other side. When the air is removed from hydraulic system 120 and sufficient hydraulic fluid has been provided, the hydraulic system is fully charged and bleeder valves 152 are shut to close up the hydraulic system. Bleeder valves 152 will remain shut during usage of snowmobile 10, but are also used during maintenance of hydraulic system 120.

Figure 7C:
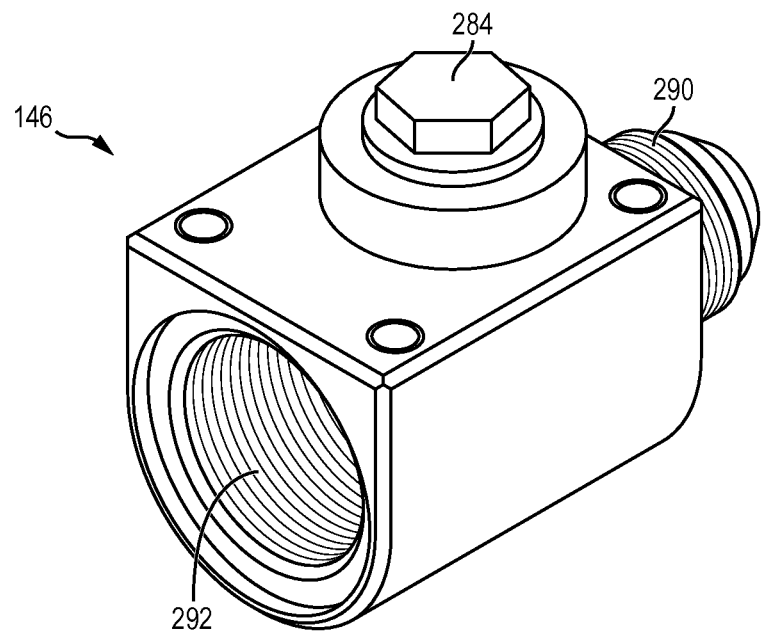

FIG. 7c illustrates hydraulic valve 146 separate from shock support shaft 148. Hydraulic valve 146 is controlled via a handle or lever mechanically coupled to bolt head 284. Shutting off hydraulic valve 146 effectively locks the lean angle of snowmobile 10 in place by preventing the flow of hydraulic fluid between air spring shock 68 and air spring shock 88. Only one hydraulic valve 146 is necessary to effectively lock the lean angle of snowmobile 10, but two hydraulic valves are used for redundancy. Hydraulic valve 146 includes male connector 290 and female connector 292 with complementary threading. Hydraulic line 128 fits on the threading of shock support shaft 148 and the threading of male connector 290 because the shock support shaft and the male connector have the same threading.

Figure 7D:
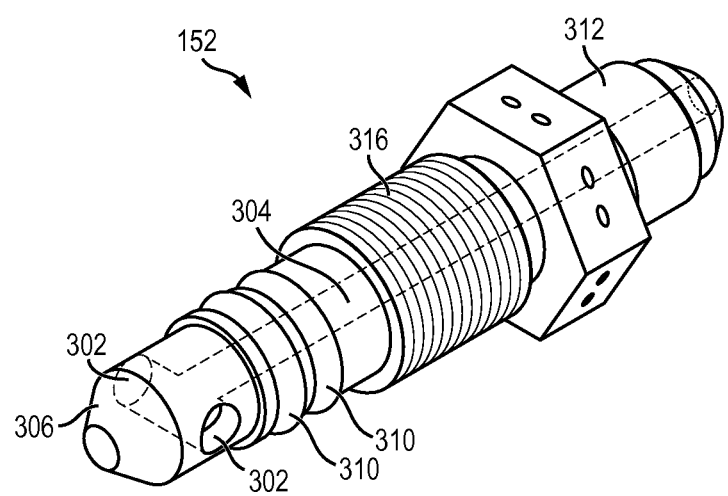

FIG. 7d illustrates a bleeder valve 152. Bleeder valve 152 has threaded area 316 allowing the bleeder valve to be turned into and out of shock support shaft 148 like a screw. Bleeder valve 152 includes ports 302 and pathway 304 allowing hydraulic fluid to be added to and removed from hydraulic system 120. When bleeder valve 152 is screwed into shock support shaft 148, as in FIG. 7a, tip 306 is seated within shock support shaft 148 to block hydraulic fluid from flowing through ports 302 and pathway 304. When bleeder valve 152 is slightly unscrewed from shock support shaft 148, tip 306 is unseated and hydraulic fluid flows through ports 302 and pathway 304. O-rings 310 keep hydraulic fluid contained within bleeder valve 152.

Figure 8:
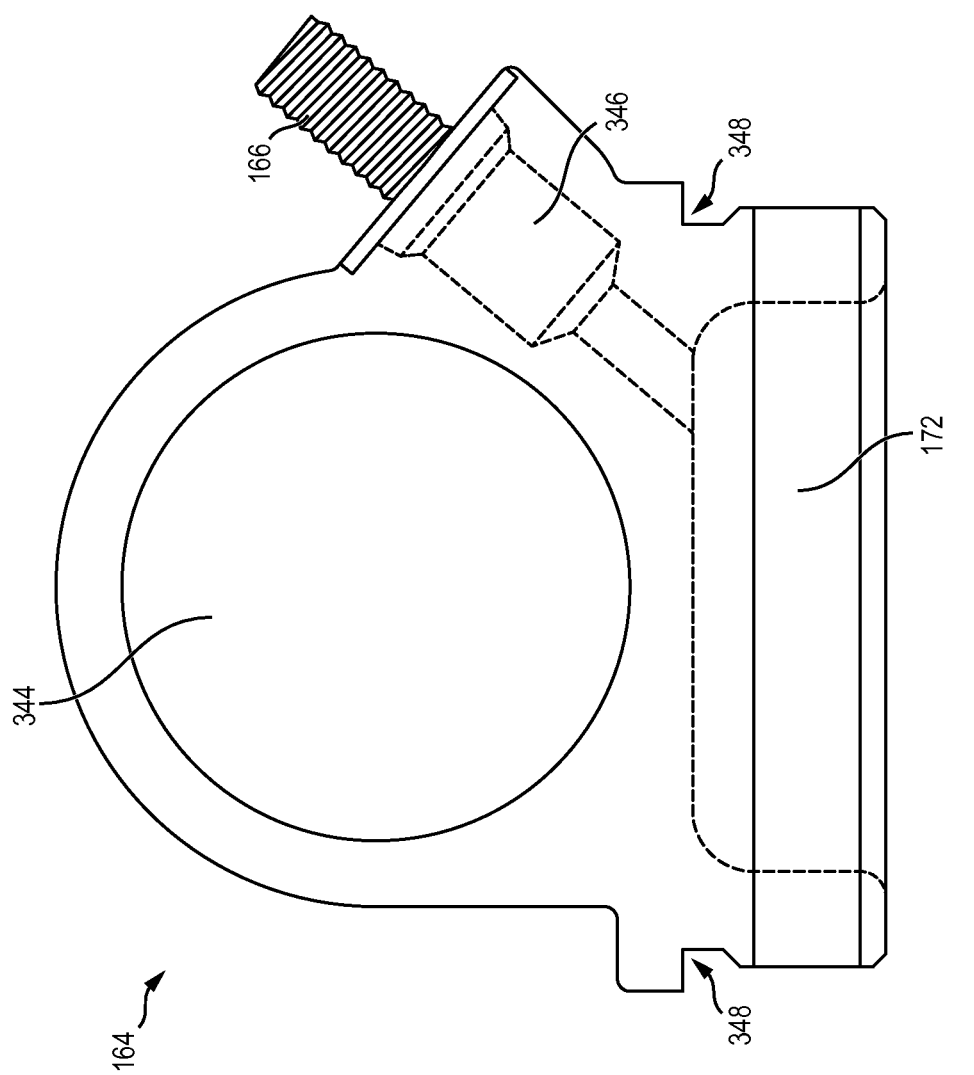
FIG. 8 illustrates a lower shock mount with Schrader valve.

FIG. 8 illustrates lower shock mount 164 of air spring shocks 68 and 88. Lower shock mount 164 includes a hole 344 for pivotally mounting air spring shocks 68 and 88 to axles 113 of arm assemblies 64 and 66, respectively. Lower shock mount 164 includes Schrader valve 166 coupled to an internal pathway 346 for air to enter and leave lower chamber 172. A Dunlop, Presta, or other suitable pneumatic valve can be used in place of Schrader valve 166. Schrader valve 166 includes a spring keeping the Schrader valve closed except when a center pin is depressed. The spring-loaded pin is depressed before air flows through Schrader valve 166. Lower shock mount 164 is inserted into lower body 162 of air spring shocks 68 and 88. Lower shock mount 164 is held into place by lower body 162 mating with ridge 348 which runs around the lower shock mount.

Figure 9A:
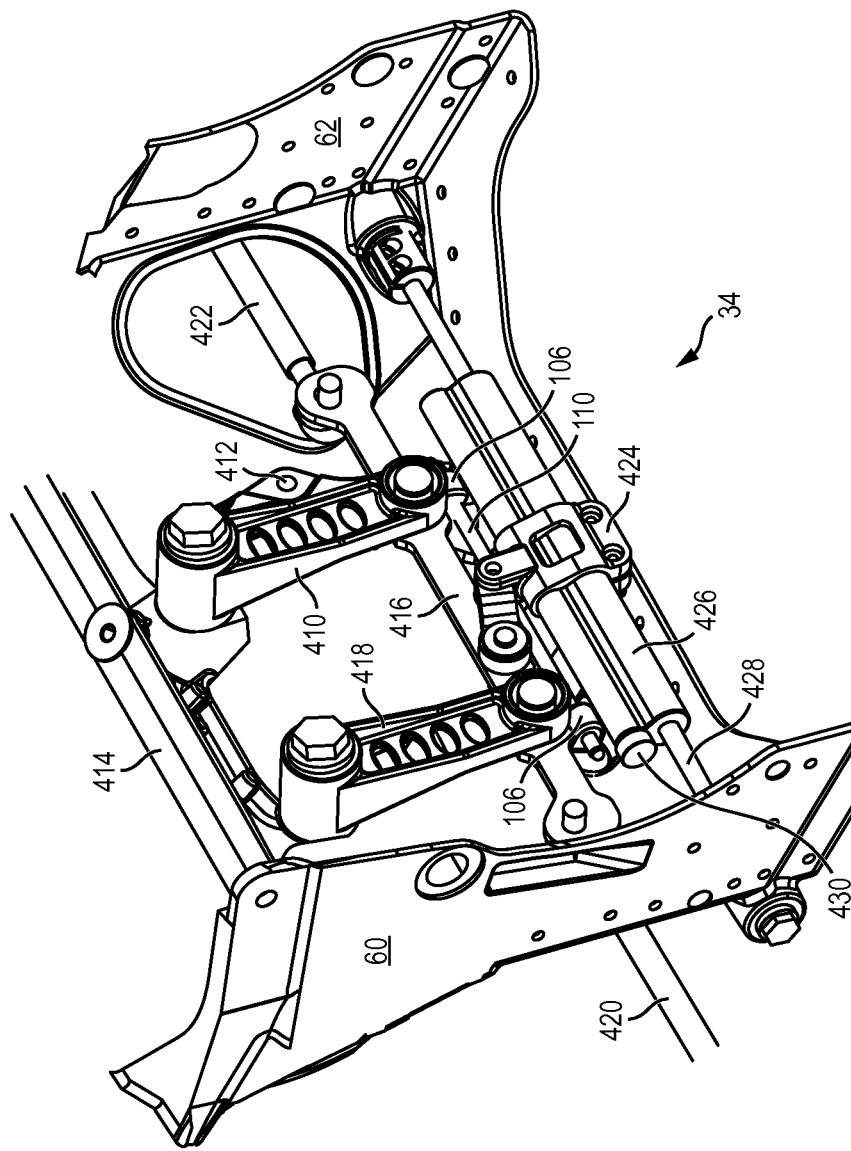
FIGS. 9a-9b illustrate the back of the snowmobile suspension showing inboard steering components.

FIG. 9a illustrates the inboard steering components of suspension 34. Handlebar 20 is mechanically linked to idler arm 410 at point 412. Idler arm 410 is pivotally connected to casting joist 414 and steering bar 416. Idler arm 418 is pivotally connected to casting joist 414 and steering bar 416, and remains generally parallel to idler arm 410. Casting joist 414 is mounted to castings 60 and 62, while steering bar 416 is able to shift left and right as idler arms 410 and 418 pivot on the casting joist. Casting joist 414 and steering bar 416 remain generally parallel as the steering bar moves left and right. Steering rod 420 couples steering bar 416 to the outboard steering components of arm assembly 64. Steering rod 422 couples steering bar 416 to the outboard steering components of arm assembly 66. Steering damper bracket 424 couples steering bar 416 to steering damper 426. Steering damper bracket 424 is pivotally coupled to steering bar 416 to allow the distance between the steering bar and steering damper 426 to change with the pivot of idler arms 410 and 418. Steering damper rod 428 is disposed through steering damper 426 and coupled to castings 60 and 62 at opposite ends of the steering damper rod.

Idler arms 410 and 418 are coupled to casting joist 414 by bolts disposed through holes in the top of the idler arms. The bolts are screwed into casting joist 414. Ball bearings are disposed between the bolts and idler arms 410 and 418 to reduce friction. The bolts include bolt heads bigger than the holes in idler arms 410 and 418. The bolt heads keep idler arms 410 and 418 on the bolts. Alternatively, the bolt heads are smaller than the holes in idler arms 410 and 418, and a washer or other suitable means is used to keep the idler arms on the bolts.

Idler arms 410 and 418 are coupled to steering bar 416 by axles disposed through holes in the bottom of the idler arms. The axles are screwed into steering bar 416 or held onto the steering bar by other suitable means. Sleeve bearings are disposed between idler arms 410 and 418 and the axles to reduce friction.

Steering damper bracket 424 includes an arm pivotally coupled to steering bar 416. An axle is disposed through the arm of steering damper bracket 424 and mated to steering bar 416. A ball bearing is disposed between the axle and the arm of steering damper bracket 424 to reduce friction when the arm pivots. The arm of steering damper bracket 424 is pivotally connected to the body of the steering damper bracket by an axle disposed through the arm and body of the steering damper bracket. Steering damper bracket 424 is disposed around steering damper 426. Steering damper bracket 424 includes screws used to clamp the steering damper bracket down around steering damper 426. When steering damper bracket 424 is clamped down on steering damper 426, the steering damper is held in the steering damper bracket and moves with the steering damper bracket and steering bar 416.

Steering damper rod 428 is mounted between castings 60 and 62. Steering damper rod 428 has a metal piece with female threads clamped to the left side and right side of the steering damper rod. One metal piece is disposed through casting 60 and another metal piece is disposed through casting 62. Bolts are disposed through castings 60 and 62 and screwed into respective metal pieces to hold the metal pieces in the castings.

Steering rods 420 and 422 include axles on the inboard end of the steering rods. The axle of steering rod 420 is inserted through a hole on the left end of steering bar 416. The axle of steering rod 422 is inserted through a hole on the right end of steering bar 416. The axles include threads and are held through steering bar 416 by a nut screwed onto the threads or other suitable means. The axles connecting steering rods 420 and 422 to steering bar 416 allow the steering rods to pivot on the steering bar. When arm assemblies 64 and 66 pivot up or down, the outboard steering components are moved with respect to castings 60 and 62. Steering rods 420 and 422 pivot on steering bar 416 so that the outboard steering components are physically coupled to steering bar 416 at the various lean angles of snowmobile 10.

When rider 14 turns handlebar 20 to steer snowmobile 10, the movement is transmitted by a power steering system of the snowmobile to a pivotal motion of idler arm 410. Steering bar 416 is moved left or right by the pivoting of idler arm 410, and idler arm 418 is pivoted by the motion of the steering bar. Idler arms 410 and 418 pivoting maintain steering bar 416 in a horizontal orientation. The motion of steering bar 416 is transferred through steering rods 420 and 422 outboard to the ski bracket assemblies to turn skis 30 and 32.

Steering damper 426 applies resistance to the movement of the steering system. Steering damper 426 contains a fluid forced through an adjustable valve as the steering damper travels along steering damper rod 428. The fluid forced through the adjustable valve provides a resistance to the steering motion. The adjustable valve, and thus the resistance of steering damper 426, is adjusted using adjustment knob 430. The resistance of steering damper 426 reduces the effect of lateral forces applied to skis 30 and 32 by hazards in terrain 12 transferring through the steering components to handlebar 20. Skis 30 and 32 experience a rotational force from sliding into rocks or other hazards on terrain 12. A force transferred from hazards in terrain 12 to handlebar 20 can knock the handlebar out of the hands of rider 14, potentially causing loss of control of the snowmobile and injury to the rider. Steering damper 426 is used because of the longer skis of snowmobile 10 compared to a snowmobile without leaning capability. Skis 30 and 32 act as a longer lever than the shorter skis on a snowmobile without leaning capability. The longer lever of skis 30 and 32 acts to amplify the forces felt from terrain 12. Steering damper 426 acts to isolate handlebar 20 from forces on skis 30 and 32. Steering by rider 14 is less affected by steering damper 426 because the rider's steering motions are slower and controlled. Steering damper 426 is tuned to resist faster movements the steering components experience when skis 30 and 32 impact hazards on terrain 12.

Tie pieces 106 are inserted through castings 60 and 62 and into hollow tubes 108 of lower control arms 76 and 96. Tie pieces 106 are inserted through the front of castings 60 and 62 and into the other side of hollow tubes 108. Tie pieces 106 pivotally couple lower control arms 76 and 96 to castings 60 and 62. Structural rods 110 mechanically couple lower control arm 76 to lower control arm 96 through tie pieces 106. One structural rod 110 is disposed in front of castings 60 and 62 to couple the front side of hollow tube 108, and one structural rod 110 is disposed on the back side of the castings to couple the front side of the hollow tube. Structural rod 110 provides extra support to castings 60 and 62 to reduce wear and tear on the castings when under the pressure of leaning snowmobile 10.

Figure 9B:
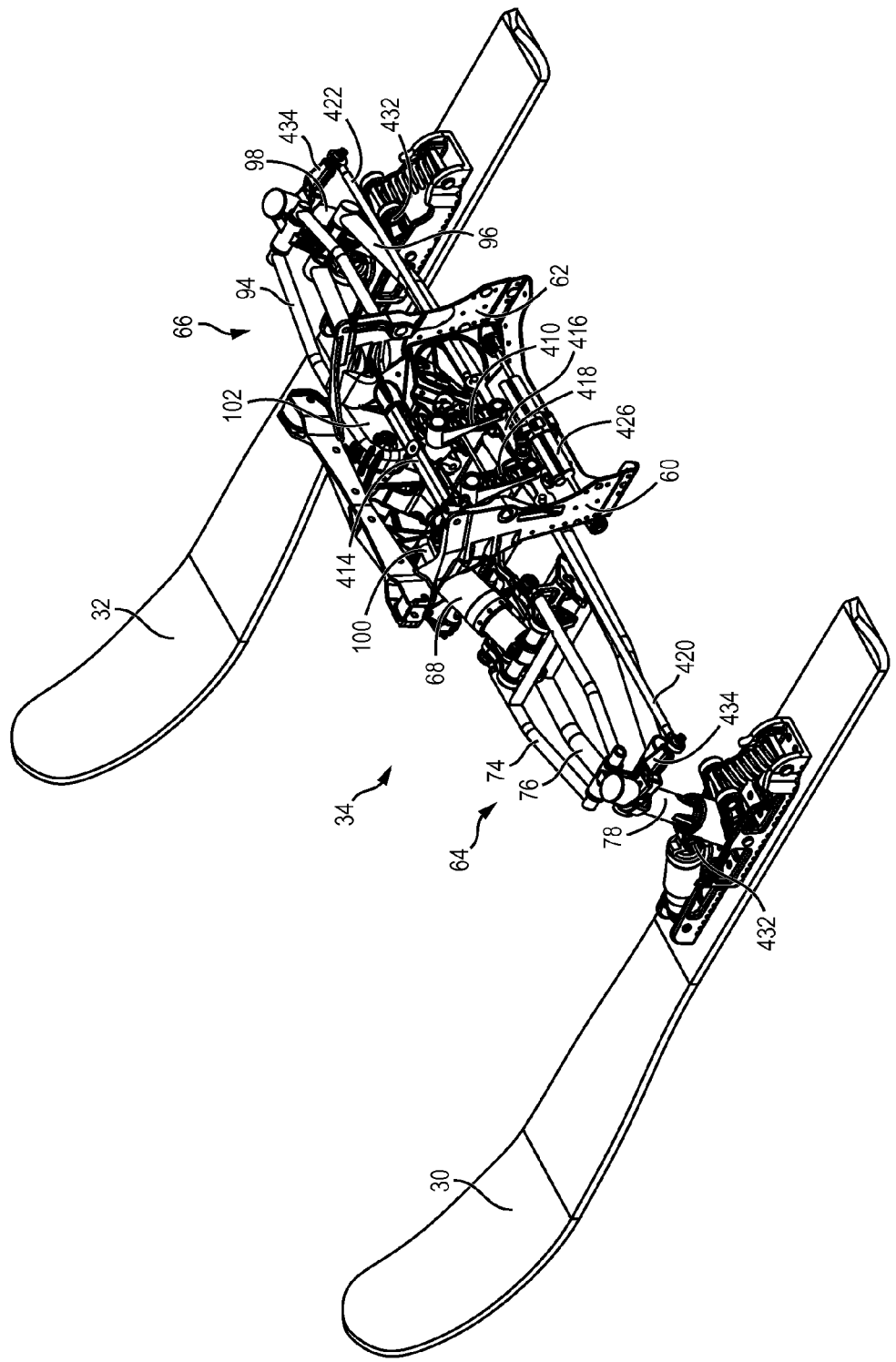

FIG. 9*b* illustrates the inboard steering components from FIG. 9*a* in the context of suspension 34. Steering rods 420 and 422 couple the inboard steering components to the outboard steering components of ski bracket assemblies 432. Steering rods 420 and 422 have inboard ends pivotally coupled to steering bar 416. The outboard ends of steering rods 420 and 422 are coupled to steering arms 434. When steering bar 416 moves left or right in response to steering by rider 14, steering rods 420 and 422 push on steering arms 434. Steering arms 434 rotate around spindle shaft housings 78 and 98. The components of ski bracket assemblies 432 transfer the rotation of steering arms 434 to a rotation of skis 30 and 32.

Figure 10A:
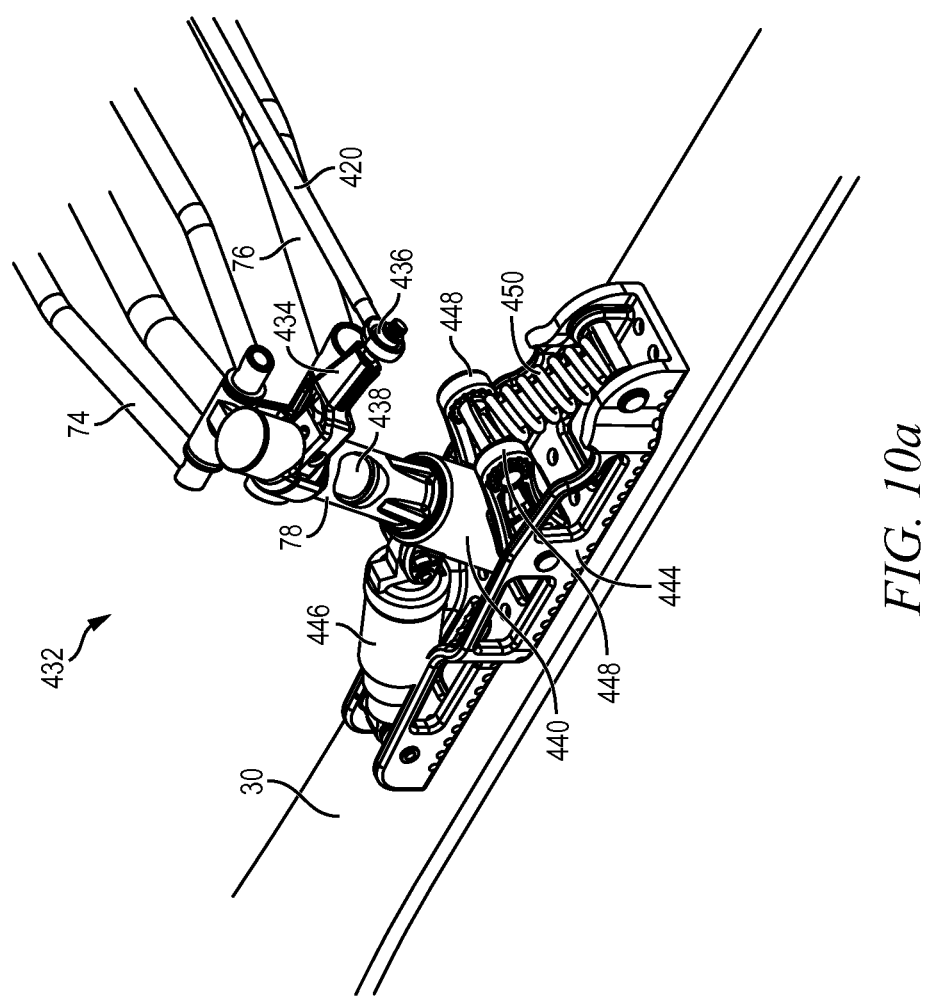
FIGS. 10a-10b illustrate the ski bracket assembly showing outboard steering components.

FIG. 10*a* illustrates left ski bracket assembly 432. The right ski bracket assembly is a mirror image of left ski bracket assembly 432, and includes the same elements operating in the same manner. The outboard side of steering rod 420 is pivotally connected to steering arm 434 at ball joint 436. Steering arm 434 is through an opening in spindle shaft housing 78 and mated to spindle 438. Spindle 438 is mated at the bottom of the spindle to spindle housing 440. Spindle housing 440 and spindle shaft housing 78 cover spindle 438. Spindle housing 440 rotates with respect to spindle shaft housing 78. Ski bracket 444 is pivotally connected to spindle housing 440. Air spring shock 446 is pivotally connected between ski bracket 444 and spindle housing 440. Spindle housing 440 includes arms 448 with spring 450 pivotally connected between the arms and ski bracket 444. A telescoping shaft is disposed through spring 450 to hold the spring in place. A flat bottom surface of ski bracket 444 is mated to a flat top surface of ski 30 by nuts and bolts or other suitable method.

Ball joint 436 is disposed on the end of a bolt screwed into steering arm 434. When steering rod 420 moves steering arm 434 left or right, the steering arm rotates. The rotation of steering arm 434 changes the angle between steering rod 420 and steering arm 434. Ball joint 436 keeps steering arm 434 coupled to steering rod 420 as the angle between the steering arm and steering rod changes. When suspension 34 leans one way or the other, ski bracket assembly 432 leans with the suspension. The leaning of ski bracket assembly 432 changes the location of the inboard steering components with respect to the outboard steering components. Ball joint 436 allows steering rod 420 to pivot up and down to keep the inboard components coupled to the outboard components at varying lean angles of suspension 34. Ball joint 436 is used to allow both the lateral rotation of steering arm 434 and the vertical rotation of steering rod 420.

Spindle 438 is mated to steering arm 434 inside spindle shaft housing 78. When steering rod 420 rotates steering arm 434, the steering arm rotates spindle 438.

Spindle 438 is mated to spindle housing 440. When spindle 438 is rotated, spindle housing 440 rotates with the spindle. Ski bracket 444, spring 450, air spring shock 446, and ski 30 are coupled to spindle housing 440 and rotate with the spindle housing.

Ski bracket assembly 432 includes ski bracket 444 pivotally coupled to spindle housing 440. An axle is disposed through ski bracket 444 and spindle housing 440. Ski bracket 444 is pivoted on spindle housing 440 by vertical forces exerted by terrain 12 on ski 30. If the front tip of ski 30 is forced up by terrain 12, air spring shock 446 is compressed. If the front tip of ski 30 is forced down by terrain 12, spring 450 is compressed.

Ski bracket assembly 432 includes air spring shock 446 pivotally coupled to spindle housing 440. An axle is disposed through the top end of air spring shock 446 and through spindle housing 440 to provide the pivotal connection. Sleeve bearings are used to reduce friction between the axle and air spring shock 446. The bottom of air spring shock 446 is pivotally coupled to ski bracket 444 using an axle in the same manner.

Ski bracket assembly 432 includes spring 450 pivotally coupled to arms 448 of spindle housing 440. An axle between arms 448 includes a round flat surface for the top of spring 450 to push against. Sleeve bearings are disposed between the axle and arms 448 to reduce friction. Spring 450 is pivotally coupled to ski bracket 444 by an axle used in the same manner. Both axles include round flat portions for spring 450 to push against. The round flat portion of the axles can be one piece with the axles, or a separate piece disposed on the axles. A telescoping shaft is disposed through spring 450 and connected to the two axles. The telescoping shaft keeps spring 450 on the axles. A sleeve bearing is disposed between the pieces of the telescoping shaft to reduce friction when spring 450 compresses or expands.

Rider 14 turning handlebar 20 causes a horizontal motion of steering rod 420 which turns steering arm 434. Steering arm 434 turns spindle 438. Spindle 438 turns spindle housing 440. Spindle housing 440 turns ski bracket 444, air spring shock 446, and spring 450. Ski bracket 444 turns ski 30. Snowmobile 10 follows the angle of skis 30 and 32 as the snowmobile moves forward. When skis 30 and 32 are turned, the forward motion of snowmobile 10 causes the snowmobile to turn to the angle of the skis.

Air spring shock 446 and spring 450 apply an initial opposing balance force between spindle housing 440 and ski bracket 444. The opposing forces of air spring shock 446 and spring 450 keep ski 30 generally horizontal while allowing the ski to change pitch as terrain 12 varies. When snowmobile 10 hits a change in the pitch of terrain 12, air spring shock 446 and spring 450 soften the effect felt by rider 14 to give the rider a smoother ride.

Spring 450 adds safety to snowmobile 10 by virtue of the spring having a negligible failure rate compared to air spring shock 446. Upon failure of air spring shock 446, spring 450 will force the tips of ski 30 up into the air. If ski 30 points down on a failure, the tip of the ski will get stuck in terrain 12 and snowmobile 10 will flip forward and injure the rider if travelling at high speed when the failure occurs.

Upper control arm 74 and lower control arm 76 lean ski bracket assembly 432. When hydraulic system 120 leans casting 60, the leaning motion of casting 60 is transferred outboard through upper control arm 74 and lower control arm 76 to force ski bracket assembly 432 to lean accordingly.

Figure 10B:
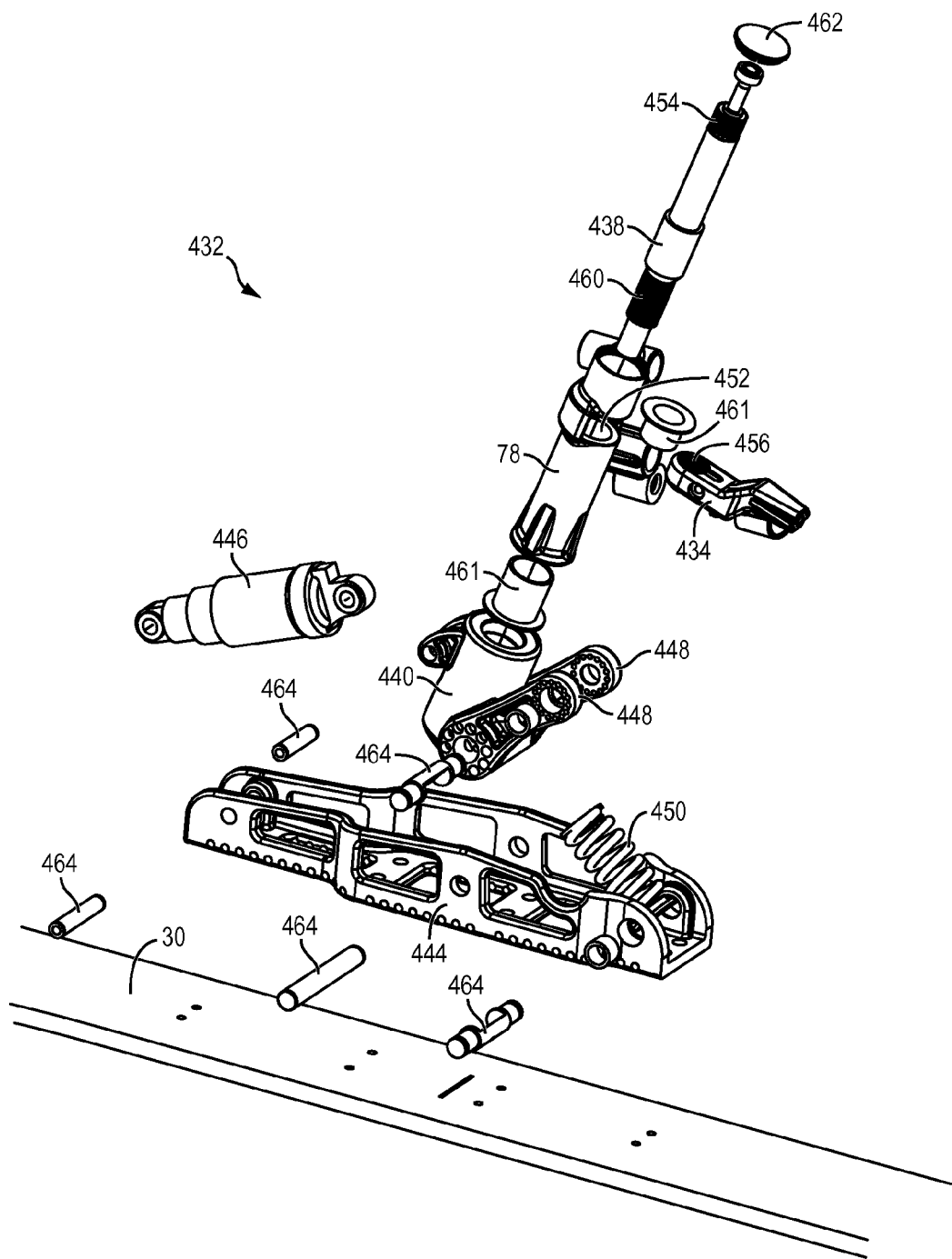

FIG. 10*b* illustrates the parts of ski bracket assembly 432. Steering arm 434 connects to spindle 438 through opening 452 in spindle shaft housing 78. Spindle 438 has teeth 454 that mate with teeth 456 inside steering arm 434 to keep the spindle and steering arm rotating in unison. Spindle 438 has teeth 460 which mate with teeth inside spindle housing 440, keeping the spindle and spindle housing rotating in unison. Flanged bushings or sleeve bearings 461 are disposed between spindle 438 and spindle shaft housing 78 to reduce friction. Spindle cap 462 attaches to spindle shaft housing 78 above spindle 438 to seal out dirt and other contaminants.

Spindle housing 440, air spring shock 446, spring 450, and ski bracket 444 are pivotally connected with axles 464.

Consider a first mode of operating snowmobile 10 wherein rider 14 is an outdoorsman living in a small town in Alaska. During the winter months, the area where rider 14 lives is covered in several feet of snow. Rider 14 likes to perform outdoor activities in the winter such as hunting, camping, and ice fishing. To facilitate said outdoor activities, rider 14 purchases snowmobile 10. Snowmobile 10 allows rider 14 to travel over established snowmobile paths near his town, as well as snowy terrain with no established paths. Rider 14 uses snowmobile 10 to travel to the various locations around his town where outdoor activities are performed.

Rider 14 decides to go hunting and walks to a shed in which he previously parked snowmobile 10. Rider 14 mounts snowmobile 10 by lifting one leg over snowmobile body 40 and sitting on seat 16. Rider 14 starts the engine of snowmobile 10 and puts the snowmobile in reverse gear in order to back out of the shed. In reverse gear, the engine drives track 28 so that the bottom of track 28 moves from the back of snowmobile 10 toward the front of the snowmobile. Snowmobile 10 has geared guide wheels 42 at the front of track 28 rotated by the engine to push the track in a circuitous path. Guide wheels 42 and slide rail 44 control the shape of track 28.

While in reverse gear, rider 14 pulls on throttle lever 24 to increase the RPMs of the engine, beginning movement of track 28 around guide wheels 42 and slide rail 44. Track 28 has good grip on terrain 12, i.e., the floor of the shed. As the bottom of track 28 moves with respect to snowmobile 10, the grip of the track on terrain 12 keeps the track static against the terrain. The movement of track 28 around guide wheels 42 and slide rail 44 pushes snowmobile 10 backward and out of the shed.

While partially pulled out of the shed, rider 14 notices that snowmobile 10 is slowly leaning to the left when no pressure is applied to handlebar 20. Rider 14 releases throttle lever 24 and snowmobile 10 quickly comes to a stop. Snowmobile 10 stops naturally without rider 14 pulling brake lever 26 because of friction on track 28. At higher speeds, or if rider 14 wants to stop snowmobile 10 quicker than would naturally occur, the rider pulls brake lever 26 to bring the snowmobile to a stop. Once stopped, rider 14 presses down slightly on the right side of handlebar 20 with his hand to temporarily stop snowmobile 10 from leaning. Rider 14 removes his hand from handlebar 20 and snowmobile 10 continues to slowly lean toward the left. Rider 14 operates the GUI of control panel 122, using control buttons 132 to access the settings for leaning configuration. While applying no force on handlebar 20, rider 14 initializes the procedure for zeroing out load cells 242. The interface board within control panel 122 stores the values from load cells 242 into memory as the zero point. Snowmobile 10 stops leaning slowly leftward. Subsequent leaning will be calculated based on the difference in pressure on handlebar 20 from the zero point that rider 14 set.

With the errant leaning resolved, rider 14 again pulls throttle lever 24 to continue pulling snowmobile 10 out of the shed. Once snowmobile 10 is a sufficient distance from the shed, rider 14 puts the snowmobile in forward gear. In forward gear, the engine drives track 28 around guide wheels 42 and slide rail 44 with the bottom of the track moving from the front of snowmobile 10 toward the back of the snowmobile. Rider 14 pulls on throttle lever 24 to increase the RPMs of the engine, beginning movement of track 28. Track 28 has good grip on terrain 12, i.e., a snowy driveway. As the bottom of track 28 moves with respect to snowmobile 10, the grip of the track on terrain 12 keeps the track static against the terrain. The movement of track 28 around guide wheels 42 and slide rail 44 pushes snowmobile 10 forward.

Once snowmobile 10 is moving forward, rider 14 turns snowmobile 10 to travel in a direction toward the hunting location. Rider 14 turns snowmobile 10 to the right because the main road is to the right. To execute a right turn of snowmobile 10, rider 14 uses his hands to pull the right side of handlebar 20 toward him and push the left side of the handlebar away from him.

The rotation of handlebar 20 turns biasing block 50 and control panel 122 which are attached under the handlebar. Biasing block 50 is attached on top of a steering column. The rotation of handlebar 20 is transferred through biasing block 50 to rotate the steering column. The steering column actuates a power steering module of snowmobile 10 which pivots idler arm 410 via a connection at point 412. Casting joist 414, steering bar 416, and idler arms 410 and 418 are pivotally coupled in a parallelogram shape and pivot in reaction to the power steering module. To turn snowmobile 10 to the right, idler arms 410 and 418 pivot on casting joist 414 toward the left side of the snowmobile, i.e., clockwise as viewed in FIG. 9a.

The pivoting of idler arms 410 and 418 on casting joist 414 moves steering bar 416 toward the left side of snowmobile 10. As steering bar 416 moves to the left, steering damper bracket 424 and steering damper 426 are pulled to the left by the steering bar. Steering damper rod 428 is mounted to castings 60 and 62 and remains stationary with respect to the castings. Steering damper rod 428 includes a plunger internal to steering damper 426 which pushes fluid in a circuitous path through the steering damper when the steering damper moves on the steering damper rod. Steering damper 426 includes an internal valve that the fluid is forced through. The fluid being forced through the internal valve of steering damper 426 provides resistance to the movement of the steering damper on steering damper rod 428. The resistance of steering damper 426 has less of an effect on rider 14 when he turns snowmobile 10 than on a hazard of terrain 12 pushing ski 30 or 32. The internal valve is tuned to faster movements of the steering system experienced when ski 30 or 32 hits a hazard on terrain 12.

While rider 14 is turning handlebar 20, steering damper 426 is being pulled left on steering damper rod 428 by steering bar 416. Idler arms 410 and 418 move in a circular motion which raises steering bar 416 within castings 60 and 62. Steering damper bracket 424 pivots at the connection point with steering bar 416 to remain coupled even though the steering bar has moved further away from steering damper 426.

The leftward motion of steering bar 416 pushes steering rod 420 to the left and pulls steering rod 422 to the left. Steering rod 420 pushes steering arm 434 of the left ski bracket assembly 432 to the left. Steering rod 422 pulls steering arm 434 of the right ski bracket assembly 432 to the left. Steering arms 434 rotate around spindles 438 to turn skis 30 and 32 while steering rods 420 and 422 remain at an approximately static angle with respect to terrain 12 to couple the outboard steering components to the inboard steering components. Steering rods 420 and 422 are coupled to steering arms 434 via ball joints 436 which allows the change in angle of the steering arms with respect to the steering rods. To execute a right turn of snowmobile 10, steering arms 434 rotate to point back toward the left side of the snowmobile. Steering arms 434 turn spindles 438 inside of spindle shaft housings 78 and 98. Spindles 438 turn spindle housings 440. Spindle housings 440 turn air spring shocks 446, springs 450, ski brackets 444, and skis 30 and 32.

Now that rider 14 is moving forward with skis 30 and 32 rotated so the fronts of the skis are to the right, snowmobile 10 begins to rotate to the right. The left edge of skis 30 and 32 catch on terrain 12 to convert the forward motion of snowmobile 10 into a lateral force to the right.

The present right turn is occurring at relatively slow velocity which produces very little centrifugal force on snowmobile 10. Due to the slow speed and low centrifugal force, rider 14 turns snowmobile 10 without leaning the snowmobile. The centrifugal force of the slow turn is low compared to the force of gravity and snowmobile 10 remains upright.

Rider 14 holds the position of handlebar 20 while snowmobile 10 continues to rotate. When snowmobile 10 has rotated to the desired direction of travel, rider 14 uses his hands to apply force to handlebar 20, returning the handlebar to a centered position, i.e., perpendicular to snowmobile 10. The rotation of handlebar 20 turns biasing block 50 and control panel 122 which are attached under the handlebar. Biasing block 50 is attached on top of a steering column. The rotation of handlebar 20 is transferred through biasing block 50 to rotate the steering column. The steering column actuates a power steering module of snowmobile 10 which pivots idler arm 410 via a connection at point 412. Casting joist 414, steering bar 416, and idler arms 410 and 418 pivot in reaction to the power steering module. To complete the right turn and travel in a straight line, idler arms 410 and 418 are pivoted to the right to return to a centered position.

The pivoting of idler arms 410 and 418 on casting joist 414 moves steering bar 416 back to the center of castings 60 and 62. As steering bar 416 moves back to the right, steering damper bracket 424 and steering damper 426 are pulled back to the right. Steering damper rod 428 is attached to castings 60 and 62 and remains stationary with respect to the castings. Idler arms 410 and 418 pivot in a circular motion which lowers steering bar 416 closer to steering damper 426. Steering damper bracket 424 pivots at the connection point with steering bar 416 to remain coupled to the steering bar.

The rightward motion of steering bar 416 pulls steering rod 420 to the right and pushes steering rod 422 to the right. Steering rod 420 pulls steering arm 434 of the left ski bracket assembly 432 to the right. Steering rod 422 pushes steering arm 434 of the right ski bracket assembly 432 to the right. For snowmobile 10 to travel in a straight line, steering arms 434 are rotated to point straight backwards. Steering arms 434 turn spindles 438 inside of spindle shaft housings 78 and 98. Spindles 438 turn spindle housings 440. Spindle housings 440 turn air spring shocks 446, springs 450, ski brackets 444, and skis 30 and 32.

Now moving forward with skis 30 and 32 returned to point straight forward, rider 14 pulls throttle lever 24 to increase the speed of snowmobile 10. Rider 14 travels on snowmobile 10 to the end of his driveway, where the pitch of the driveway slopes down to reach the level of the road. Skis 30 and 32 reach the sloped portion of the driveway while track 28 is still on the flat portion of the driveway. The slope of the driveway forces the back of skis 30 and 32 upward as gravity pulls the skis down onto the sloped portion of the driveway, so that the skis are at the same slope as the driveway. When the pitch of skis 30 and 32 changes so that the skis point down toward the road, the movement of the skis changes the pitch of ski brackets 444. Ski brackets 444 change pitch by pivoting on spindle housings 440. When ski brackets 444 change pitch so the fronts of the ski brackets point down toward the road, springs 450 are compressed and air spring shocks 446 expand in size. The compression of springs 450 dampens the shock felt by rider 14.

Snowmobile 10 continues to travel forward, and shortly reaches a point where both track 28 and skis 30 and 32 are on the slope of the driveway. When track 28 is on the driveway slope, skis 30 and 32 and the track are at the same pitch again. Snowmobile body 40 changes pitch with track 28 when the track moves onto the driveway slope. Ski brackets 444 change pitch relative to snowmobile body 40. Spring 450 and air spring shock 446 return to their neutral positions.

Skis 30 and 32 reach the horizontal road and again change pitch because track 28 is still on the sloped driveway. The road forces the tips of skis 30 and 32 upwards. The change in pitch of skis 30 and 32 compresses air spring shocks 446 and allows springs 450 to expand. When track 28 reaches the road, the track is once again the same pitch as skis 30 and 32. Springs 450 are compressed and air spring shocks 446 are expanded back to neutral.

Now that rider 14 has reached the road on snowmobile 10, he turns left to head out of town toward his hunting location. To execute a left turn of snowmobile 10, rider 14 uses his hands to apply a force on handlebar 20 pulling the left side of the handlebar toward him and pushing the right side of the handlebar away from him.

The force rider 14 applies on handlebar 20 causes the handlebar to rotate. The rotation of handlebar 20 turns biasing block 50 and control panel 122 which are mounted under the handlebar. Biasing block 50 is mounted on top of a steering column. The rotation of handlebar 20 is transferred through biasing block 50 to rotate the steering column. The steering column actuates a power steering module of snowmobile 10 which pivots idler arm 410 via a connection at point 412. Casting joist 414, steering bar 416, and idler arms 410 and 418 are pivotally coupled in a parallelogram shape and pivot in reaction to the power steering module. To turn snowmobile 10 to the left, idler arms 410 and 418 pivot on casting joist 414 toward the right side of the snowmobile, i.e., counter-clockwise as viewed in FIG. 9*a*.

The pivoting of idler arms 410 and 418 on casting joist 414 moves steering bar 416 toward the right side of snowmobile 10. As steering bar 416 moves to the right, steering damper bracket 424 and steering damper 426 are pulled to the right by the steering bar. Steering damper rod 428 is attached to castings 60 and 62 and remains stationary with respect to the castings. Steering damper rod 428 includes a plunger internal to steering damper 426 which pushes fluid in a circuitous path through the steering damper when the steering damper moves on the steering damper rod. Steering damper 426 includes an internal valve that the fluid is forced through. The fluid being pushed through the internal valve of steering damper 426 provides resistance to the movement of the steering damper on steering damper rod 428. The resistance of steering damper 426 has less of an effect on rider 14 when he turns snowmobile 10 than on a hazard of terrain 12 pushing ski 30 or 32. The internal valve is tuned to faster movements of the steering system experienced when ski 30 or 32 hits a hazard on terrain 12.

While rider 14 is turning handlebar 20, steering damper 426 is being pulled right on steering damper rod 428 by steering bar 416. Idler arms 410 and 418 move in a circular motion which raises steering bar 416 within castings 60 and 62. Steering damper bracket 424 pivots at the connection point with steering bar 416 to remain coupled even though the steering bar has moved further away from steering damper 426.

The rightward motion of steering bar 416 pulls steering rod 420 to the right and pushes steering rod 422 to the right. Steering rod 420 pulls steering arm 434 of the left ski bracket assembly 432 to the right. Steering rod 422 pushes steering arm 434 of the right ski bracket assembly 432 to the right. Steering arms 434 rotate around spindles 438 to turn skis 30 and 32 while steering rods 420 and 422 remain at an approximately static angle with respect to terrain 12 to couple the outboard steering components to the inboard steering components. Steering rods 420 and 422 are coupled to steering arms 434 via ball joints 436 which allows the change in angle of the steering arms with respect to the steering rods. To execute a left turn of snowmobile 10, steering arms 434 rotate to point back toward the right side of the snowmobile. Steering arms 434 turn spindles 438 inside of spindle shaft housings 78 and 98. Spindles 438 turn spindle housings 440. Spindle housings 440 turn air spring shocks 446, springs 450, ski brackets 444, and skis 30 and 32.

Now moving forward with skis 30 and 32 rotated so the fronts of the skis are to the left, snowmobile 10 begins to rotate to the left. The right edge of skis 30 and 32 catch on terrain 12 to convert the forward motion of snowmobile 10 into a lateral force to the left.

The present left turn is occurring at relatively slow velocity which produces very little centrifugal force on snowmobile 10. Due to the slow speed and low centrifugal force, rider 14 turns snowmobile 10 without leaning the snowmobile. The centrifugal force of the slow turn is low compared to the force of gravity and there is no threat of rolling snowmobile 10.

Rider 14 holds the position of handlebar 20 while snowmobile 10 continues to rotate. When snowmobile 10 has rotated to the desired direction of travel, i.e., parallel with the road, rider 14 returns handlebar 20 to the centered position. The rotation of handlebar 20 turns biasing block 50 and control panel 122 which are attached under the handlebar. Biasing block 50 is attached on top of a steering column. The rotation of handlebar 20 is transferred through biasing block 50 to rotate the steering column. The steering column actuates a power steering module of snowmobile 10 which pivots idler arm 410 via a connection at point 412. Casting joist 414, steering bar 416, and idler arms 410 and 418 pivot in reaction to the power steering module. To complete the left turn and travel in a straight line, idler arms 410 and 418 are pivoted to the left to return to a centered position.

The pivoting of idler arms 410 and 418 on casting joist 414 moves steering bar 416 back to the center of castings 60 and 62. As steering bar 416 moves back to the left, steering damper bracket 424 and steering damper 426 are pulled back to the left. Steering damper rod 428 is attached to castings 60 and 62 and remains stationary with respect to the castings. Idler arms 410 and 418 pivot in a circular motion which lowers steering bar 416 closer to steering damper 426. Steering damper bracket 424 pivots at the connection point with steering bar 416 to remain coupled to the steering bar.

The leftward motion of steering bar 416 pushes steering rod 420 to the left and pulls steering rod 422 to the left. Steering rod 420 pushes steering arm 434 of the left ski bracket assembly 432 to the left. Steering rod 422 pulls steering arm 434 of the right ski bracket assembly 432 to the left. For snowmobile 10 to travel in a straight line, steering arms 434 are rotated to point straight backwards. Steering arms 434 turn spindles 438 inside of spindle shaft housings 78 and 98. Spindles 438 turn spindle housings 440. Spindle housings 440 turn air spring shocks 446, springs 450, ski brackets 444, and skis 30 and 32.

Now that rider 14 has safely steered snowmobile 10 onto the road, the rider pulls further on throttle lever 24 to increase the speed of the snowmobile. Pulling throttle lever 24 further down causes the engine to run at higher RPMs. The higher RPMs of the engine drives track 28 around guide wheels 42 and slide rail 44 at a faster rate. The faster rate of track 28 pushes snowmobile 10 with more force and causes the snowmobile to accelerate.

Rider 14 travels at a high rate of speed for a few blocks until he reaches a crossroad that will take him to his hunting location. Rider 14 wants to turn right to head out of town. For this right turn, rider 14 leans snowmobile 10 to the right to counteract the centrifugal force. Leaning snowmobile 10 lets rider 14 take the turn while keeping his speed high.

When rider 14 gets to the intersection, he leans his weight and pulls on handlebar 20 to execute a right lean of snowmobile 10. Rider 14 also turns handlebar 20 slightly to rotate skis 30 and 32 to the right. Leaning snowmobile 10 to the right is caused by rider 14 applying a force upward on the left side of handlebar 20 and downward on the right side of the handlebar. For rider 14, applying the force on handlebar 20 to lean snowmobile 10 to the right is natural. The force on handlebar 20 to lean snowmobile 10 is as if rider 14 were grabbing the handlebar to lean the snowmobile manually, and is simply receiving assistance from hydraulic system 120.

The force on handlebar 20 is transferred down to biasing block 50 via handlebar risers 252 which hold the handlebar. The force on handlebar 20 causes the right side of gap 246 to close slightly while the left side of gap 246 opens slightly. Plungers 236 are inserted into the lower half of biasing block 50 such that the tops of load cells 242 are in contact with the portion of the biasing block above gap 246. Load cells 242 on the right side of biasing block 50 sense that the right side of gap 246 has closed slightly because the pressure on the right load cells has increased. Load cells 242 on the left side of biasing block 50 sense that the left side of gap 246 has opened slightly because the pressure on the left load cells has decreased.

Load cells 242 convert the pressure sensed into an electric potential on conductors within cables 248. Cables 248 couple load cells 242 to the interface board within control panel 122. The interface board uses an analog-to-digital converter to convert the electric potential to a digital variable within the circuitry of the interface board. The interface board has four digital variables representing the output of the four load cells 242. The interface board uses the four digital variables to calculate the force rider 14 has applied to handlebar 20. Alternatively, load cells 242 output a digital signal on cables 248.

Unbeknownst to rider 14, one of the load cells 242 on the right side of biasing block 50 is faulty and outputs an invalid value. The interface board first recognizes that the two load cells 242 on the right side of biasing block 50 are generating significantly different digital variables on the interface board. The interface board then decides which load cell 242 output value to use. The bad load cell 242 in this case is outputting a value that does not vary over time, and the interface board automatically uses the load cell that has a varying output. Other suitable methods to detect faulty load cells 242 can be used. Because biasing block 50 has redundant load cells 242, the leaning of snowmobile 10 operates normally with a malfunctioning load cell.

After calculating the force rider 14 has applied to handlebar 20, the interface board applies a gain and generates a signal output to motor driver 124. The gain value is a multiplier that dictates how much hydraulic fluid is pumped through hydraulic system 120 for a given force applied to handlebar 20 by rider 14. A higher gain setting causes hydraulic system 120 to pump more hydraulic fluid for the same force on handlebar 20, thus providing more assistance to rider 14 in leaning snowmobile 10. Motor driver 124 contains a power amplifier to generate enough electric power to power electric motors 260. Motor driver 124 is electrically coupled to electric motors 260.

The electric power from motor driver 124 causes electric motors 260 to turn pulleys 266. Pulleys 266 drive timing belts 270 which turn pulley 268. Electric motors 260 are powered by the same voltage, thus pulleys 266 rotate at the same speed and in the same direction to turn pulley 268. The rotation of pulley 268 turns the driveshaft of hydraulic pump 262 to create hydraulic pressure in hydraulic lines 128.

To lean snowmobile 10 to the right, hydraulic pump 262 raises hydraulic pressure in the hydraulic line 128 coupled to air spring shock 68 and lowers the hydraulic pressure in the hydraulic line coupled to air spring shock 88. The change in pressure created by hydraulic pump 262 in hydraulic lines 128 pulls hydraulic fluid from right air spring shock 88 and forces hydraulic fluid into left air spring shock 68. More specifically, the hydraulic pressure is transferred through hydraulic lines 128, hydraulic valves 146, shock support shafts 148, and hydraulic ports 150 to pull hydraulic fluid out of right upper chamber 170 and force hydraulic fluid into left upper chamber 170. Hydraulic fluid flows from upper chamber 170 of air spring shock 88, through right hydraulic port 150, right shock support shaft 148, right hydraulic valve 146, right hydraulic line 128, hydraulic pump 262, left hydraulic line 128, left hydraulic valve 146, left shock support shaft 148, left hydraulic port 150, and into left upper chamber 170.

The hydraulic fluid pumped out of air spring shock 88 causes upper chamber 170 of the air spring shock to shrink in volume. As right upper chamber 170 shrinks in volume, right upper body 160 is pulled closer to right lower body 162. Right shock support shaft 148 is disposed through casting 62, and right lower shock mount casting 164 is coupled to right axle 113. The force of right upper chamber 170 shrinking and pulling right lower body 162 further into right upper body 160 also pulls casting 62 closer to right arm assembly 66.

The hydraulic fluid pumped into air spring shock 68 causes upper chamber 170 of the air spring shock to expand. As left upper chamber 170 expands, left upper body 160 and left lower body 162 are pushed further apart. Left shock support shaft 148 is disposed through casting 60, and left lower shock mount casting 164 is coupled to left axle 113. The force of left upper chamber 170 expanding and pushing left lower body 162 further out of left upper body 160 also pushes casting 60 further away from left arm assembly 64.

Said hydraulic forces result in air spring shock 88 shrinking and pulling snowmobile body 40 toward arm assembly 66. Air spring shock 68 expands and pushes snowmobile body 40 away from arm assembly 64. Air spring shocks 68 and 88 lean castings 60 and 62, and thus snowmobile body 40.

Arm assembly 64 is pivotally coupled to casting 60 via control link 72 and lower control arm 76. Arm assembly 66 is pivotally coupled to casting 62 via control link 92 and lower control arm 96. Because control links 72 and 92 are connected to castings 60 and 62 above lower control arms 76 and 96, the control links are moved horizontally by the castings more than the lower control arms are moved by the casting. Control links 72 and 92 move horizontally relative to lower control arms 76 and 96 which rotates mechanism arms 70 and 90 toward the right. The rotation of mechanism arms 70 and 90 results in upper control arms 74 and 94 moving toward the right side of snowmobile 10 relative to lower control arms 76 and 96. The relative motion of upper control arms 74 and 94 and lower control arms 76 and 96 leans spindle shaft housings 78 and 98. Spindle shaft housings 78 and 98 lean ski bracket assemblies 432. Ski bracket assemblies 432 lean skis 30 and 32. The result is that skis 30 and 32 are leaned to the right at approximately the same angle as snowmobile body 40.

At the same time that rider 14 pulls handlebar 20 to lean snowmobile 10 right into the turn, the rider rotates handlebar 20 to turn skis 30 and 32 to the right. Turning skis 30 and 32 provides force to turn snowmobile 10 while leaning snowmobile 10 helps rider 14 fight the centrifugal force of the turn. To turn skis 30 and 32 to the right, rider 14 uses his hands to apply a force on handlebar 20 pulling the right side of the handlebar toward him and pushing the left side of the handlebar away.

The rotation of handlebar 20 turns biasing block 50 and control panel 122 which are attached under the handlebar. Biasing block 50 is attached on top of a steering column. The rotation of handlebar 20 is transferred through biasing block 50 to rotate the steering column. The steering column actuates a power steering module of snowmobile 10 which pivots idler arm 410 via a connection at point 412. Casting joist 414, steering bar 416, and idler arms 410 and 418 are pivotally coupled in a parallelogram shape and pivot in reaction to the power steering module. To turn snowmobile 10 to the right, idler arms 410 and 418 pivot on casting joist 414 toward the left side of the snowmobile, i.e., clockwise as viewed in FIG. 9a.

The pivoting of idler arms 410 and 418 on casting joist 414 moves steering bar 416 toward the left side of snowmobile 10. As steering bar 416 moves to the left, steering damper bracket 424 and steering damper 426 are pulled to the left by the steering bar. Steering damper rod 428 is attached to castings 60 and 62 and remains stationary with respect to the castings. Steering damper rod 428 includes a plunger internal to steering damper 426 which pushes fluid in a circuitous path through the steering damper when the steering damper moves on the steering damper rod. Steering damper 426 includes an internal valve that the fluid is forced through. The fluid being forced through the internal valve of steering damper 426 provides resistance to the movement of the steering damper on steering damper rod 428. The resistance of steering damper 426 has less of an effect on rider 14 when he turns snowmobile 10 than on a hazard of terrain 12 pushing ski 30 or 32. The internal valve is tuned to faster movements of the steering system experienced when ski 30 or 32 hits a hazard on terrain 12.

While rider 14 is turning handlebar 20, steering damper 426 is being pulled left on steering damper rod 428 by steering bar 416. Idler arms 410 and 418 move in a circular motion which raises steering bar 416 within castings 60 and 62. Steering damper bracket 424 pivots at the connection point with steering bar 416 to remain coupled even though the steering bar has moved further away from steering damper 426.

The leftward motion of steering bar 416 pushes steering rod 420 to the left and pulls steering rod 422 to the left. Steering rod 420 pushes steering arm 434 of the left ski bracket assembly 432 to the left. Steering rod 422 pulls steering arm 434 of the right ski bracket assembly 432 to the left. Steering arms 434 rotate around spindles 438 to turn skis 30 and 32 while steering rods 420 and 422 remain at an approximately static angle with respect to arm assemblies 64 and 66 to couple the outboard steering components to the inboard steering components. Steering rods 420 and 422 are coupled to steering arms 434 via ball joints 436 which allows the change in angle of the steering arms with respect to the steering rods. To execute a right turn of snowmobile 10, steering arms 434 rotate to point back toward the left side of the snowmobile. Steering arms 434 turn spindles 438 inside of spindle shaft housings 78 and 98. Spindles 438 turn spindle housings 440. Spindle housings 440 turn air spring shocks 446, springs 450, ski brackets 444, and skis 30 and 32.

Turning snowmobile 10 while leaning uses a slight turn of handlebar 20 to cause a significant turn of the snowmobile. Because ski bracket assemblies 432 are leaned with snowmobile 10, turning handlebar 20 forces the front tips of skis 30 and 32 into terrain 12. Skis 30 and 32 remain perpendicular to terrain 12 and the terrain pushes the tips of the skis up relative to ski bracket assemblies 432. The skis pivoting up relative to ski bracket assemblies 432 pivots the skis to the right relative to snowmobile 10 because the ski bracket assemblies are leaned. Terrain 12 pivoting the tips of skis 30 and 32 up relative to ski bracket assemblies 432 acts as an amplification, resulting in the skis aiming further to the right relative to snowmobile body 40 than relative to spindle shaft housings 78 and 98. The force of terrain 12 pushing the tips of skis 30 and 32 up relative to ski bracket assembly 432 compresses air spring shocks 446.

Snowmobile 10 is now travelling with skis 30 and 32 aimed to the right and snowmobile body 40 leaned to the right to execute a right turn of the snowmobile. Arm assembly 64 is to the outside of the turn, and handles more of the centrifugal force of the turn than arm assembly 66. Due to arm assembly 64 experiencing a higher load from centrifugal force, lower chamber 172 of air spring shock 68 is compressed more than lower chamber 172 of air spring shock 88. Air spring shock 68 has a higher spring rate than air spring shock 88. Spring rate describes the amount of force applied by a spring.

Rider 14 holds the position of handlebar 20 while snowmobile 10 continues to turn to the right. When snowmobile 10 has turned to the desired direction of travel, rider 14 applies downward pressure on the left side of handlebar 20 and upward pressure to the right side of the handlebar to bring snowmobile 10 out of the lean and return snowmobile body 40 to a vertical orientation. Rider 14 also returns handlebar 20 to the neutral position, i.e., perpendicular to snowmobile 10.

The force rider 14 applies to handlebar 20 is transferred down to biasing block 50 via handlebar risers 252 which hold the handlebar. The force on handlebar 20 causes the left side of gap 246 to close slightly while the right side of gap 246 opens slightly. Plungers 236 are inserted into the lower half of biasing block 50 such that the tops of load cells 242 are in contact with the portion of the biasing block above gap 246. Load cells 242 on the left side of biasing block 50 sense that the left side of gap 246 has closed slightly because the pressure on the left load cells has increased. Load cells 242 on the right side of biasing block 50 sense that the right side of gap 246 has opened slightly because the pressure on the right load cells has decreased.

Load cells 242 convert the pressure sensed into an electric potential on conductors within cables 248. Cables 248 couple load cells 242 to the interface board within control panel 122. The interface board uses an analog-to-digital converter to convert the electric potential to a digital variable within the circuitry of the interface board. The interface board has four digital variables representing the output of the four load cells 242. The interface board uses the four digital variables to calculate the force rider 14 has applied to handlebar 20. In another embodiment, load cells 242 output a digital signal on cables 248.

After calculating the force rider 14 has applied to handlebar 20, the interface board applies a gain and generates a signal output to motor driver 124. The gain value is a multiplier that dictates how much hydraulic fluid is pumped through hydraulic system 120 for a given force applied to handlebar 20 by rider 14. A higher gain setting causes hydraulic system 120 to pump more hydraulic fluid for the same force on handlebar 20, thus providing more assistance to rider 14 in leaning snowmobile 10. Motor driver 124 contains a power amplifier to generate enough electric power to power electric motors 260. Motor driver 124 is electrically coupled to electric motors 260.

The electric power from motor driver 124 causes electric motors 260 to turn pulleys 266. Pulleys 266 drive timing belts 270 which turn pulley 268. Electric motors 260 are powered by the same voltage, thus pulleys 266 rotate at the same speed and in the same direction to turn pulley 268. The rotation of pulley 268 turns the driveshaft of hydraulic pump 262 to create hydraulic pressure in hydraulic lines 128.

To lean snowmobile 10 back to the neutral position, hydraulic pump 262 raises hydraulic pressure in the hydraulic line 128 coupled to air spring shock 88 and lowers the hydraulic pressure in the hydraulic line coupled to air spring shock 68. The change in pressure created by hydraulic pump 262 in hydraulic lines 128 pulls hydraulic fluid from air spring shock 68 and returns hydraulic fluid to air spring shock 88. More specifically, the hydraulic pressure is transferred through hydraulic lines 128, hydraulic valves 146, shock support shafts 148, and hydraulic ports 150 to pull hydraulic fluid out of left upper chamber 170 and force hydraulic fluid into right upper chamber 170. Hydraulic fluid flows from upper chamber 170 of air spring shock 68, through left hydraulic port 150, left shock support shaft 148, left hydraulic valve 146, left hydraulic line 128, hydraulic pump 262, right hydraulic line 128, right hydraulic valve 146, right shock support shaft 148, right hydraulic port 150, and into right upper chamber 170.

Recall that arm assembly 64 receives the majority of the load on snowmobile 10 from centrifugal force. Hydraulic pump 262 is aided in raising snowmobile body 40 back to neutral by the higher spring rate of air spring shock 68. The higher air pressure in left lower chamber 172 pushes up on left floating piston 174. The upward pressure on left floating piston 174 works synergistically with hydraulic pump 262 to transfer hydraulic fluid from left upper chamber 170 to right upper chamber 170. Hydraulic system 120 is able to use the centrifugal force on snowmobile 10 to help return snowmobile body 40 to the neutral position because air spring shocks 68 and 88 are coupled hydraulically.

The hydraulic fluid transfer from left upper chamber 170 to the right upper chamber compresses air spring shock 68 and expands air spring shock 88 to return snowmobile body 40 back to the neutral position. Said hydraulic forces result in air spring shock 68 shrinking and pulling snowmobile body 40 toward arm assembly 64. Air spring shock 88 expands and pushes snowmobile body 40 away from arm assembly 66. Air spring shocks 68 and 88 return castings 60 and 62, and thus snowmobile body 40, back to the neutral position. The parallelograms of arm assemblies 64 and 66 return to being approximately rectangle.

As snowmobile body 40 returns to the neutral position, rider 14 also returns handlebar 20 to the neutral position so skis 30 and 32 point straight forward. The rotation of handlebar 20 turns biasing block 50 and control panel 122. Biasing block 50 is attached on top of a steering column. The rotation of handlebar 20 is transferred through biasing block 50 to rotate the steering column. The steering column actuates a power steering module of snowmobile 10 which pivots idler arm 410 via a connection at point 412. Casting joist 414, steering bar 416, and idler arms 410 and 418 pivot in reaction to the power steering module. To complete the right turn and travel in a straight line, idler arms 410 and 418 are pivoted to the right to return to a centered position.

The pivoting of idler arms 410 and 418 about casting joist 414 moves steering bar 416 back to the center of castings 60 and 62. As steering bar 416 moves back to the right, steering damper bracket 424 and steering damper 426 are pulled back to the right. Steering damper rod 428 is attached to castings 60 and 62 and remains stationary with respect to the castings. Idler arms 410 and 418 pivot in a circular motion which lowers steering bar 416 closer to steering damper 426. Steering damper bracket 424 pivots at the connection point with steering bar 416 to remain coupled to steering bar 416.

The rightward motion of steering bar 416 pulls steering rod 420 to the right and pushes steering rod 422 to the right. Steering rod 420 pulls steering arm 434 of the left ski bracket assembly 432 to the right. Steering rod 422 pushes steering arm 434 of the right ski bracket assembly 432 to the right. For snowmobile 10 to travel in a straight line, steering arms 434 are rotated to point straight backwards. Steering arms 434 turn spindles 438 inside of spindle shaft housings 78 and 98. Spindles 438 turn spindle housings 440. Spindle housings 440 turn air spring shocks 446, springs 450, ski brackets 444, and skis 30 and 32.

Rider 14 has returned snowmobile 10 to the neutral position. Rider 14 safely made the right turn without having to slow down due to the leaning capability of snowmobile 10. However, rider 14 is dissatisfied with the amount of assistance he received from hydraulic system 120 in leaning snowmobile 10. Rider 14 reaches for control panel 122 and turns sensitivity knob 134 clockwise to increase the gain for the next turn.

Rider 14 continues on this second road until snowmobile 10 runs into a big rock that the rider was unable to see in the snow. Ski 30 hits the right side of the rock. Ski 30 experiences a force pushing the ski to the right. The force felt by ski 30 is transferred through ski bracket 444, spindle housing 440, spindle 438, steering arm 434, and steering rod 420 to the inboard steering components. Steering rod 420 transfers the force to steering bar 416. Steering bar 416 is coupled to steering damper 426 via steering damper bracket 424. Steering bar 416 is stopped from moving to the left in response to the force on ski 30 by steering damper 426. Steering damper 426 contains a fluid which is forced through an adjustable valve when the steering damper moves along steering damper rod 428. The fluid being forced through the valve provides resistance to the movement of the steering components which is effective against the force applied by ski 30 hitting the big rock. Steering damper 426 provides isolation between skis 30 and 32 and handlebar 20. Steering damper 426 reduces the movement of steering bar 416 and idler arms 410 and 418 in response to the big rock. The movement of handlebar 20 is reduced, and rider 14 retains control of snowmobile 10 throughout the incident.

After travelling a little while longer, rider 14 turns left onto a snowmobile trail heading into a forest. Rider 14 leans his weight and pulls on handlebar 20 to execute a left lean of snowmobile 10 and turns handlebar 20 slightly to rotate skis 30 and 32 to the left. Leaning snowmobile 10 to the left occurs by rider 14 applying a force upward on the right side of handlebar 20 and downward on the left side of the handlebar. For rider 14, applying the force to lean snowmobile 10 to the left is natural. The force on handlebar 20 to lean snowmobile 10 is as if rider 14 were grabbing the handlebar to lean the snowmobile manually, and is simply receiving assistance from hydraulic system 120.

The force on handlebar 20 is transferred down to biasing block 50 via handlebar risers 252 which hold the handlebar. The force on handlebar 20 causes the left side of gap 246 to close slightly while the right side of gap 246 opens slightly. Plungers 236 are inserted into the lower half of biasing block 50 such that the tops of load cells 242 are in contact with the portion of biasing block 50 above gap 246. Load cells 242 on the left side of biasing block 50 sense that the left side of gap 246 has closed slightly because the pressure on the left load cells has increased. Load cells 242 on the right side of biasing block 50 sense that the right side of gap 246 has opened slightly because the pressure on the right load cells has decreased.

Load cells 242 convert the pressure sensed into an electric potential on conductors within cables 248. Cables 248 couple load cells 242 to the interface board within control panel 122. The interface board uses an analog-to-digital converter to convert the electric potential to a digital variable within the circuitry of the interface board. The interface board has four digital variables representing the output of the four load cells 242. The interface board uses the four digital variables to calculate the force rider 14 has applied to handlebar 20. In another embodiment, load cells 242 output a digital signal on cables 248.

After calculating the force rider 14 has applied to handlebar 20, the interface board applies a gain and generates a signal output to motor driver 124. The gain value is a multiplier that dictates how much hydraulic fluid is pumped through hydraulic system 120 for a given force applied to handlebar 20 by rider 14. Rider 14 increased the gain after the previous turn using sensitivity knob 134. Hydraulic system 120 pumps more hydraulic fluid than during the previous turn. Rider 14 applies less force on handlebar 20 for this turn even though snowmobile 10 leans just as far. Motor driver 124 contains a power amplifier to generate enough electric power to power electric motors 260. Motor driver 124 is electrically coupled to electric motors 260.

The electric power from motor driver 124 causes electric motors 260 to turn pulleys 266. Pulleys 266 drive timing belts 270 which turn pulley 268. Electric motors 260 are powered by the same voltage, thus pulleys 266 rotate at the same speed and in the same direction to turn pulley 268. The rotation of pulley 268 turns the driveshaft of hydraulic pump 262 to create hydraulic pressure in hydraulic lines 128.

To lean snowmobile 10 to the left, hydraulic pump 262 raises hydraulic pressure in the hydraulic line 128 coupled to air spring shock 88 and lowers the hydraulic pressure in the hydraulic line coupled to air spring shock 68. The change in pressure created by hydraulic pump 262 in hydraulic lines 128 pulls hydraulic fluid from air spring shock 68 and forces hydraulic fluid into air spring shock 88. More specifically, the hydraulic pressure is transferred through hydraulic lines 128, hydraulic valves 146, shock support shafts 148, and hydraulic ports 150 to pull hydraulic fluid out of left upper chamber 170 and force hydraulic fluid into right upper chamber 170. Hydraulic fluid flows from upper chamber 170 of air spring shock 68, through left hydraulic port 150, left shock support shaft 148, left hydraulic valve 146, left hydraulic line 128, hydraulic pump 262, right hydraulic line 128, right hydraulic valve 146, right shock support shaft 148, right hydraulic port 150, and into right upper chamber 170.

The hydraulic fluid pulled out of air spring shock 68 causes upper chamber 170 of the air spring shock to shrink in volume. As left upper chamber 170 shrinks in volume, left upper body 160 is pulled closer to left lower body 162. Left shock support shaft 148 is through casting 60, and left lower shock mount casting 164 is coupled to left axle 113. The force of left upper chamber 170 shrinking and pulling left lower body 162 further into left upper body 160 also pulls casting 60 closer to arm assembly 64.

The hydraulic fluid forced into air spring shock 88 causes upper chamber 170 of the air spring shock to expand. As right upper chamber 170 expands, right upper body 160 and right lower body 162 are pushed further apart. Right shock support shaft 148 is disposed through casting 62, and right lower shock mount casting 164 is coupled to right axle 113. The force of right upper chamber 170 expanding and pushing right lower body 162 further out of right upper body 160 also pushes casting 62 further away from arm assembly 66.

Said hydraulic forces result in air spring shock 68 shrinking and pulling snowmobile body 40 toward arm assembly 64. Air spring shock 88 expands and pushes snowmobile body 40 away from arm assembly 66. Air spring shocks 68 and 88 lean castings 60 and 62, and thus snowmobile body 40, to the left.

Arm assembly 64 is pivotally coupled to casting 60 via control link 72 and lower control arm 76. Arm assembly 66 is pivotally coupled to casting 62 via control link 92 and lower control arm 96. Because control links 72 and 92 are connected to castings 60 and 62 above lower control arms 76 and 96, the control links are moved horizontally by the castings more than the lower control arms are moved by the casting. Control links 72 and 92 move horizontally relative to lower control arms 76 and 96, rotating mechanism arms 70 and 90 to the left. The rotation of mechanism arms 70 and 90 results in upper control arms 74 and 94 moving toward the left relative to lower control arms 76 and 96. The relative motion of upper control arms 74 and 94 and lower control arms 76 and 96 leans spindle shaft housings 78 and 98. Spindle shaft housings 78 and 98 lean ski bracket assemblies 432. Ski bracket assemblies 432 lean skis 30 and 32. The result is that skis 30 and 32 are leaned to the left at approximately the same angle as snowmobile body 40.

At the same time that rider 14 pulls handlebar 20 to lean snowmobile 10 left into the turn, the rider rotates handlebar 20 to turn skis 30 and 32 to the left. Turning skis 30 and 32 provides the lateral force to turn snowmobile 10 while leaning the snowmobile helps rider 14 fight the centrifugal force of the turn. To turn skis 30 and 32 to the left, rider 14 uses his hands to apply a force on handlebar 20 pulling the left side of the handlebar toward him and pushing the right side of the handlebar away.

The rotation of handlebar 20 turns biasing block 50 and control panel 122. Biasing block 50 is attached on top of a steering column. The rotation of handlebar 20 is transferred through biasing block 50 to rotate the steering column. The steering column actuates a power steering module of snowmobile 10 which pivots idler arm 410 via a connection at point 412. Casting joist 414, steering bar 416, and idler arms 410 and 418 are pivotally coupled in a parallelogram shape and pivot in reaction to the power steering module. To turn snowmobile 10 to the left, idler arms 410 and 418 pivot on casting joist 414 toward the right side of the snowmobile, i.e., counter-clockwise as viewed in FIG. 9a.

The pivoting of idler arms 410 and 418 on casting joist 414 moves steering bar 416 toward the right side of snowmobile 10. As steering bar 416 moves to the right, steering damper bracket 424 and steering damper 426 are pulled to the right by the steering bar. Steering damper rod 428 is attached to castings 60 and 62 and remains stationary with respect to the castings. Steering damper rod 428 includes a plunger internal to steering damper 426 which pushes fluid in a circuitous path through the steering damper when the steering damper moves on the steering damper rod. Steering damper 426 includes an internal valve that the fluid is forced through. The fluid being pushed through the internal valve of steering damper 426 provides resistance to the movement of the steering damper on steering damper rod 428. The resistance of steering damper 426 has less of an effect on rider 14 when he turns snowmobile 10 than on a hazard of terrain 12 pushing ski 30 or 32. The internal valve is tuned to faster movements of the steering system experienced when ski 30 or 32 hits a hazard on terrain 12.

While rider 14 is turning handlebar 20, steering damper 426 is being pulled right on steering damper rod 428 by steering bar 416. Idler arms 410 and 418 move in a circular motion which raises steering bar 416 within castings 60 and 62. Steering damper bracket 424 pivots at the connection point with steering bar 416 to remain coupled even though the steering bar has moved further away from steering damper 426.

The rightward motion of steering bar 416 pulls steering rod 420 to the right and pushes steering rod 422 to the right. Steering rod 420 pulls steering arm 434 of the left ski bracket assembly 432 to the right. Steering rod 422 pushes steering arm 434 of the right ski bracket assembly 432 to the right. Steering arms 434 rotate around spindles 438 to turn skis 30 and 32 while steering rods 420 and 422 remain at a generally static angle to couple the outboard steering components to the inboard steering components. Steering rods 420 and 422 are coupled to steering arms 434 via ball joints 436 which allows the change in angle of the steering arms with respect to the steering rods. To execute a left turn of snowmobile 10, steering arms 434 rotate to point back toward the right side of the snowmobile. Steering arms 434 turn spindles 438 inside of spindle shaft housings 78 and 98. Spindles 438 turn spindle housings 440. Spindle housings 440 turn air spring shocks 446, springs 450, ski brackets 444, and skis 30 and 32.

Turning snowmobile 10 while leaning takes a slight turn of handlebar 20 to cause a significant turn of the snowmobile. Because ski bracket assemblies 432 are leaned with snowmobile 10, turning handlebar 20 forces the front tips of skis 30 and 32 into terrain 12. Skis 30 and 32 remain perpendicular to terrain 12 and the terrain pushes the tips of the skis up relative to ski bracket assemblies 432. The skis pivoting up relative to ski bracket assemblies 432 pivots the skis to the left relative to snowmobile 10 because the ski bracket assemblies are leaned. Terrain 12 pivoting the tips of skis 30 and 32 up relative to ski bracket assemblies 432 acts as an amplification, resulting in the skis aiming further to the left relative to snowmobile body 40 than relative to spindle shaft housings 78 and 98. The force of terrain 12 pushing the tips of skis 30 and 32 up relative to the ski bracket assembly 432 compresses air spring shocks 446.

Snowmobile 10 is now travelling with skis 30 and 32 oriented to the left and snowmobile body 40 leaned to the left to execute a left turn of the snowmobile. Arm assembly 66 is to the outside of the turn, and handles more of the centrifugal force of the turn than arm assembly 64. Due to arm assembly 66 experiencing a higher load from centrifugal force, lower chamber 172 of air spring shock 88 is compressed more than lower chamber 172 of air spring shock 68. Air spring shock 88 has a higher spring rate than air spring shock 68.

Rider 14 holds the position of handlebar 20 while snowmobile 10 continues to turn to the left. When snowmobile 10 has turned to the desired direction of travel, rider 14 applies downward pressure on the right side of handlebar 20 and upward pressure to the left side of the handlebar to bring the snowmobile out of the lean and return snowmobile body 40 to a vertical orientation. Rider 14 also returns handlebar 20 to the neutral position, i.e., perpendicular to snowmobile body 40, to travel straight ahead.

The force rider 14 applies to handlebar 20 is transferred down to biasing block 50 via handlebar risers 252 which hold the handlebar. The force on handlebar 20 causes the right side of gap 246 to close slightly while the left side of the gap opens slightly. Plungers 236 are inserted into cavities 238 such that the tops of load cells 242 are in contact with the portion of biasing block 50 above gap 246. Load cells 242 on the right side of biasing block 50 sense that the right side of gap 246 has closed slightly because the pressure on the right load cells has increased. Load cells 242 on the left side of biasing block 50 sense that the left side of gap 246 has opened slightly because the pressure on the left load cells has decreased.

Load cells 242 convert the pressure sensed into an electric potential on conductors within cables 248. Cables 248 couple load cells 242 to the interface board within control panel 122. The interface board uses an analog-to-digital converter to convert the electric potential to a digital variable within the circuitry of the interface board. The interface board has four digital variables representing the output of the four load cells 242. The interface board uses the four digital variables to calculate the force rider 14 has applied to handlebar 20. In another embodiment, load cells 242 output a digital signal on cables 248.

After calculating the force rider 14 has applied to handlebar 20, the interface board applies a gain and generates a signal output to motor driver 124. The gain value is a multiplier that dictates how much hydraulic fluid is pumped through hydraulic system 120 for a given force applied to handlebar 20 by rider 14. A higher gain setting causes hydraulic system 120 to pump more hydraulic fluid for the same force on handlebar 20, thus providing more assistance to rider 14 in leaning snowmobile 10. Motor driver 124 contains a power amplifier to generate enough electric power to power electric motors 260. Motor driver 124 is electrically coupled to electric motors 260.

The electric power from motor driver 124 causes electric motors 260 to turn pulleys 266. Pulleys 266 drive timing belts 270 which turn pulley 268. Electric motors 260 are powered by the same voltage, thus pulleys 266 rotate at the same speed and in the same direction to turn pulley 268. The rotation of pulley 268 turns the driveshaft of hydraulic pump 262 to create hydraulic pressure in hydraulic lines 128.

To lean snowmobile 10 back to the neutral position, hydraulic pump 262 raises hydraulic pressure in the hydraulic line 128 coupled to air spring shock 68 and lower the hydraulic pressure in the hydraulic line coupled to air spring shock 88. The change in pressure created by hydraulic pump 262 in hydraulic lines 128 pulls hydraulic fluid from air spring shock 88 and returns hydraulic fluid to air spring shock 68. More specifically, the hydraulic pressure is transferred through hydraulic lines 128, hydraulic valves 146, shock support shafts 148, and hydraulic ports 150 to pull hydraulic fluid out of right upper chamber 170 and force hydraulic fluid into left upper chamber 170. Hydraulic fluid flows from upper chamber 170 of air spring shock 88, through right hydraulic port 150, right shock support shaft 148, right hydraulic valve 146, right hydraulic line 128, hydraulic pump 262, left hydraulic line 128, left hydraulic valve 146, left shock support shaft 148, left hydraulic port 150, and into left upper chamber 170.

Recall that arm assembly 66 receives the majority of the load on snowmobile 10 from centrifugal force. Hydraulic pump 262 is aided in raising snowmobile body 40 back to neutral by the higher spring rate of air spring shock 88. The higher air pressure in right lower chamber 172 pushes up on right floating piston 174. The upward pressure on right floating piston 174 works synergistically with hydraulic pump 262 to transfer hydraulic fluid from right upper chamber 170 to left upper chamber 170. Hydraulic system 120 is able to use the centrifugal force on snowmobile 10 to help return snowmobile body 40 to the neutral position because air spring shocks 68 and 88 are hydraulically coupled.

The hydraulic fluid transfer from right upper chamber 170 to the left upper chamber compresses air spring shock 88 and expands air spring shock 68 to return snowmobile body 40 back to the neutral position. Said hydraulic forces result in air spring shock 88 shrinking and pulling snowmobile body 40 toward arm assembly 66. Air spring shock 68 expands and pushes snowmobile body 40 away from arm assembly 64. Air spring shocks 68 and 88 return castings 60 and 62, and thus snowmobile body 40, back to the neutral position. The parallelograms of arm assemblies 64 and 66 return to being approximately rectangle.

As snowmobile body 40 returns to the neutral position, rider 14 also returns handlebar 20 to the neutral position so skis 30 and 32 point straight forward. The rotation of handlebar 20 turns biasing block 50 and control panel 122. Biasing block 50 is attached on top of a steering column. The rotation of handlebar 20 is transferred through biasing block 50 to rotate the steering column. The steering column actuates a power steering module of snowmobile 10 which pivots idler arm 410 via a connection at point 412. Casting joist 414, steering bar 416, and idler arms 410 and 418 pivot in reaction to the power steering module. To complete the left turn and travel in a straight line, idler arms 410 and 418 are pivoted to the left to return to a centered position.

The pivoting of idler arms 410 and 418 on casting joist 414 moves steering bar 416 back to the center of castings 60 and 62. As steering bar 416 moves back to the left, steering damper bracket 424 and steering damper 426 are pulled back to the left. Steering damper rod 428 is attached to castings 60 and 62 and remains stationary with respect to the castings. Idler arms 410 and 418 move in a circular motion which lowers steering bar 416 closer to steering damper 426. Steering damper bracket 424 pivots at the connection point with steering bar 416 to remain coupled to the steering bar.

The leftward motion of steering bar 416 pushes steering rod 420 to the left and pulls steering rod 422 to the left. Steering rod 420 pushes steering arm 434 of the left ski bracket assembly 432 to the left. Steering rod 422 pulls steering arm 434 of the right ski bracket assembly 432 to the left. For snowmobile 10 to travel in a straight line, steering arms 434 are rotated to point straight backwards. Steering arms 434 turn spindles 438 inside of spindle shaft housings 78 and 98. Spindles 438 turn spindle housings 440. Spindle housings 440 turn air spring shocks 446, springs 450, ski brackets 444, and skis 30 and 32.

Rider 14 has returned snowmobile 10 to the neutral position. Rider 14 safely made the left turn without slowing down due to the leaning capability of snowmobile 10.

Rider 14 travels a short distance on the forest trail before reaching a point where the trail is sloped down to the left. Rider 14 realizes the trail is sloped and leans snowmobile 10 to the right to keep snowmobile body 40 vertical with respect to gravity. Rider 14 leans snowmobile 10 by pressing down on the right side of handlebar 20 and lifting up on the left side of the handlebar. Keeping snowmobile body 40 vertical helps rider 14 stay on snowmobile 10. Keeping snowmobile body 40 vertical keeps skis 30 and 32 horizontal. Keeping skis 30 and 32 horizontal on sloped terrain 12 lowers the likelihood that snowmobile 10 will slide down terrain 12 and off the trail. Keeping skis 30 and 32 horizontal on sloped terrain 12 lowers the likelihood that snowmobile 10 will roll downhill.

Rider 14 safely traverses the sloped trail and returns to a flat section of the trail. As snowmobile 10 returns to a level portion of the trail, rider 14 applies pressure on handlebar 20 to return the snowmobile to the neutral position. A short distance later rider 14 arrives at the location where he intends to hunt. Rider 14 pulls on brake lever 26 to come quickly and safely to a stop. Once stopped, rider 14 dismounts snowmobile 10 and unpacks his hunting supplies.

Consider a second mode of operating snowmobile 10 wherein rider 14 takes a friend on the snowmobile to view the northern lights. Rider 14 wants to provide a stable ride for the friend. Rider 14 uses LCD screen 130 and control buttons 132 to operate the GUI. Rider 14 enables the setting in the GUI to have snowmobile 10 automatically remain vertical with respect to gravity. Rider 14 now carries the friend as a passenger without worrying about controlling the lean of snowmobile 10. Rider 14 plans to travel at low speeds and does not want to worry about leaning snowmobile 10.

Rider 14 walks to snowmobile 10 and sits on seat 16. The friend walks to snowmobile 10 and sits on seat 16 behind rider 14. Rider 14 pulls on throttle lever 24 and snowmobile 10 begins moving forward. Rider 14 steers snowmobile 10 toward his favorite northern lights viewing location. Rider 14 has chosen a trail which contains an unavoidable snow bank on the right side of the trail. Rider 14 rides over the snowbank with snowmobile 10. Ski 32 rides up onto the snowbank while ski 30 remains at the original ground level.

Control panel 122 contains gyroscopes and accelerometers which detect the orientation of snowmobile body 40 and are connected to the interface board in the control panel. As rider 14 takes snowmobile 10 onto the snowbank, the right side of the snowmobile is lifted to a higher level than the left side. The interface board receives feedback from the gyroscopes and accelerometers as the right side of snowmobile 10 rises on the snowbank. The interface board recognizes that snowmobile body 40 has been moved from a vertical orientation. The interface board signals motor driver 124 to power hydraulic pump assembly 126 to return snowmobile body 40 to a vertical orientation. The electric power from motor driver 124 causes electric motors 260 to turn pulleys 266. Pulleys 266 drive timing belts 270 which turn pulley 268. Electric motors 260 are powered by the same voltage, thus pulleys 266 rotate at the same speed and in the same direction to turn pulley 268. The rotation of pulley 268 turns the driveshaft of hydraulic pump 262 to create hydraulic pressure in hydraulic lines 128.

To lean snowmobile 10 to the right and keep snowmobile body 40 in a vertical orientation, hydraulic pump 262 raises hydraulic pressure in the hydraulic line 128 coupled to air spring shock 68 and lowers the hydraulic pressure in the hydraulic line coupled to air spring shock 88. The change in pressure created by hydraulic pump 262 in hydraulic lines 128 pulls hydraulic fluid from air spring shock 88 and forces hydraulic fluid into air spring shock 68. More specifically, the hydraulic pressure is transferred through hydraulic lines 128, hydraulic valves 146, shock support shafts 148, and hydraulic ports 150 to pull hydraulic fluid out of right upper chamber 170 and force hydraulic fluid into left upper chamber 170. Hydraulic fluid flows from upper chamber 170 of air spring shock 88, through right hydraulic port 150, right shock support shaft 148, right hydraulic valve 146, right hydraulic line 128, hydraulic pump 262, left hydraulic line 128, left hydraulic valve 146, left shock support shaft 148, left hydraulic port 150, and into left upper chamber 170.

The hydraulic fluid pulled out of air spring shock 88 causes upper chamber 170 of the air spring shock to shrink in volume. As right upper chamber 170 shrinks in volume, right upper body 160 is pulled closer to right lower body 162. Right shock support shaft 148 is through casting 62, and right lower shock mount casting 164 is coupled to right axle 113. The force of right upper chamber 170 shrinking and pulling right lower body 162 further into right upper body 160 also pulls casting 62 closer to right arm assembly 66.

The hydraulic fluid forced into air spring shock 68 causes upper chamber 170 of the air spring shock to expand. As left upper chamber 170 expands, left upper body 160 and left lower body 162 are pushed further apart. Left shock support shaft 148 is disposed through casting 60, and left lower shock mount casting 164 is coupled to left axle 113. The force of left upper chamber 170 expanding and pushing left lower body 162 further out of left upper body 160 also pushes casting 60 further away from left arm assembly 64.

Said hydraulic forces result in air spring shock 88 shrinking and pulling snowmobile body 40 toward arm assembly 66. Air spring shock 68 expands and pushes snowmobile body 40 away from arm assembly 64. Air spring shocks 68 and 88 lean castings 60 and 62, and thus snowmobile body 40, back to a vertical orientation.

Arm assembly 64 is pivotally coupled to casting 60 via control link 72 and lower control arm 76. Arm assembly 66 is pivotally coupled to casting 62 via control link 92 and lower control arm 96. Because control links 72 and 92 are connected to castings 60 and 62 above lower control arms 76 and 96, the control links are moved horizontally by the castings more than the lower control arms are moved by the casting. Control links 72 and 92 move horizontally relative to lower control arms 76 and 96 which rotates mechanism arms 70 and 90 toward the right. The rotation of mechanism arms 70 and 90 results in upper control arms 74 and 94 moving toward the right side of snowmobile 10. The relative motion of upper control arms 74 and 94 and lower control arms 76 and 96 leans spindle shaft housings 78 and 98. Spindle shaft housings 78 and 98 lean ski bracket assemblies 432. Ski bracket assemblies 432 lean skis 30 and 32. The result is that skis 30 and 32 are leaned to be approximately horizontal.

The interface board in control panel 122 receives feedback from the gyroscopes and accelerometers as to the orientation of snowmobile body 40. The interface board quickly outputs a correcting signal to motor driver 124. Hydraulic system 120 acts fast to correct the orientation of snowmobile body 40 so that rider 14 and the friend feel as though snowmobile 10 is being held level. Once snowmobile 10 is over the snowbank, the interface board recognizes ski 32 is returning to ground level and generates a signal to correct the angle of snowmobile body 40 back to the neutral position.

The electric power from motor driver 124 causes electric motors 260 to turn pulleys 266. Pulleys 266 drive timing belts 270 which turn pulley 268. Electric motors 260 are powered by the same voltage, thus pulleys 266 rotate at the same speed and in the same direction to turn pulley 268. The rotation of pulley 268 turns the driveshaft of hydraulic pump 262 to create hydraulic pressure in hydraulic lines 128.

To lean snowmobile 10 back to the neutral position, hydraulic pump 262 raises hydraulic pressure in the hydraulic line 128 coupled to air spring shock 88 and lowers the hydraulic pressure in the hydraulic line coupled to air spring shock 68. The change in pressure created by hydraulic pump 262 in hydraulic lines 128 pulls hydraulic fluid from air spring shock 68 and returns hydraulic fluid to air spring shock 88. More specifically, the hydraulic pressure is transferred through hydraulic lines 128, hydraulic valves 146, shock support shafts 148, and hydraulic ports 150 to pull hydraulic fluid out of left upper chamber 170 and force hydraulic fluid into right upper chamber 170. Hydraulic fluid flows from upper chamber 170 of air spring shock 68, through left hydraulic port 150, left shock support shaft 148, left hydraulic valve 146, left hydraulic line 128, hydraulic pump 262, right hydraulic line 128, right hydraulic valve 146, right shock support shaft 148, right hydraulic port 150, and into right upper chamber 170.

The hydraulic fluid transfer from left upper chamber 170 to the right upper chamber compresses air spring shock 68 and expands air spring shock 88 to return snowmobile body 40 back to the neutral position. Said hydraulic forces result in air spring shock 68 shrinking and pulling snowmobile body 40 toward arm assembly 64. Air spring shock 88 expands and pushes snowmobile body 40 away from arm assembly 66. Air spring shocks 68 and 88 return castings 60 and 62, and thus snowmobile body 40, back to the neutral position. The parallelograms of arm assemblies 64 and 66 return to being approximately rectangle.

Now past the snowbank, rider 14 and the friend continue on to the northern lights viewing location. Rider 14 and the friend arrive before the northern lights have started. The friend wants to try snowmobile 10 and the rider acquiesces. Rider 14 knows of a short trail which will bring the rider and friend back to the northern lights viewing location in time to view the northern lights. Rider 14 and the friend dismount from snowmobile 10. The friend is lighter than rider 14. Rider 14 is uncertain what load cell gain setting would be ideal for the friend. Rider 14 uses control buttons 132 to operate the GUI. Rider 14 navigates the GUI to the load cell gain configuration page. Rider 14 enters the friend's height and weight and enables the setting to have the interface board automatically calculate gain based on the entered height and weight.

The friend mounts snowmobile 10 by sitting on seat 16. Rider 14 sits on seat 16 behind the friend. The friend pulls throttle lever 24 and snowmobile 10 begins moving forward. During turns, the friend is easily able to lean snowmobile 10. The interface board recognizes the friend is a light person and provides more assistance in leaning. More assistance is provided by applying a higher gain to the input the interface board receives from load cells 242. The gain value is a multiplier that dictates how much hydraulic fluid is pumped through hydraulic system 120 for a given force applied to handlebar 20 by rider 14. A higher gain setting causes the interface board to signal motor drivers 124 to output more power to electric motors 260. Electric motors 260 turn faster and hydraulic system 120 pumps more hydraulic fluid for the same force on handlebar 20.

The friend successfully drives snowmobile 10 around the path. Rider 14 and the friend return on snowmobile 10 to the northern lights viewing location. Rider 14 and the friend dismount snowmobile 10 and have a good time viewing the northern lights. Later rider 14 and the friend get back on snowmobile 10 and return home.

The next day rider 14 wants to view the information stored on the interface board inside control panel 122. Rider 14 has previously entered his home Wi-Fi information into the GUI of control panel 122. Rider 14 ensures that control panel 122 is powered up. Rider 14 uses an application on his computer to connect to control panel 122 and download the data stored on the interface board via Wi-Fi. The application shows rider 14 information for the ride he took yesterday, as well as previous trips the rider embarked on. Rider 14 clicks to view a map of his trip to view the northern lights yesterday. Rider 14 thinks the map is cool and posts the map to his social media profile. Rider 14 then views statistics regarding the average speed and altitude of snowmobile 10, as well as a line graph of the speed and altitude of snowmobile 10 over time. The application provides rider 14 with a list of turns executed during past trips. Rider 14 looks at turns from a previous trip to see how fast snowmobile 10 was travelling and how far snowmobile body 40 was leaned to execute the turn. Rider 14 enjoys viewing the information available and looks forward to his next trip on snowmobile 10.

While one or more embodiments of the present invention have been illustrated in detail, the skilled artisan will appreciate that modifications and adaptations to those embodiments may be made without departing from the scope of the present invention as set forth in the following claims.

What is claimed:
1. A snowmobile, comprising:
 a snowmobile body;
 an arm assembly coupled to the snowmobile body and configured to pivot vertically at a point of attachment of the arm assembly to the snowmobile body;
 a hydraulic actuator including a first end coupled to the snowmobile body and a second end coupled to the arm assembly; and
 a hydraulic pump coupled to the hydraulic actuator, wherein the hydraulic actuator is configured to rotate the arm assembly vertically when the hydraulic pump applies a hydraulic pressure to the hydraulic actuator.
2. The snowmobile of claim 1, further comprising a hydraulic valve coupled between the hydraulic pump and hydraulic actuator.
3. The snowmobile of claim 1, further comprising an axle disposed through the first end of the hydraulic actuator.
4. The snowmobile of claim 3, wherein the axle includes a hydraulic pathway coupled between the hydraulic pump and a chamber of the hydraulic actuator.
5. The snowmobile of claim 1, wherein the arm assembly includes a vertically oriented parallelogram shape.
6. A snowmobile, comprising:
 a snowmobile body; and
 an arm assembly including,
  a lower control arm pivotally coupled to the snowmobile body,
  an upper control arm disposed over the lower control arm, a mechanism arm coupled between the lower control arm and upper control arm, a spindle housing coupled between the lower control arm and upper control arm, wherein the spindle housing, upper control arm, lower control arm, and mechanism arm are pivotally coupled in a parallelogram shape, and a hydraulic actuator coupled between the snowmobile body and mechanism arm.

7. The snowmobile of claim 6, further comprising:
a hydraulic pump; and
a hydraulic valve coupled between the hydraulic pump and hydraulic actuator.

8. The snowmobile of claim 6, further comprising an axle disposed through the hydraulic actuator and attached to the snowmobile body.

9. The snowmobile of claim 8, wherein the axle includes a hydraulic pathway through the axle.

10. The snowmobile of claim 6, wherein the hydraulic actuator is configured to pivot the arm assembly vertically relative to the snowmobile body.

11. The snowmobile of claim 6, further comprising:
a spindle disposed through the spindle housing; and
a ski attached to the spindle.

12. The snowmobile of claim 11, wherein the arm assembly is configured to raise or lower the ski relative to the snowmobile body.

13. A method of making a snowmobile, comprising:
providing a snowmobile body; and
providing an arm assembly by,
  providing a lower control arm pivotally coupled to the snowmobile body,
  disposing an upper control arm over the lower control arm,
  providing a mechanism arm coupled between the lower control arm and upper control arm,
  providing a spindle housing coupled between the lower control arm and upper control arm, wherein the spindle housing, upper control arm, lower control arm, and mechanism arm are pivotally coupled in a parallelogram shape, and
  providing a hydraulic actuator coupled between the snowmobile body and mechanism arm.

14. The method of claim 13, further comprising disposing a hydraulic pump over the snowmobile body in fluid communication with the hydraulic actuator.

15. The method of claim 14, further comprising disposing a hydraulic valve between the hydraulic pump and hydraulic actuator.

16. The method of claim 13, further comprising disposing an axle through the hydraulic actuator.

17. The method of claim 16, further comprising providing a hydraulic pump coupled to the hydraulic actuator via a hydraulic pathway through the axle.

18. The method of claim 13, further comprising configuring the hydraulic actuator to pivot the arm assembly.

19. A snowmobile, comprising:
a snowmobile body;
a first arm assembly pivotally coupled to the snowmobile body, the first arm assembly including,
  a lower control arm,
  an upper control arm disposed over the lower control arm,
  a mechanism arm coupled between the lower control arm and upper control arm, and
  a first hydraulic actuator coupled between the snowmobile body and mechanism arm;
a second arm assembly pivotally coupled to the snowmobile body opposite the first arm assembly, the second arm assembly including a second hydraulic actuator coupled to the snowmobile body; and
a hydraulic circuit coupled to the first hydraulic actuator and second hydraulic actuator.

20. The snowmobile of claim 19, further comprising a bleeder valve disposed in the first hydraulic actuator.

21. The snowmobile of claim 19, wherein the hydraulic circuit includes a hydraulic motor coupled between the first hydraulic actuator and second hydraulic actuator.

22. The snowmobile of claim 21, further comprising a valve coupled between the first hydraulic actuator and hydraulic motor.

23. The snowmobile of claim 19, further comprising a control link coupled between the snowmobile body and mechanism arm, wherein the snowmobile body, lower control arm, control link, and mechanism arm are pivotally coupled in a parallelogram shape.

24. The snowmobile of claim 19, further comprising a spindle housing coupled between the lower control arm and upper control arm, wherein the mechanism arm, lower control arm, upper control arm, and spindle housing are pivotally coupled in a parallelogram shape.

25. The snowmobile of claim 19, further comprising a laterally curved track coupled to the snowmobile body.

* * * * *